United States Patent [19]

Carpenter et al.

[11] Patent Number: 5,602,997
[45] Date of Patent: Feb. 11, 1997

[54] CUSTOMIZABLE PROGRAM CONTROL INTERFACE FOR A COMPUTER SYSTEM

[75] Inventors: Claudia Carpenter, Sunnyvale; George A. Hansen, Walnut Creek; Beatrice M. Y. Lam; Lawrence Lozares, both of Sunnyvale; Krisztina Makó, Santa Cruz; Paul A. Mernyk, Palo Alto; Robert C. Robnett, San Jose, all of Calif.

[73] Assignee: Starfish Software, Inc., Scotts Valley, Calif.

[21] Appl. No.: 478,890

[22] Filed: Jun. 7, 1995

Related U.S. Application Data

[63] Continuation of Ser. No. 936,692, Aug. 27, 1992, abandoned.

[51] Int. Cl.⁶ .................................................. G06F 17/60
[52] U.S. Cl. .......................... 395/349; 395/346; 395/335; 395/347; 395/961
[58] Field of Search ........................ 395/155–161

[56] References Cited

U.S. PATENT DOCUMENTS

| | | | |
|---|---|---|---|
| 5,046,001 | 9/1991 | Barker et al. | 395/275 |
| 5,050,105 | 9/1991 | Peters | 345/119 |
| 5,140,677 | 8/1992 | Fleming et al. | 395/159 |
| 5,226,117 | 7/1993 | Miklos | 395/157 |
| 5,276,816 | 1/1994 | Cavendish et al. | 395/159 X |
| 5,287,447 | 2/1994 | Miller et al. | 395/157 |
| 5,287,514 | 2/1994 | Gram | 395/155 X |
| 5,291,587 | 3/1994 | Kodosky et al. | 395/157 X |
| 5,297,250 | 3/1994 | Leroy et al. | 395/157 |
| 5,301,301 | 4/1994 | Kodosky et al. | 395/159 X |
| 5,303,388 | 4/1994 | Kreitman et al. | 395/159 |
| 5,307,456 | 4/1994 | MacKay | 395/155 X |
| 5,333,252 | 7/1994 | Brewer, III et al. | 395/148 |
| 5,335,320 | 8/1994 | Iwata et al. | 395/155 |
| 5,339,390 | 8/1994 | Robertson et al. | 395/157 |
| 5,339,391 | 8/1994 | Wroblewski et al. | 395/157 |
| 5,347,628 | 9/1994 | Brewer et al. | 395/159 |
| 5,349,658 | 9/1994 | O'Rourk et al. | 395/159 X |
| 5,463,726 | 10/1995 | Price | 395/155 |

FOREIGN PATENT DOCUMENTS 0364178  6/1989  European Pat. Off. ........ G06F 3/023

OTHER PUBLICATIONS

Microsoft, Windows 3.0 User Manual, 1990, pp. 15–57, 79–98, 144–149, 156–157, 560–561.

Exemplar, Window 3.1 INI file listings from Win. INI and Clock .INI printed May 19, 1994 from Windows 3.1.

Webster, The Next Book, 1989, pp. 112–113, 118–138, 162–205, 286–319.

Amish Utilities User's Guide, Amish Software, Inc., 541 Cowper Street, Suite A, Palo Alto, CA 94301, 1992, pp. 19–24.

(List continued on next page.)

*Primary Examiner*—Mark K. Zimmerman
*Assistant Examiner*—Anton W. Fetting
*Attorney, Agent, or Firm*—John A. Smart

[57] ABSTRACT

A dashboard interface includes a plurality of software buttons provided on a panel. Each software button represents one of a plurality of applications. Upon a user selecting a first software button, a first application represented by the first software button is started. Upon a user selecting and dragging a visual representation of a second application to the panel, a new software button representing the second application is added to the panel. Upon a user selecting a different software button size in a configuration menu, the size of each software button in the plurality of software buttons is changed. The plurality of applications are listed in a configuration menu. The order in which the plurality of software buttons is displayed on the panel reflects the order of the listing of the plurality of applications. Upon a user changing the order of the listing of the plurality of applications, the order in which the plurality of software buttons is displayed on the panel is changed.

14 Claims, 64 Drawing Sheets

OTHER PUBLICATIONS

WinMaster User's Guide, PC–Kwik Corporation, 15100 SW Koll Parkway, Beaverton, OR 97006, pp. 28–49.

Rooms for Windows from XSoft User Guide, Xerox Corporation, 3400 Hillview Avenue, Palo Alto, California 94303, Mar. 1, 1992, pp. 18–42.

Wide Angle, Attitash Software, Inc., 20 Trafalgar Square, Nashua, New Hampshire 03063, pp. 3-1–4-13.

Using Norton Desktop for Windows, Symantec, pp. 18-3–18-7.

HOTWin Version 2.0A, Abacist Software Company, 1992, pp. 4-1–5-1.

Personal Computer World, "The Personal Touch", Apr. 1992, pp. 268, 276–280.

MacUser, "Tiles", Jun. 1992, pp. 70–71.

MacUser, "quick Tools", Feb. 1992, pp. 105–106.

Hewlett–Packard Journal, Mark A. Champine, "A visual User Interface For The HP–UX and Doamin Operating Systems", Feb. 1991, pp. 88–99.

Research Disclosure, "Direct Manipulation of Icons", Sep. 1989 p. 639.

CUSTOMIZABLE PROGRAM CONTROL INTERFACE FOR A COMPUTER SYSTEM

This is a File Wrapper Continuation patent application of Ser. No. 07/936,692 filed Aug. 27, 1992, abandoned.

BACKGROUND

The present invention concerns a customizable control interface for a computer which provides control of applications and resources.

In a computer systems such as personal computers, there is a continual search to provide a user simple and intuitive interfaces to computer applications and resources. For example, many personal computers use the Microsoft Windows operating system, available from Microsoft Corporation having a business address of One Microsoft Way, Redmond, Wash. 98052.

Various utilities have been designed to run with the Microsoft Windows operating system. These include, for example the PowerLauncher utility available from hDC Computer Corporation, having a business address of 6742 185th Ave NE, Redmond Wash. 98052, the SideBar utility available from Paper Software, Inc., having a business address of P.O. Box 567 New Paltz, N.Y. 12561, the Rooms for Windows utility available from Xerox Corporation, XSoft Production Education, having a business address of 3400 Hillview Avenue, Palo Alto, Calif. 94303, the Wide Angle utility available from Attitash, having a business address of 20 Trafalgar Square, Nashua, N.H. 03063, the Squeegee utility available from ICOM Simulations, Inc., having a business address of 648, S. Wheeling Road, Wheeling, Ill. 60090. The above described utilities variously implement functionality for launching programs, printing, viewing screens and showing virtual screens.

SUMMARY OF THE INVENTION

In accordance with the preferred embodiment of the present invention, a dashboard interface is presented. A plurality of software buttons is provided on a panel. Each software button represents one of a plurality of applications. Upon a user selecting a first software button, a first application represented by the first software button is started. Upon a user selecting and dragging a visual representation of a second application to the panel, a new software button representing the second application is added to the panel. Upon a user selecting a different software button size in a configuration menu, the size of each software button in the plurality of software buttons is changed. The plurality of applications are listed in a configuration menu. The order in which the plurality of software buttons is displayed on the panel reflects the order of the listing of the plurality of applications. Upon a user changing the order of the listing of the plurality of applications, the order in which the plurality of software buttons is displayed on the panel is changed.

A first plurality of panels is provided. The panels are displayed horizontally across a computer screen. A first panel from the plurality of panels has a plurality of columns of software buttons. A listing for each of the first plurality of panels is displayed in a configuration menu. An order of the listings determines a horizontal order of the display of panels on the computer screen. Upon a user marking a listing for a panel as not shown, display of the panel on computer screen is ceased. For example, the user changes order of the listings by selecting a listing and dragging the listing to a new position in the listings. Upon a user selecting a listing for a panel, configuration preferences for the panel are displayed. Upon a user reducing the horizontal length of the panel interface, the number of columns displayed in the first panel are reduced. Also, scroll buttons are displayed in the first panel. Upon a user selecting a scroll button in the first panel, the columns displayed in the first panel are scrolled. A listing of each of the first plurality of panels in a configuration menu is displayed. An order of the listings determines a horizontal order of the display of panels on the computer screen. Upon a user changing the order of the listings, the horizontal order of the display of panels on the computer screen is correspondingly changed. Additionally, in a first configuration menu, a plurality of entries are listed. The entries are for software buttons on a first panel. The order in which the plurality of software buttons is displayed on the first panel reflects the order of the listing of the plurality of entries. Upon a user changing order of the listing of the plurality of entries, the order in which the plurality of software buttons is displayed on the first panel is changed.

A plurality of mini-program windows is displayed. Each mini-program window has a first background pattern. Each program window represents a virtual computing screen. Mini-windows shown in the mini-program windows each represent an application window displayed in the represented virtual computing screen. An associated software button is displayed adjacent to each mini-program window. A first mini-window which is greater than a pre-selected size includes a first icon which identifies a first application which controls a first application window represented by the first mini-window. Upon a user selecting a first mini-program window, a first virtual computing screen is displayed which is represented by the mini-program window additionally, it is indicated to the user that the first virtual screen is selected. The user selects the first mini-program window by selecting an associated software button for the first mini-program window. Upon the user selecting a second background pattern from a configuration menu, the display of mini-program windows is changed so that each mini-program window has the second background pattern. Upon a user selecting a save layout command, a current layout of the virtual screens is stored as a first stored layout. The current layout includes placement of open application windows. Upon the user selecting a load layout command at a later time, the first stored layout of the virtual screens is displayed. The display includes the placement and the size of the application windows. Upon the user selecting a modification command, the stored layout is modified. Upon a user selecting a first associated software button adjacent to a first mini-program window, displaying a first virtual computing screen represented by the first mini-program window, and indicating to the user that the first virtual screen is selected. A region on the first associated software button is highlighted to indicate to the user that the first virtual screen is selected.

A clock is displayed on a panel in a computer screen. A user accesses preferences configuration for the clock. Upon the user selecting a digital clock face, a digital clock face for the clock is displayed. Upon the user selecting an analog clock face, an analog clock face for the clock is displayed. Upon the user selecting a first analog clock face style, the first analog clock face style for the clock is displayed. Upon the user selecting a second analog clock face style, the second analog clock face style for the clock is displayed. Upon the user selecting a first color, the digital clock face is displayed using the first color. Upon the user selecting a second color, the digital clock face is displayed using the second color.

In response to a user command, an alarm is set to occur at a first time. At the first time an alarm window is displayed. The alarm window includes a snooze software button. Upon the user selecting the snooze software button, the alarm window is closed. After passage of a snooze time interval from the first time, the first alarm window is re-displayed. In response to a user command, the snooze time interval is varied.

A first gauge is displayed on a panel. The first gauge indicates an amount of resources available to a user of the computing system. For example, the first gauge has an appearance similar to an automobile gas gauge. Also displayed on the panel is an indication of the unused memory available to the user. For example, the indication has an appearance similar to an automobile odometer. Upon the amount of resources available to the user becoming less than a first preselected amount, a warning is given to the user. Upon the amount of unused memory available to the user becoming less than a second preselected amount, a warning is given to the user. The warning includes changing the color of a portion of the panel. For example, an icon in the shape of a gas pump flashes red. In response to a first user command, a task list of currently running application processes is displayed. In response to a second user command, a currently running application process which the user has selected from the task list is terminated.

A printer icon and a printer indicator button are displayed for each printer for which the computing system is configured. Upon selection of the printer icon for a first printer, a label describing the first printer is displayed. Upon selection of the printer indicator button for the first printer, designating the first printer as a default printer for the computing system. For example, this includes placing an indication within the printer indicator button that the first printer is the default printer. Upon a user double selecting the printer icon for the first printer, a configuration window for the first printer is displayed. A first image of a sheet of paper is displayed within a first printer icon for a first printer. The sheet of paper is oriented in a landscape orientation when the printer is configured to be in a landscape mode and the sheet of paper is oriented in a portrait orientation when the printer is configured to be in a portrait mode. Upon a user configuring the first printer from the landscape mode to the portrait mode, the display of the first image of the sheet of paper is changed from being oriented in the landscape orientation to being oriented in the portrait orientation. Upon the user configuring the first printer from the portrait mode to the landscape mode, changing the display of the first image of the sheet of paper from being oriented in the portrait orientation to being oriented in the landscape orientation.

DESCRIPTION OF THE PREFERRED EMBODIMENT

Figure 1:
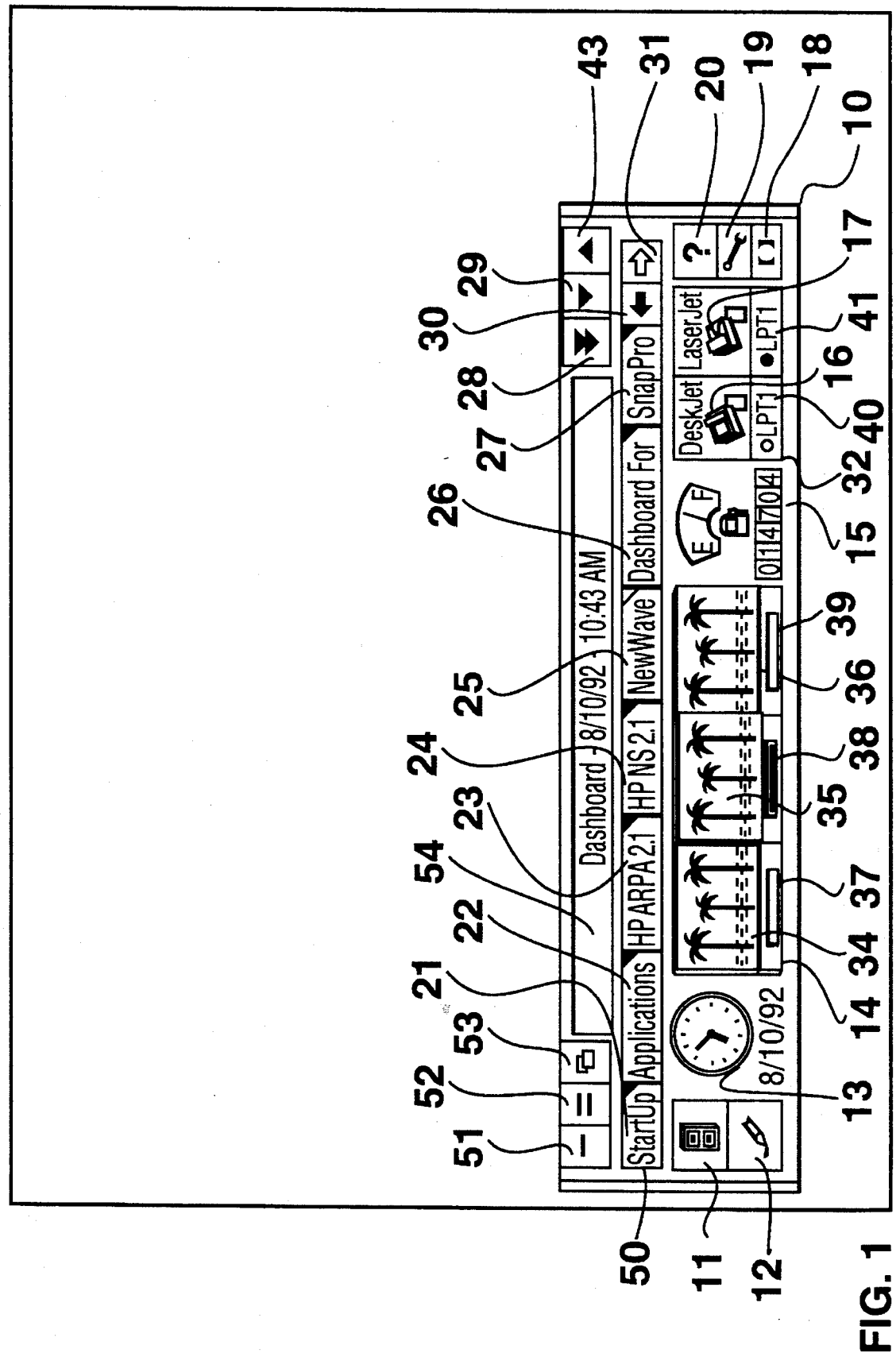
FIG. 1 shows a dashboard interface, in accordance with the preferred embodiment of the present invention.

FIG. 1 shows a graphic representation of an interface in accordance with the preferred embodiment of present invention. A computer "dashboard" interface 10 is placed on a computer screen, for example, in an unused region near the bottom of the screen. In the preferred embodiment, the default position of dashboard interface 10 can be anywhere on the computer screen.

As shown in FIG. 1, dashboard interface 10 includes a quick launch button 11, a quick launch button 12, an alarm clock 13, an extended screens display 14, a resource icon 15, a printer manager 32, an about button 18, a customize button 19, a help button 20, a maximize button 43, a minimize button 29, a show/hide program menu button 28, a title bar 54, a system menu button 51, a task menu button 52, a layout menu button 53 and program menu 50. Printer manager 32 includes a first printer icon 16 and a second printer icon 17, a first default printer indicator button 40 and a second default printer indicator button 41. Selection of the default printer indicator button under a printer icon results in that printer becoming the default printer. An area within the default printer indicator button for the selected default printer is highlighted indicating the default printer to the computer user.

Extended screens display 14 includes a mini-program window 34, a mini-program window 35, a mini-program window 36, a selection bar 37, a selection bar 38 and a selection bar 39. Program menu 50 includes a program group button 21, a program group button 22, a program group button 23, a program group button 24, a program group button 25, a program group button 26 and a program group button 27. A shift button 30 is used to shift group tabs in program menu 50 to the left. A shift button 31 is used to shift group tabs in program menu 50 to the right.

A program from program menu 50 may be launched by first selecting the program group button. All of the programs within that group will then be displayed. A listed program may then be selected to run. Also, the group window may be opened to display all programs as icons.

Figure 2:
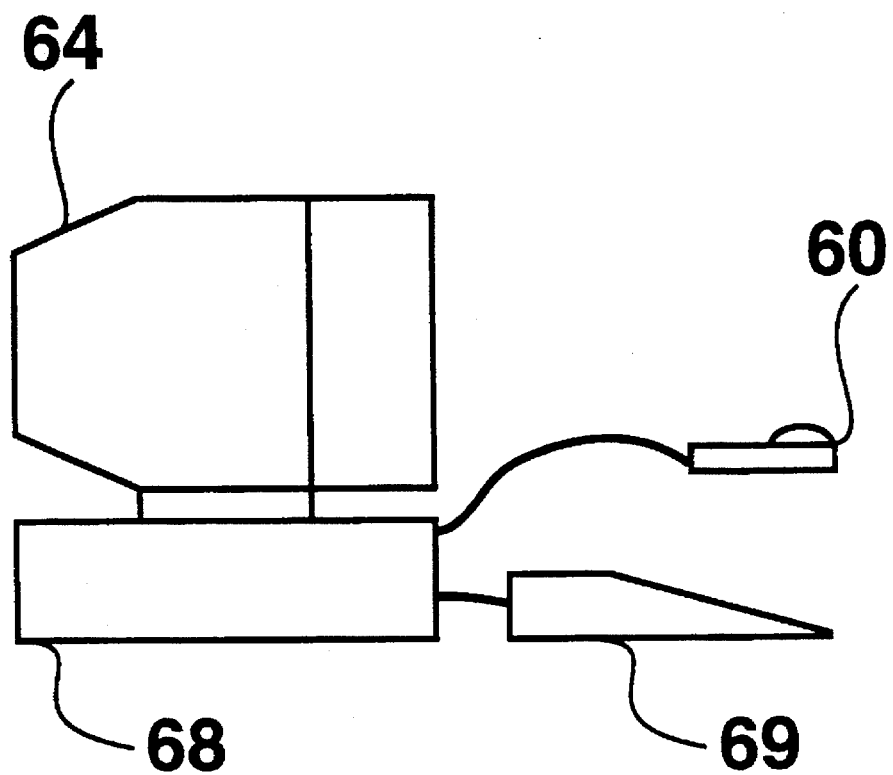
FIG. 2 shows a computing system which runs the dashboard interface shown in FIG. 1, in accordance with the preferred embodiment of the present invention.
Figure 3:
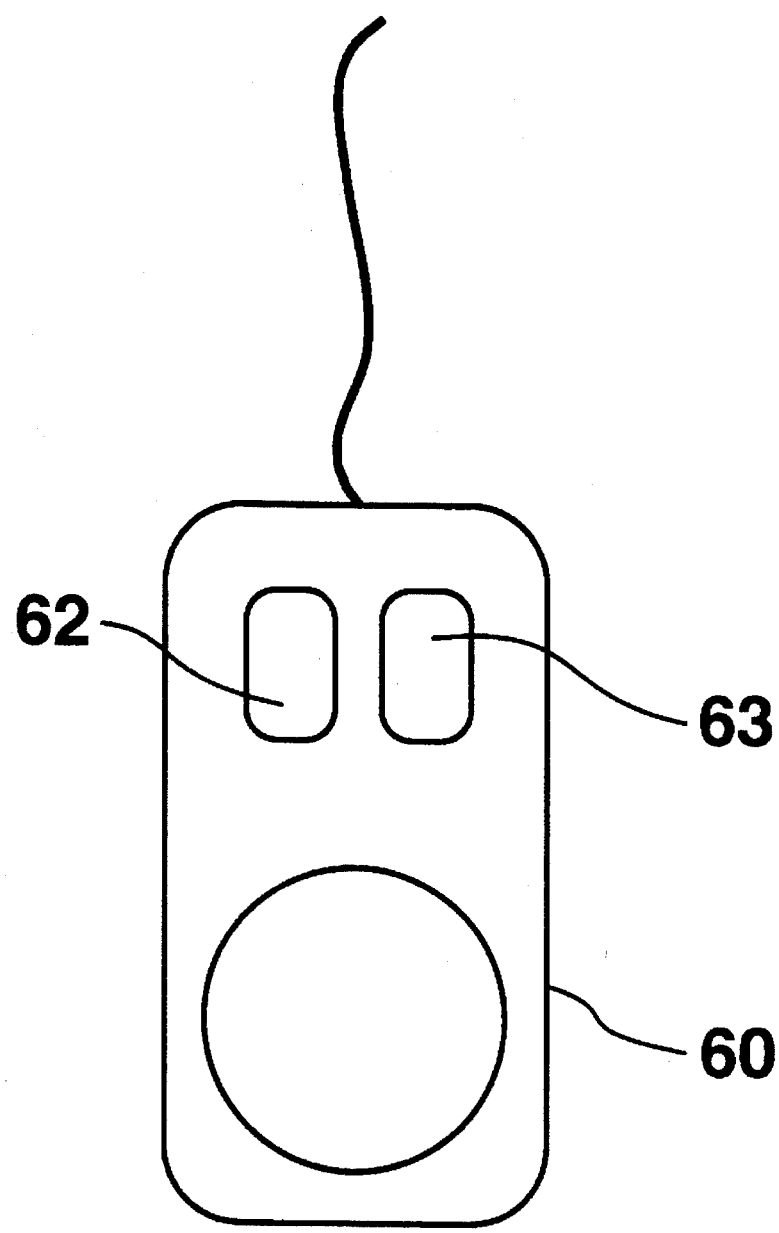
FIG. 3 shows a mouse utilized in the computing system shown in FIG. 2, in accordance with the preferred embodiment of the present invention.

FIG. 2 shows a block diagram of a computer system which generates and displays dashboard interface 10. A computer 68 controls a monitor 64. A keyboard 69 and a mouse 60 are utilized to interface with the computer system. FIG. 3 shows mouse 60 to include a button 62 and a button 63.

Using mouse 60, a cursor 56 may be placed over customize button 19. Upon clicking button 62, a customize window 71, shown in FIG. 4, appears. Additionally, a mini-window 70 appears in mini-program window 35 of extended screen display 14. Because customize window 71 is currently the active window, mini-window 70 is highlighted.

Within customize window 71, customize menu 72 lists items within dashboard interface 10. These include a listing 73 for dashboard interface 10, a listing 74 for the program menu, a listing 75 for Quick launch, a listing 76 for alarm clock 13, a listing 77 for extended screens display 14, a listing 78 for resource gauge 15 and a listing 79 for printer manager 32. Also shown are a hide/show button 87, an undo button 88 and a done button 89.

Figure 4:
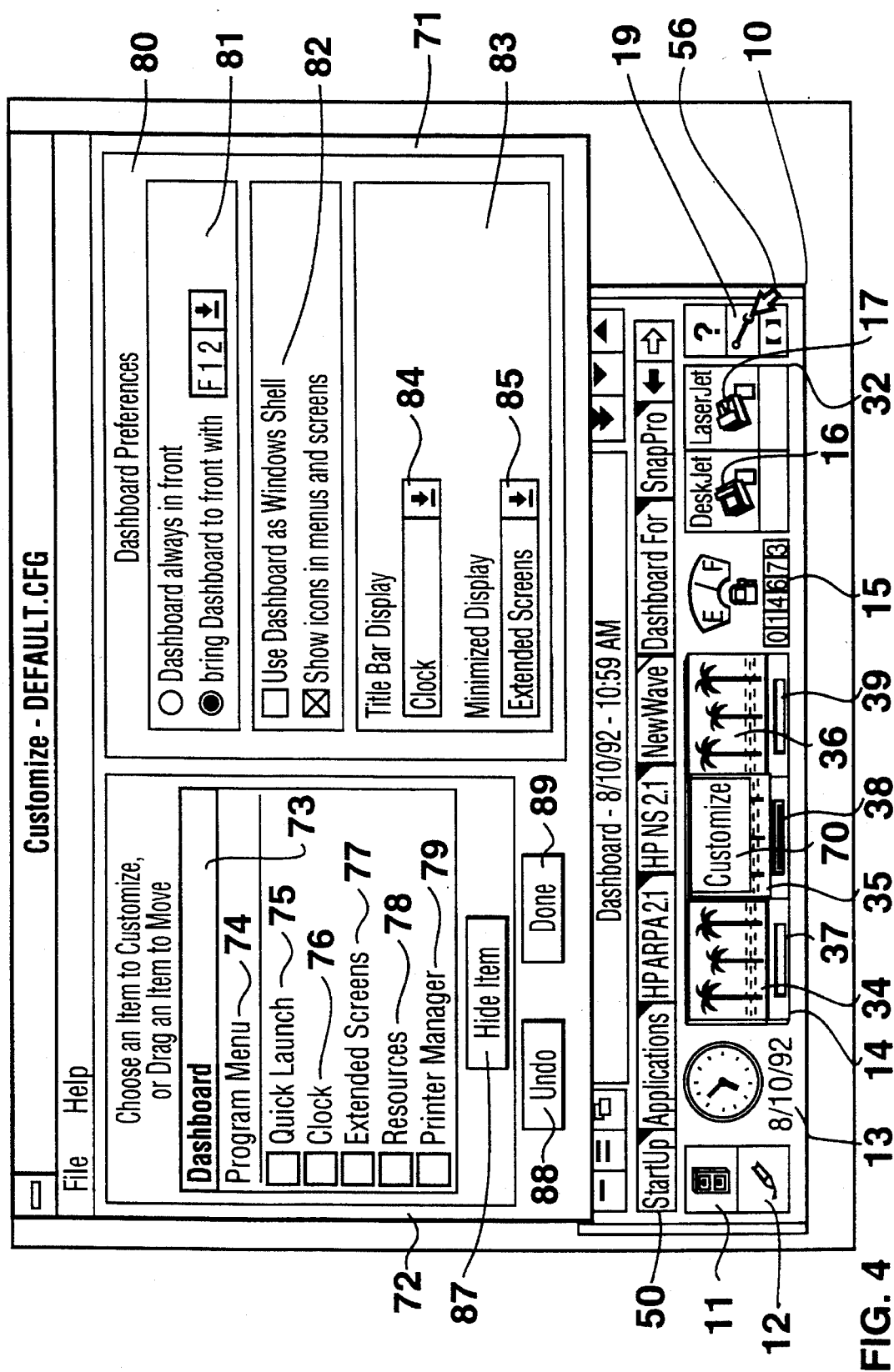
FIGS. 4 through 57 show computer screens which show implementation of a dashboard interface in accordance with the preferred embodiment of the present invention.

In FIG. 4, dashboard listing 73 is highlighted. Therefore, a dashboard preferences window 80 is shown. Within dashboard preference window 80, a box 81 is used to select whether dashboard interface 10 is always at the front of the display. A box 82 is used to select whether dashboard interface 10 is run as a Windows shell or whether icons are shown in menus and screens. A selection box 84 is used to select whether the title bar displays a clock or whether a standard display is used. A selection box 85 is used to select whether the minimized display of dashboard interface 10 is a standard icon, a clock icon or an extended screens icon.

Figure 5:
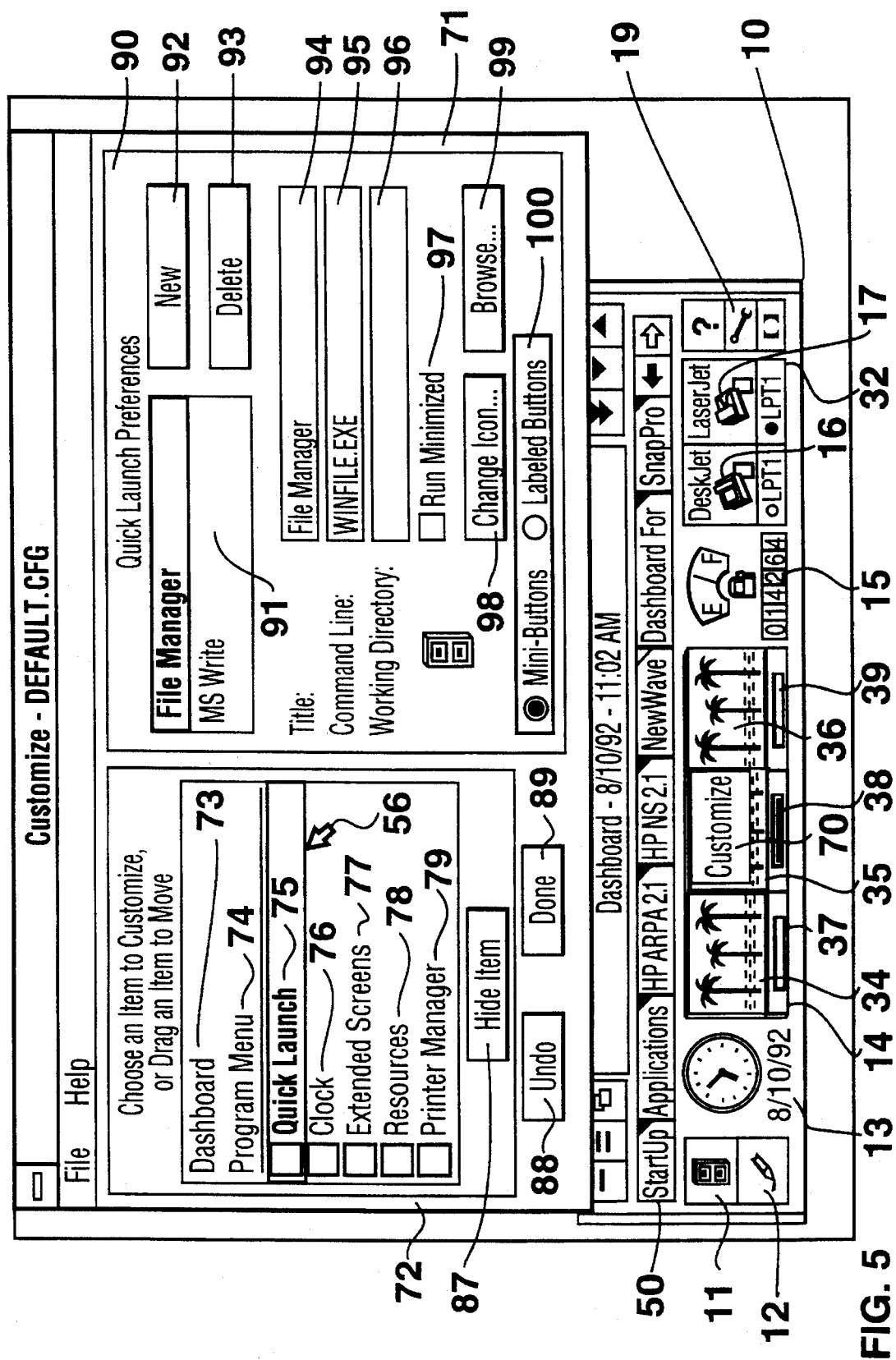

In FIG. 5, a quick launch preferences window 90 was accessed by a user placing cursor 56 over quick launch listing 75 and clicking mouse button 62. In quick launch preferences window 90, an application listing 91 shows applications for which there is a quick launch button. Currently, these include a File Manager application and an MS Write program. The highlighting of the File Manager Application indicates that this is the currently selected application. A button 92 may be used to add new quick launch buttons to dashboard interface 10. A button 93 is used to delete programs from dashboard interface 10. A title bar 94 lists the title of the application selected in application listing 91. A command line 95 lists a command line for the application selected in application listing 91. A working directory line 96 indicates a working directory for the application selected in application listing 91. Selecting a run minimized box 97 causes the application selected in application listing 91 to be launched in minimized form. A change icon button 98 allows the icon shown in the quick launch button in dashboard interface 10 for the application selected in application listing 91 to be changed. A browse button 99 allows browsing of file directories. A box 100 allows a user to select whether to display quick launch buttons as mini-buttons or as labeled buttons.

Figure 6:
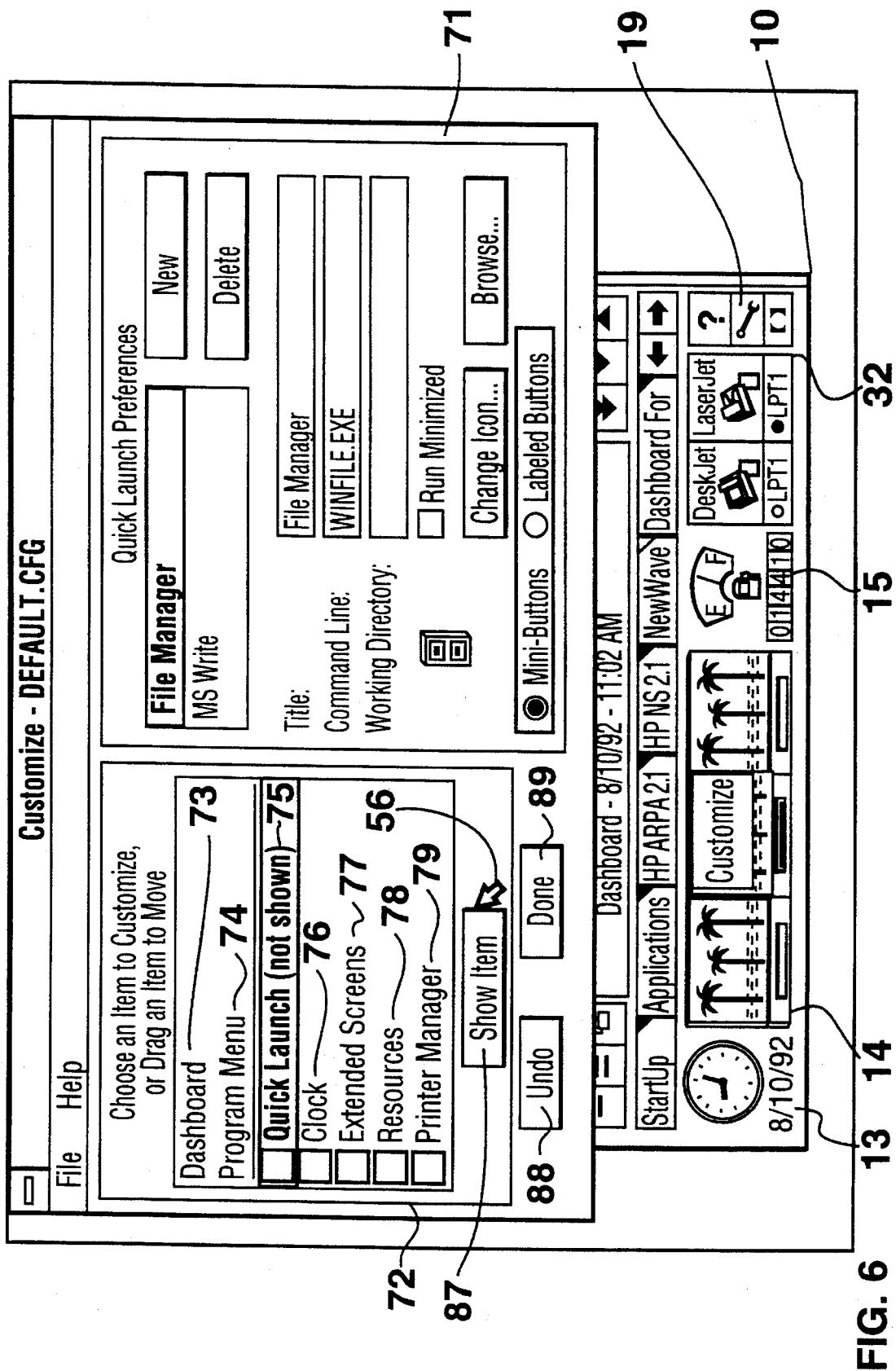

In FIG. 6, a user has placed cursor 56 over hide/show item button 87. After clicking mouse button 62, quick launch listing 75 is marked as "not shown". The result is that quick launch button 11 and quick launch button 12 are removed from dashboard interface 10.

Figure 7:
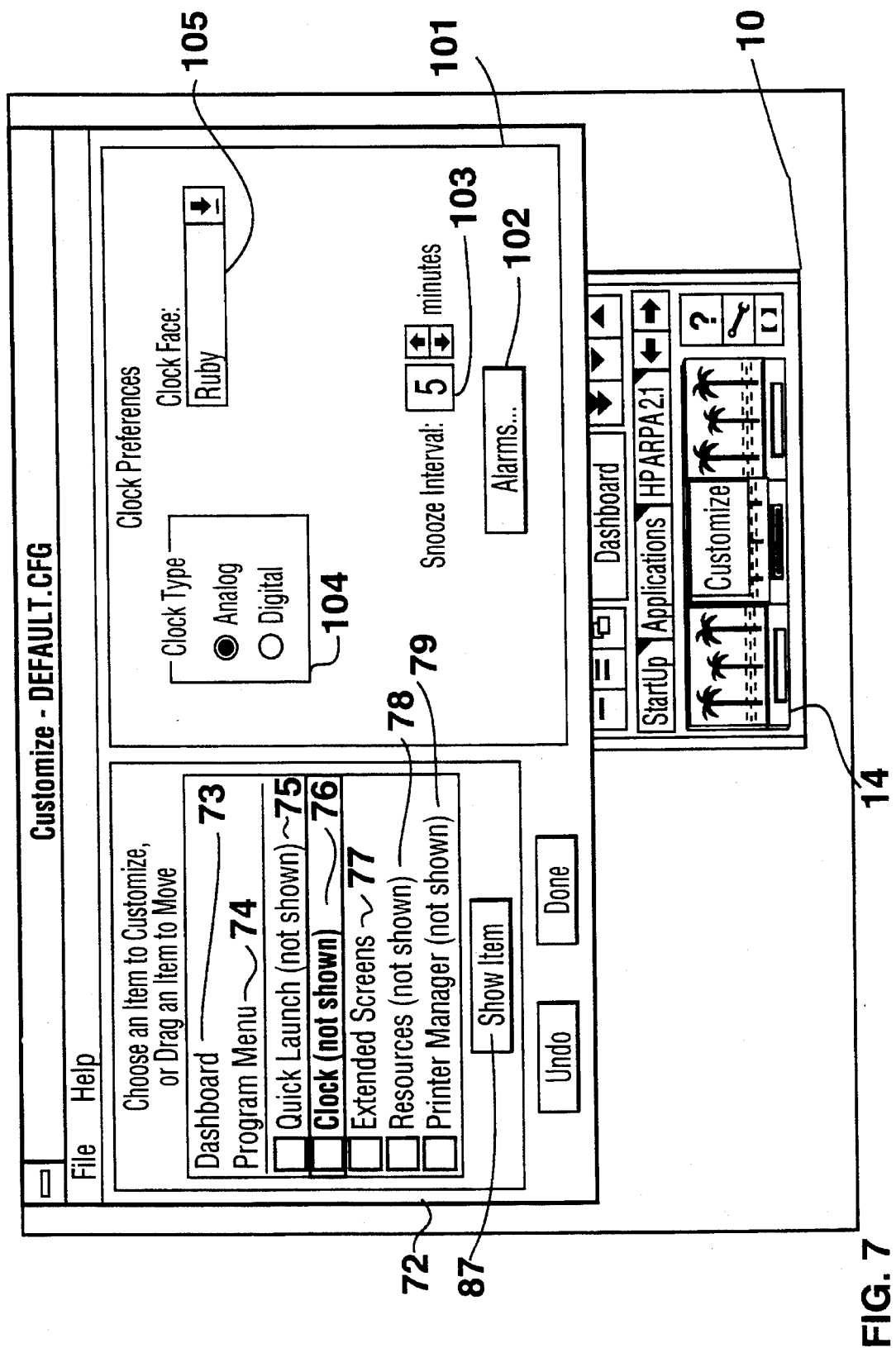

In FIG. 7, the user has additionally hidden alarm clock 13, resource gauge 15 and printer manager 32. In FIG. 7, clock listing 76 is selected. This has resulted in a clock preferences window 101 being shown. In clock preferences window 101, a clock type box 104 allows selection of an analog or a digital display clock. A clock face box 105 allows selection of a particular clock face. A box 10 allows selection of an alarm snooze interval. An alarms button 102 is used to summon an alarm dialog box.

Figure 8:
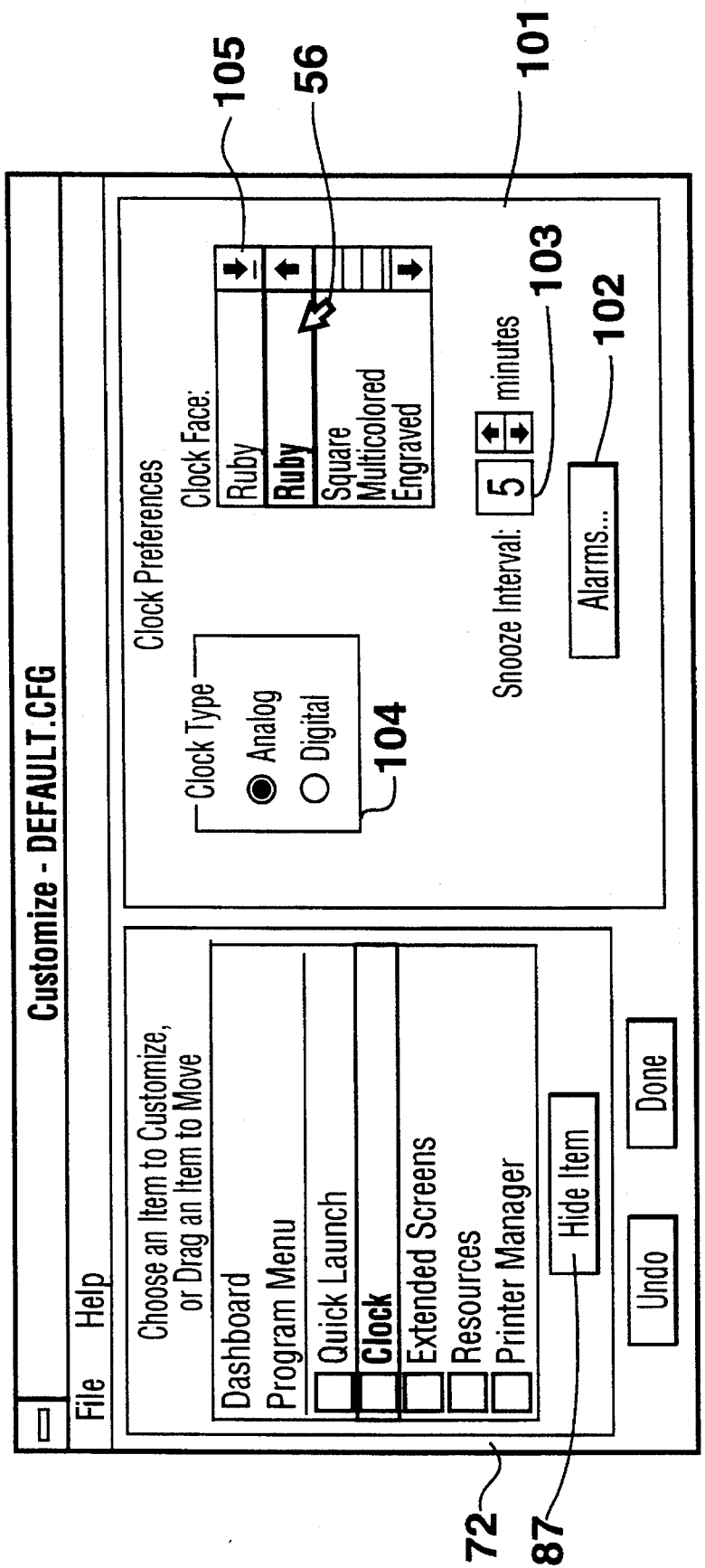

In FIG. 8, hide/show button 87 has been used so that dashboard 10 will display all the items. In addition, the various available analog clock types have been listed by placing cursor 56 over clock face box 105 and clicking mouse button 62.

Figure 9:
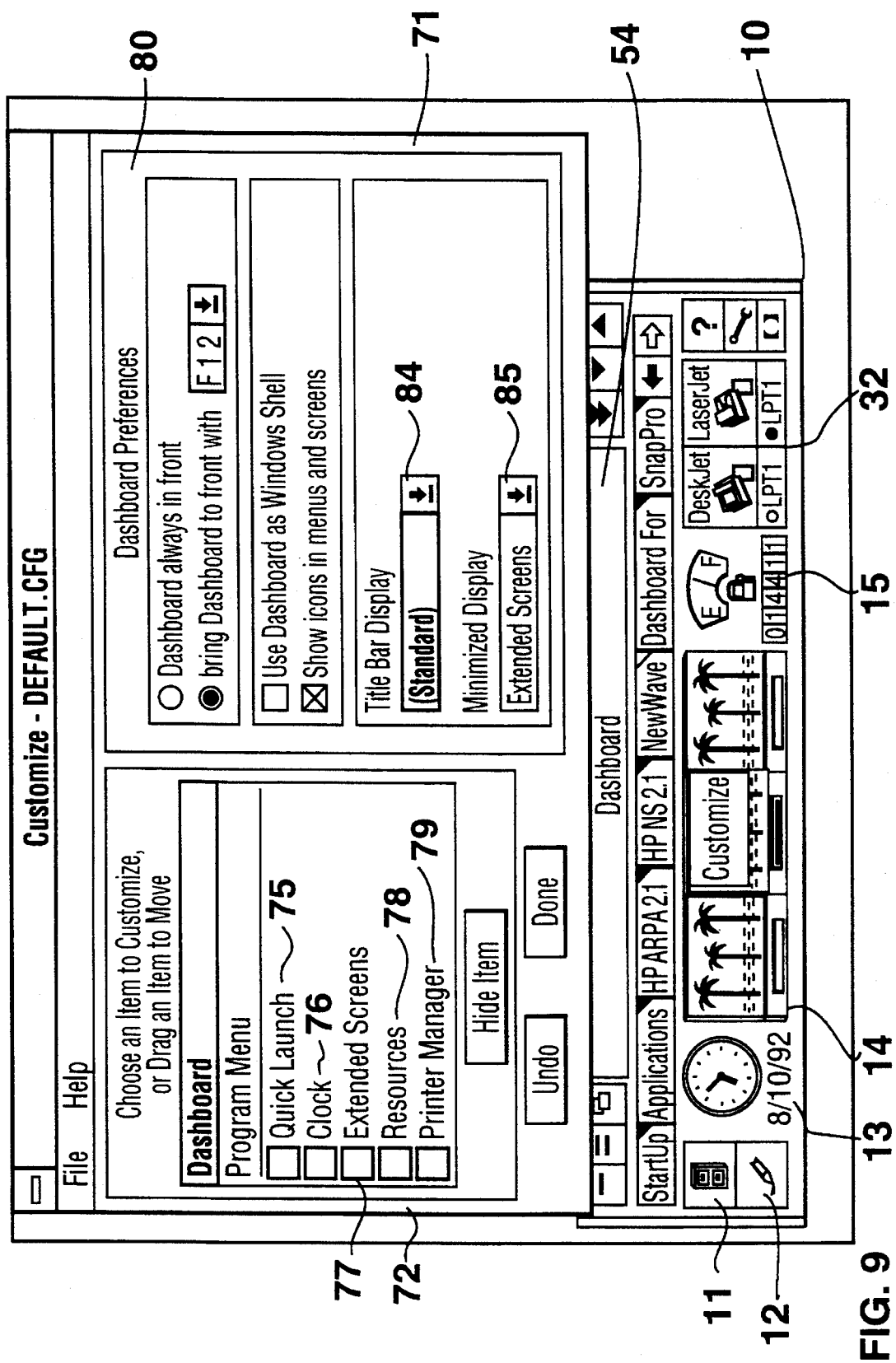

In FIG. 9, a different clock face is shown displayed in dashboard interface 10. Additionally, title bar 54 of dashboard interface 10 no longer shows the time and date. This is because selection box 84 was used to select the "standard" title bar display.

The order in which items are listed in customize menu 72, from top to bottom, determines the order in which they are displayed in dashboard interface 10, from left to right. The items displayed in dashboard 10 may be arranged by placing cursor 56 over a listing in customize menu 72, depressing mouse button 62, dragging the listing to a new position, and releasing mouse button 62.

Figure 10:
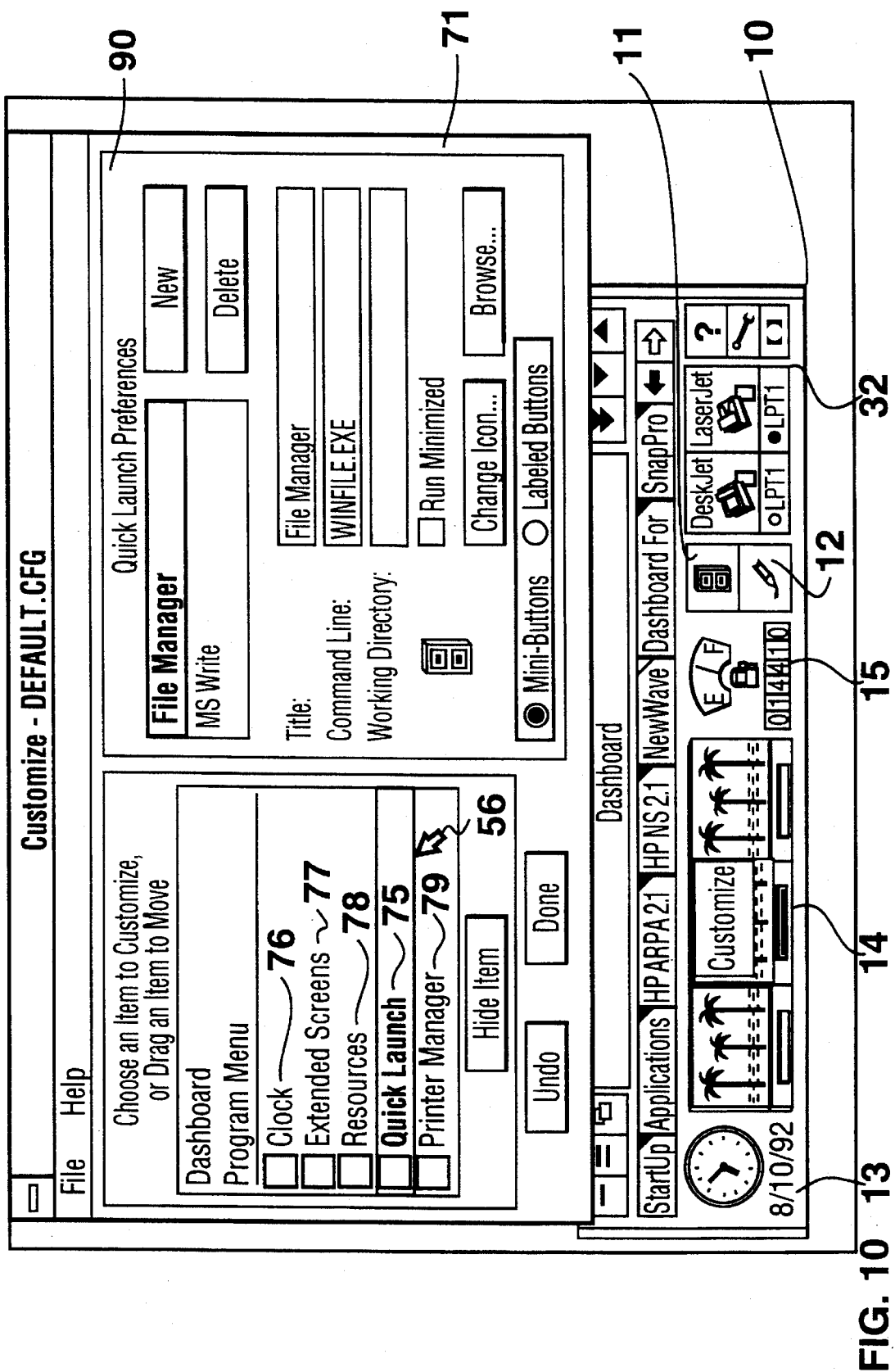

For example, in FIG. 10, quick launch listing 75 has been moved to follow resources listing 78. The result, as seen in dashboard interface 10, is that quick launch button 11 and quick launch button 12 are now displayed to the right of resource gauge 15.

Figure 11:
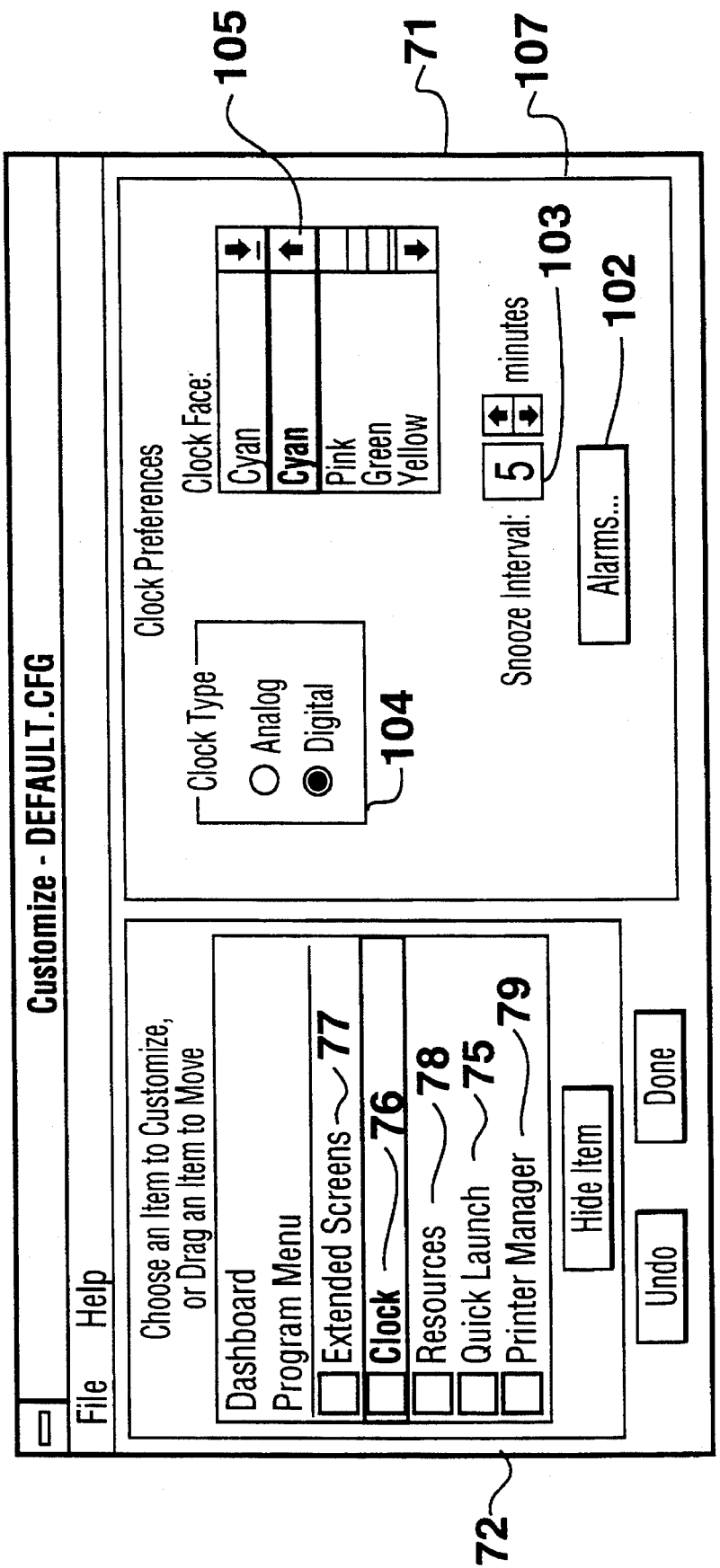
Figure 12:
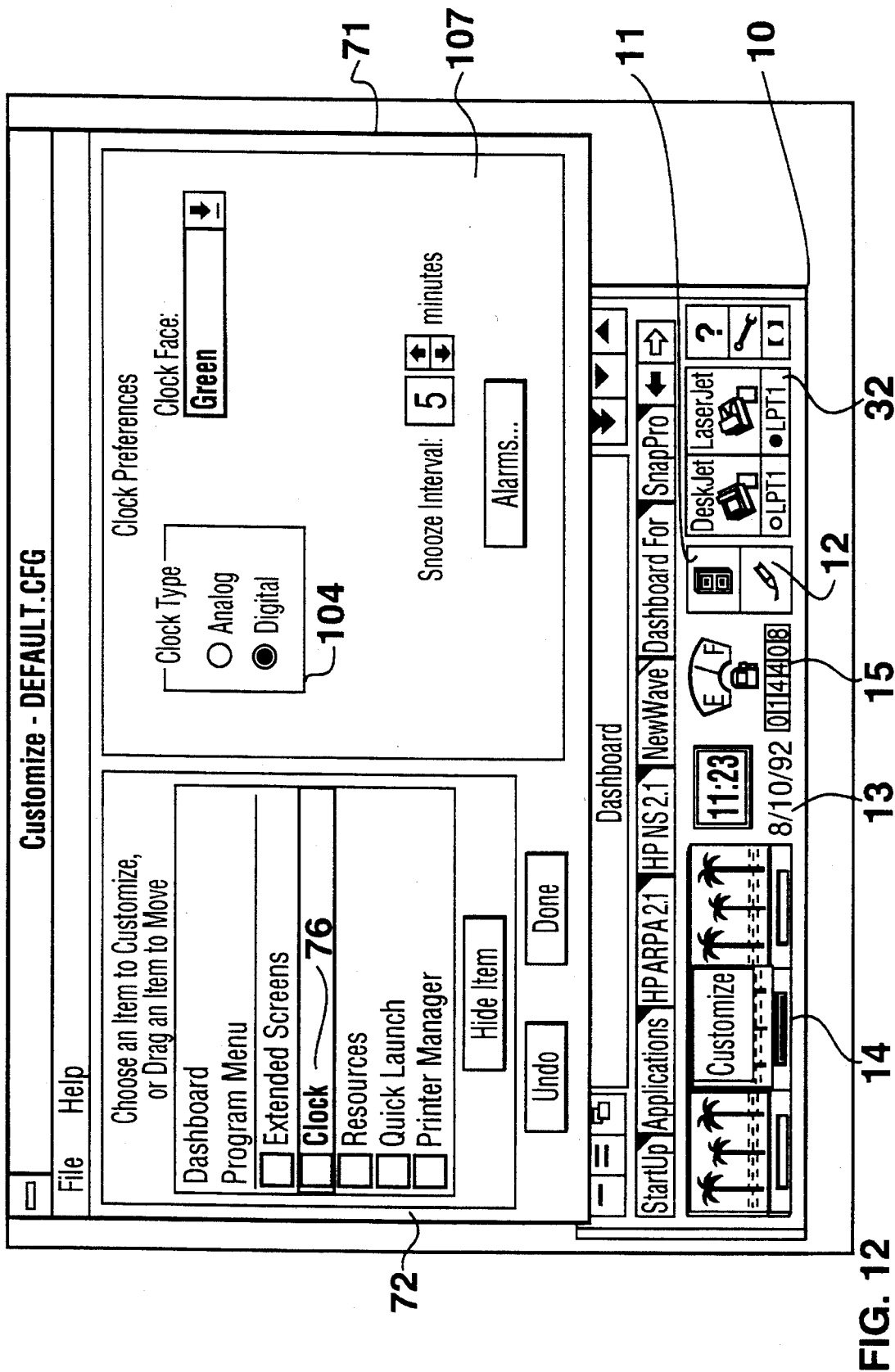

In FIG. 11, clock listing 76 has been moved to follow extended screens listing 77. The result, as seen FIG. 12, is that clock display 13 is now displayed to the right or resource gauge 15.

Also in FIG. 11, various available digital clock colors have been listed by utilizing clock type box 104 to select a digital clock, placing cursor 56 over clock face box 105 and clicking mouse button 62. In FIG. 12, a digital clock face is shown displayed in dashboard interface 10.

Figure 13:
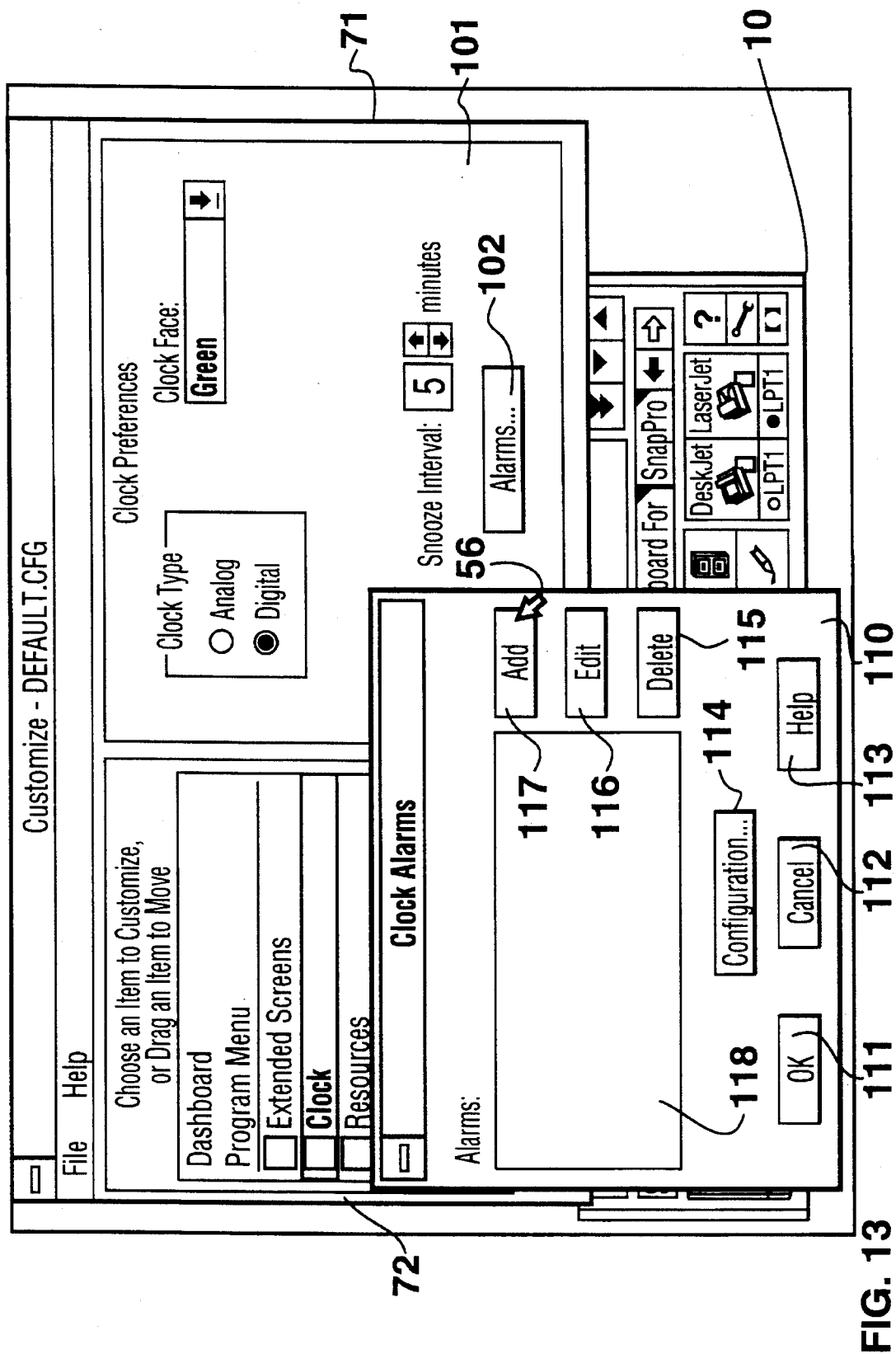

Placing cursor 56 over alarms button 102 and depressing button 62 results in the appearance of clock alarms window 110, as shown in FIG. 13. Clock alarms window 110 can also be brought up by placing cursor 56 over clock display 13 and in quick succession clicking button 62. Clock alarms window 110 includes a listing of current selected alarms 118. An add button 117 is used to add alarms. An edit button 116 is used to edit existing alarms. A delete button 115 is used to delete alarms. A configuration button 114 is used to bring up clock preferences window 101. Clock alarms window 110 also includes an OK button 111, a cancel button 112 and a Help button 113.

Figure 14:
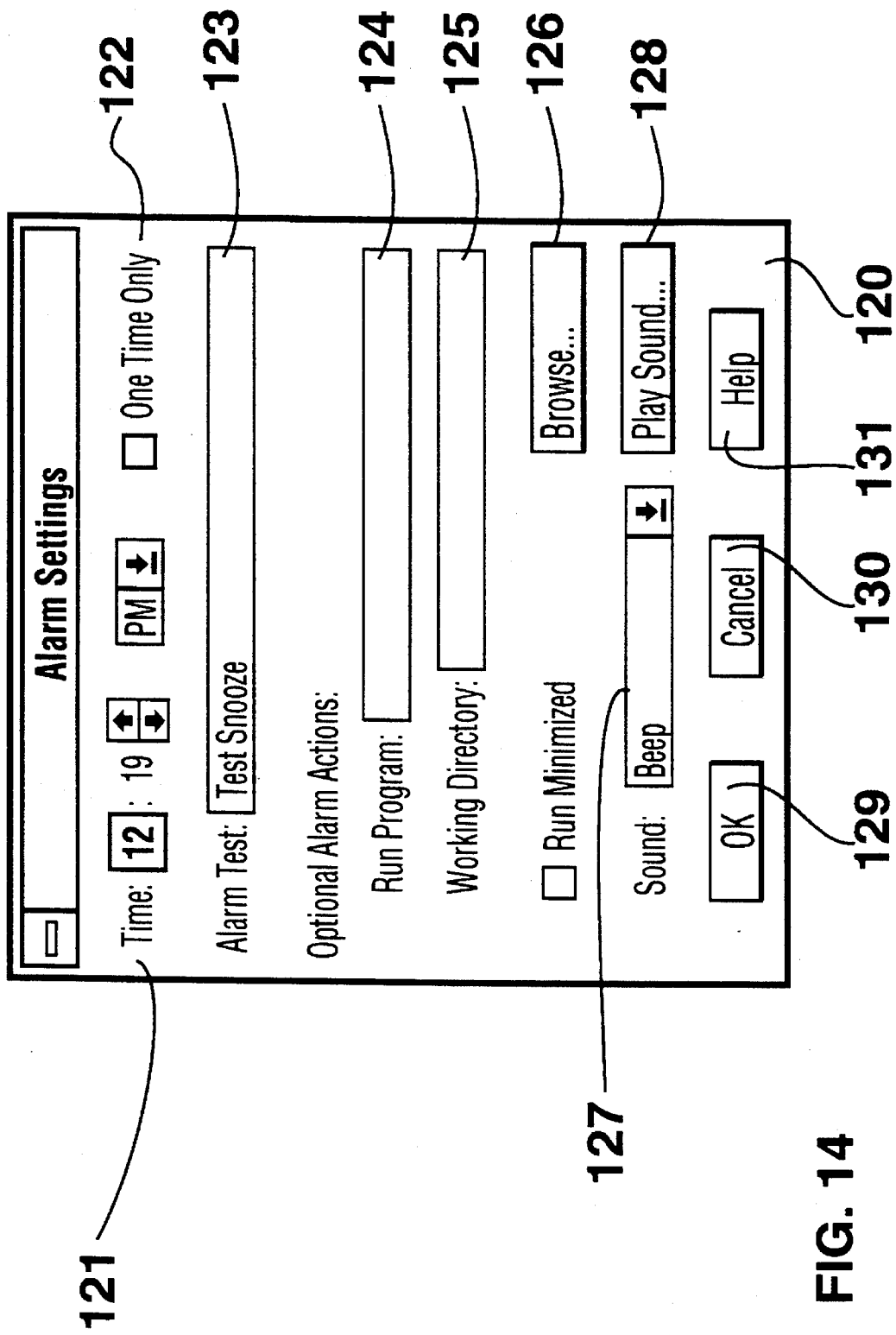
Figure 15:
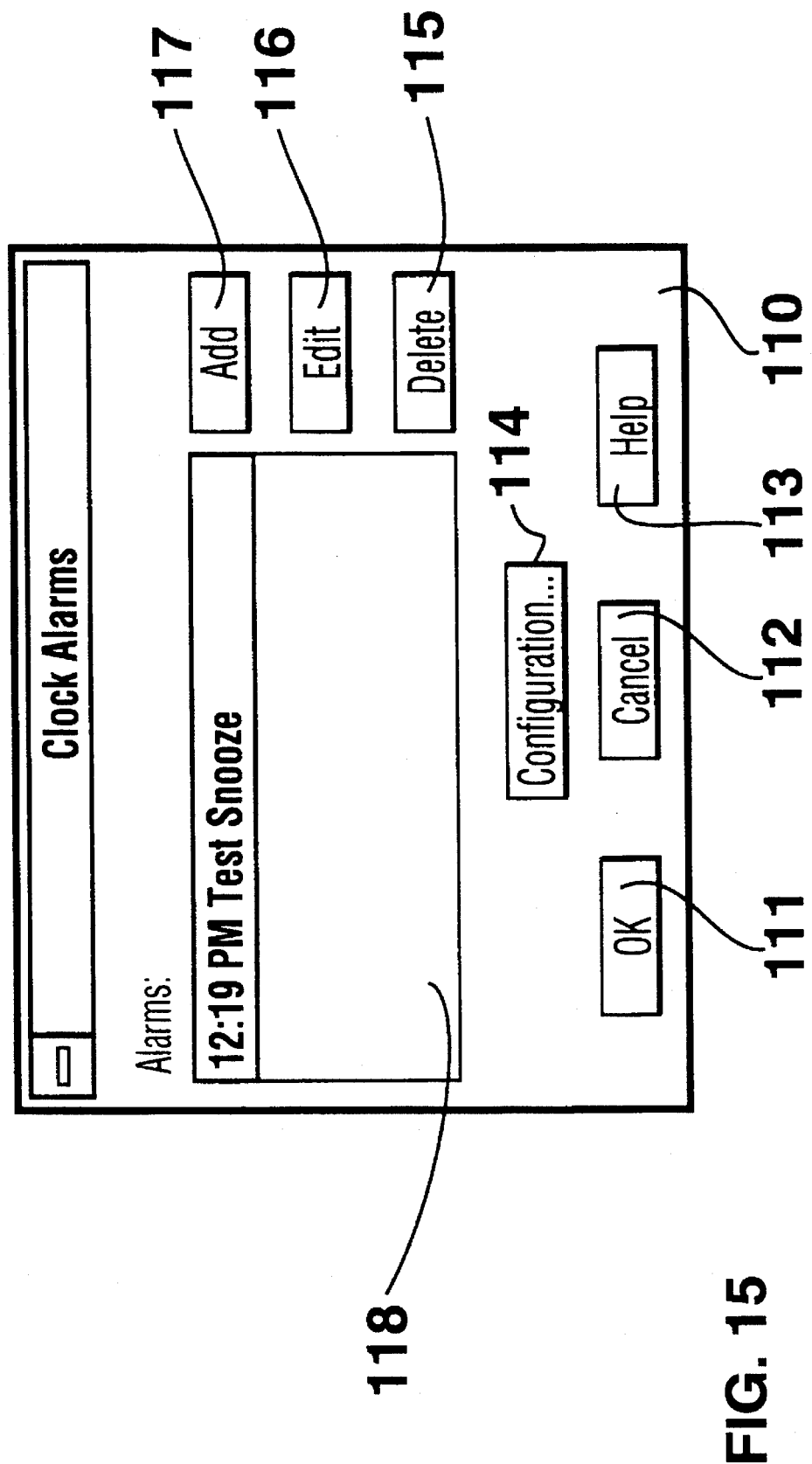

Upon selection of add button 117 using cursor 56 and mouse button 62, an alarm settings window 120 appears, as shown in FIG. 14. The alarm time is set using an time set regions 121. If the alarm is only to go off one time, box 122 is selected. An alarm text is typed into box 123. The user has typed "Test Snooze" into box 123 by the user. A run program box 124 may be used to type in a program execution file to be started upon the alarm being called. A working directory for the program may be listed in box 125. A browse button may be selected to browse the file directories. Various sounds for the alarm may be selected using box 127. Play sound button 128 may be used to play back the selected sound. Alarm settings window 120 also includes an OK button 129, a cancel button 130 and a help button 131. Upon selecting the OK button, "Test Snooze" is now added to listing 118, as shown in FIG. 15. The listing shows 12:19 PM as the alarm set time. Also an alarm mini-window 136 appears in mini-program window 35.

Figure 16:
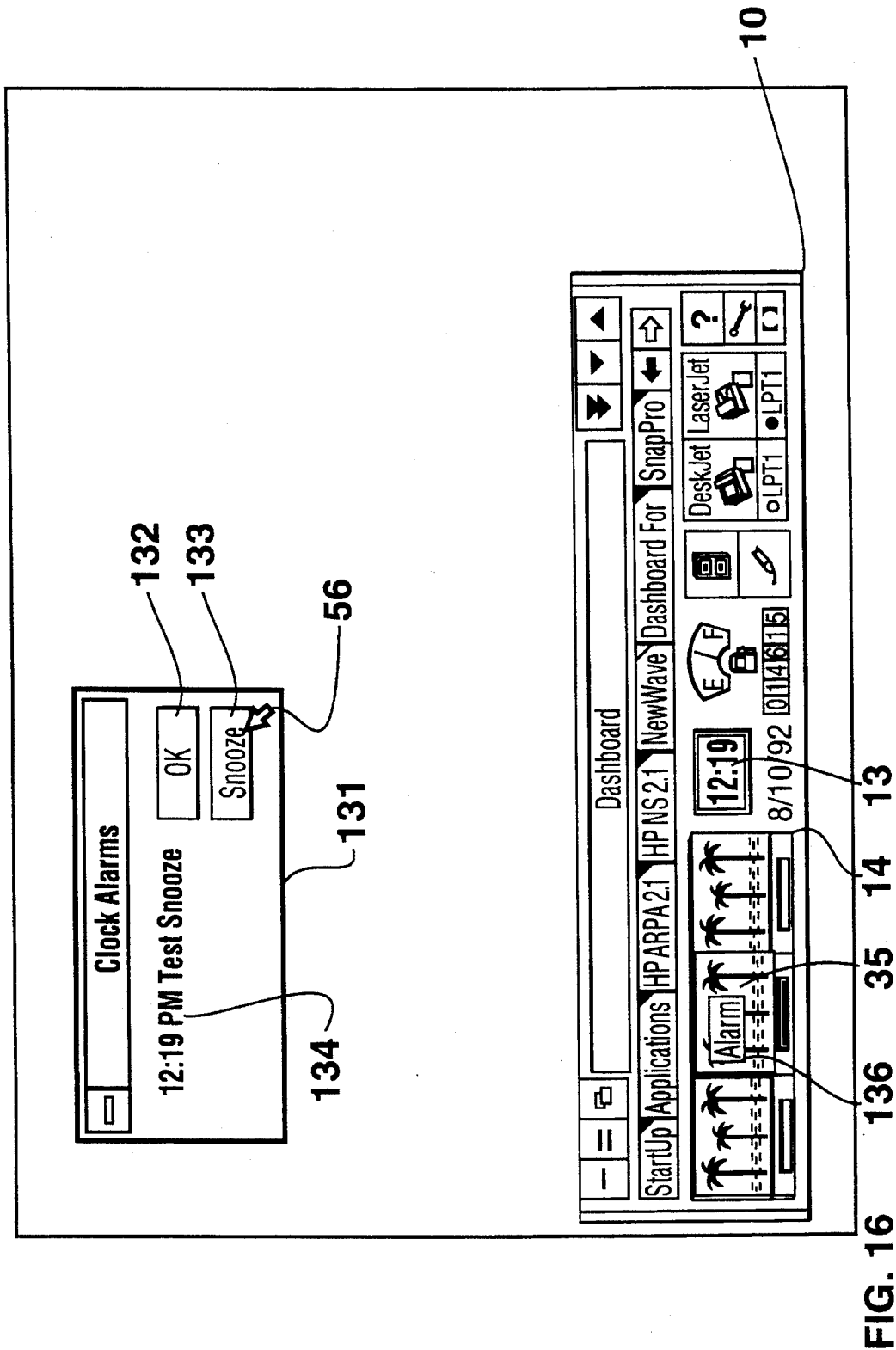
Figure 17:
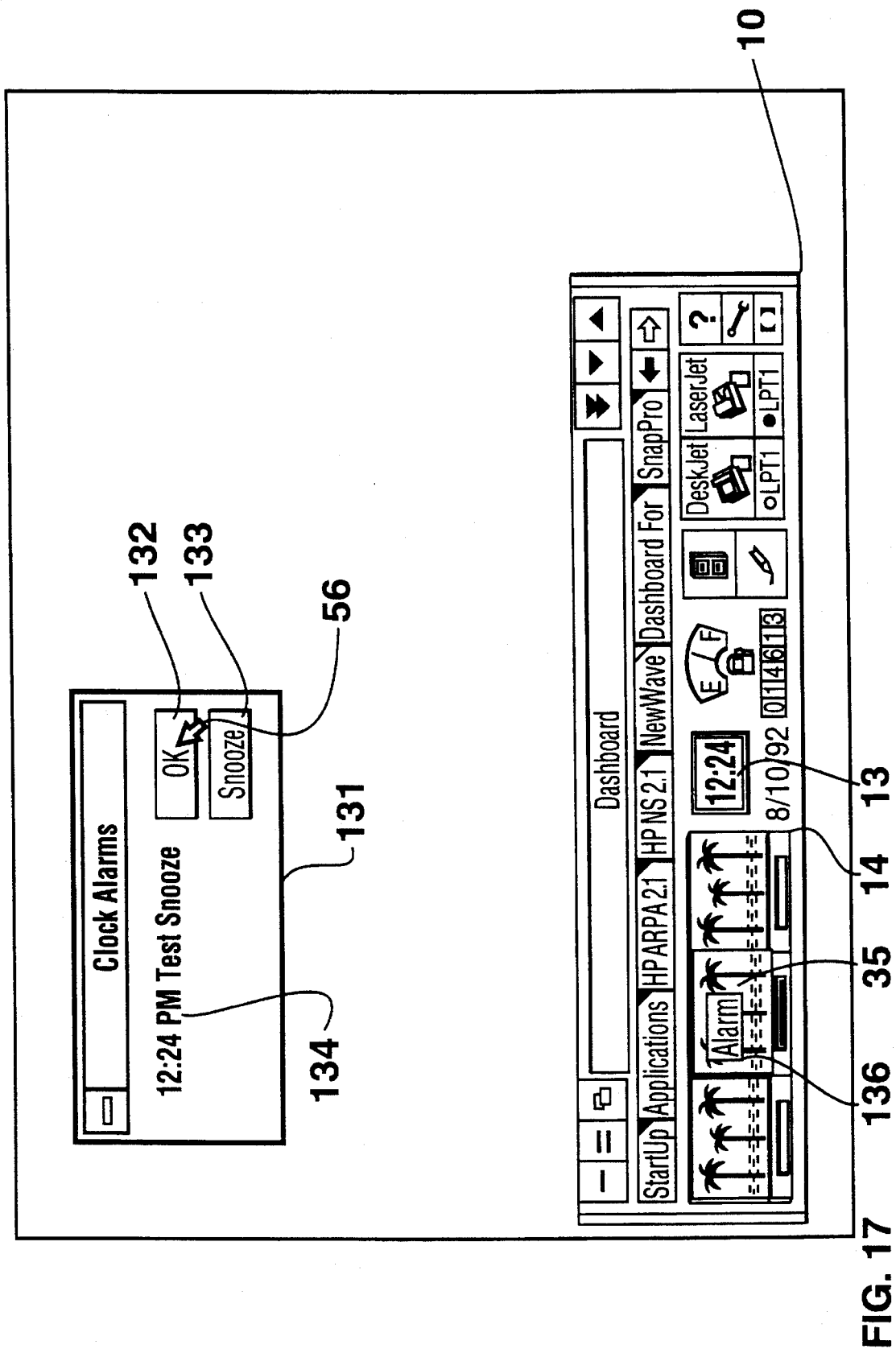
Figure 18:
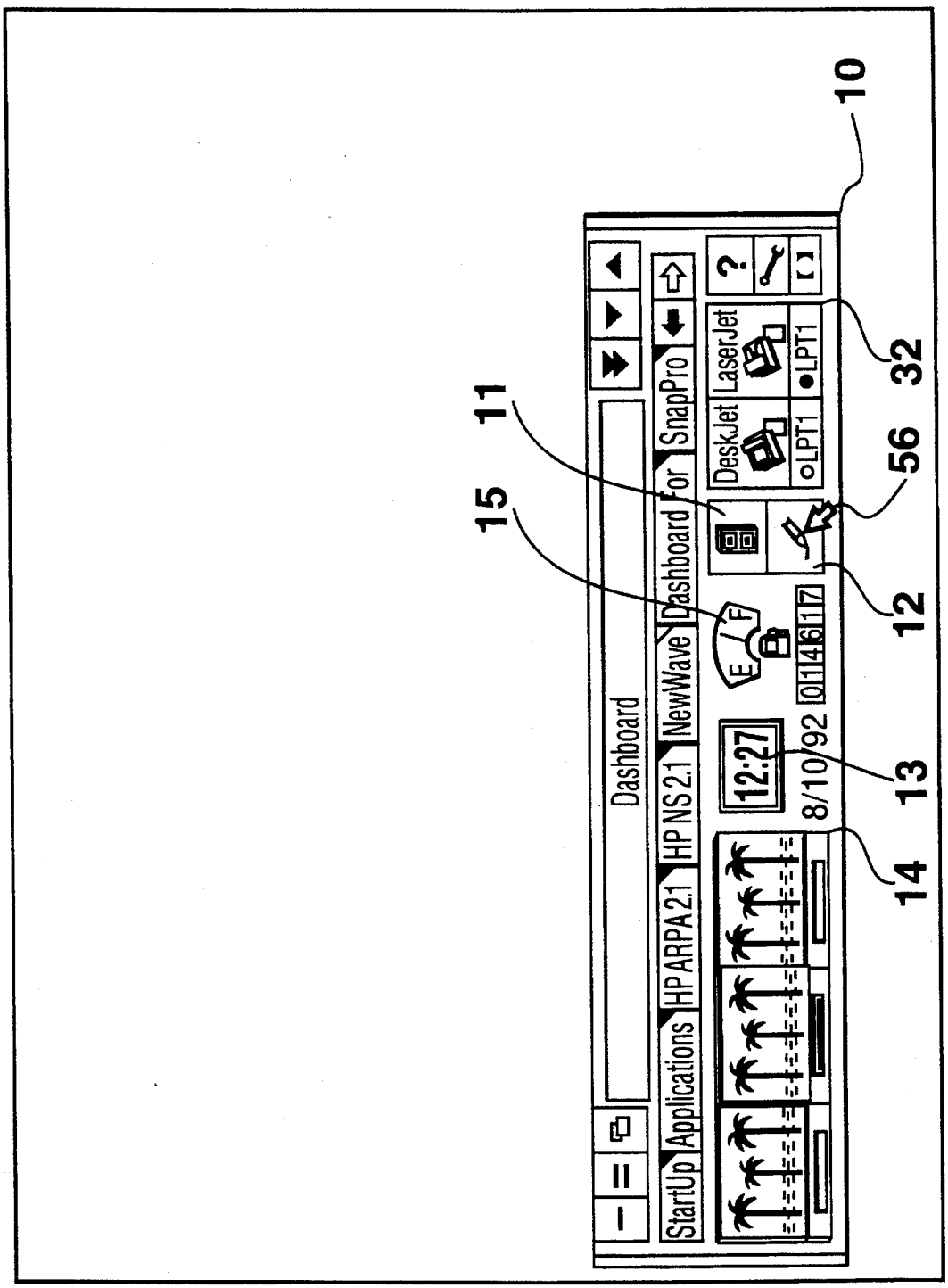

As shown in FIG. 16, at 12:19 PM, an alarm window 131 appears. Alarm window 131 includes an alarm text 134, an OK button 132 and a snooze button 133. Using cursor 56 and mouse button 62 to select snooze button 133 (or pressing "S" on the keyboard) results in alarm window 131 disappearing for the snooze interval shown in box 103 of FIG. 7. At the end of the snooze interval alarm window 131 re-appears, as shown in FIG. 17. Using cursor 56 and mouse button 62 to select OK button 132 results in alarm window 131 disappearing, as shown in FIG. 18.

Figure 19:
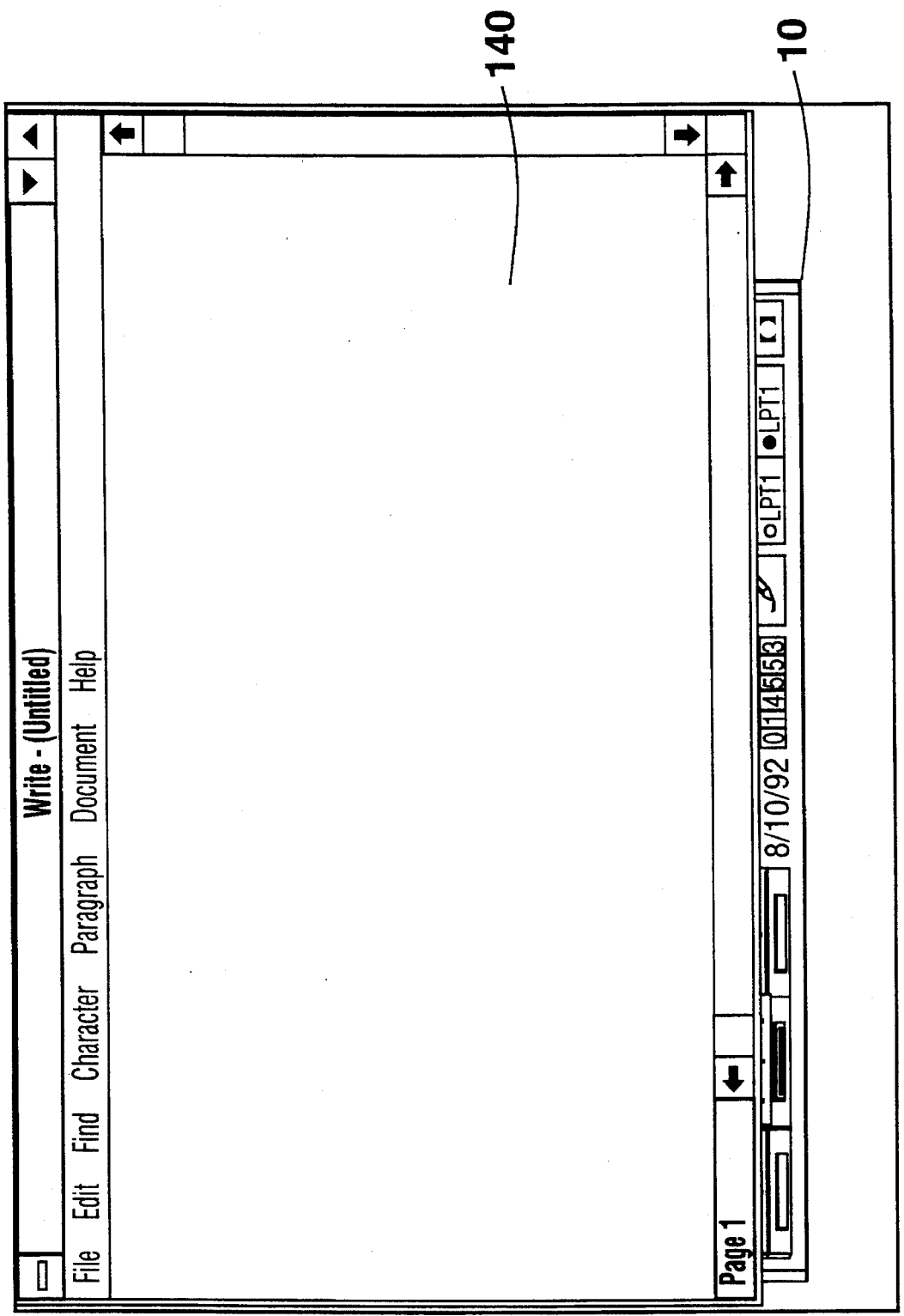

Quick launch button 11 and quick launch button 12 may be used to quickly launch applications. For example, by placing cursor 56 over quick launch button 12 and once clicking mouse button 62, the program MS Write is launched. This is shown in FIG. 19 where a window 140 for the program MS Write appears.

You can set up a quick launch button to load a data file at the same time it launches the program. To do this, enter the name of the data file as part of the command line in the quick launch preferences window.

Figure 20:
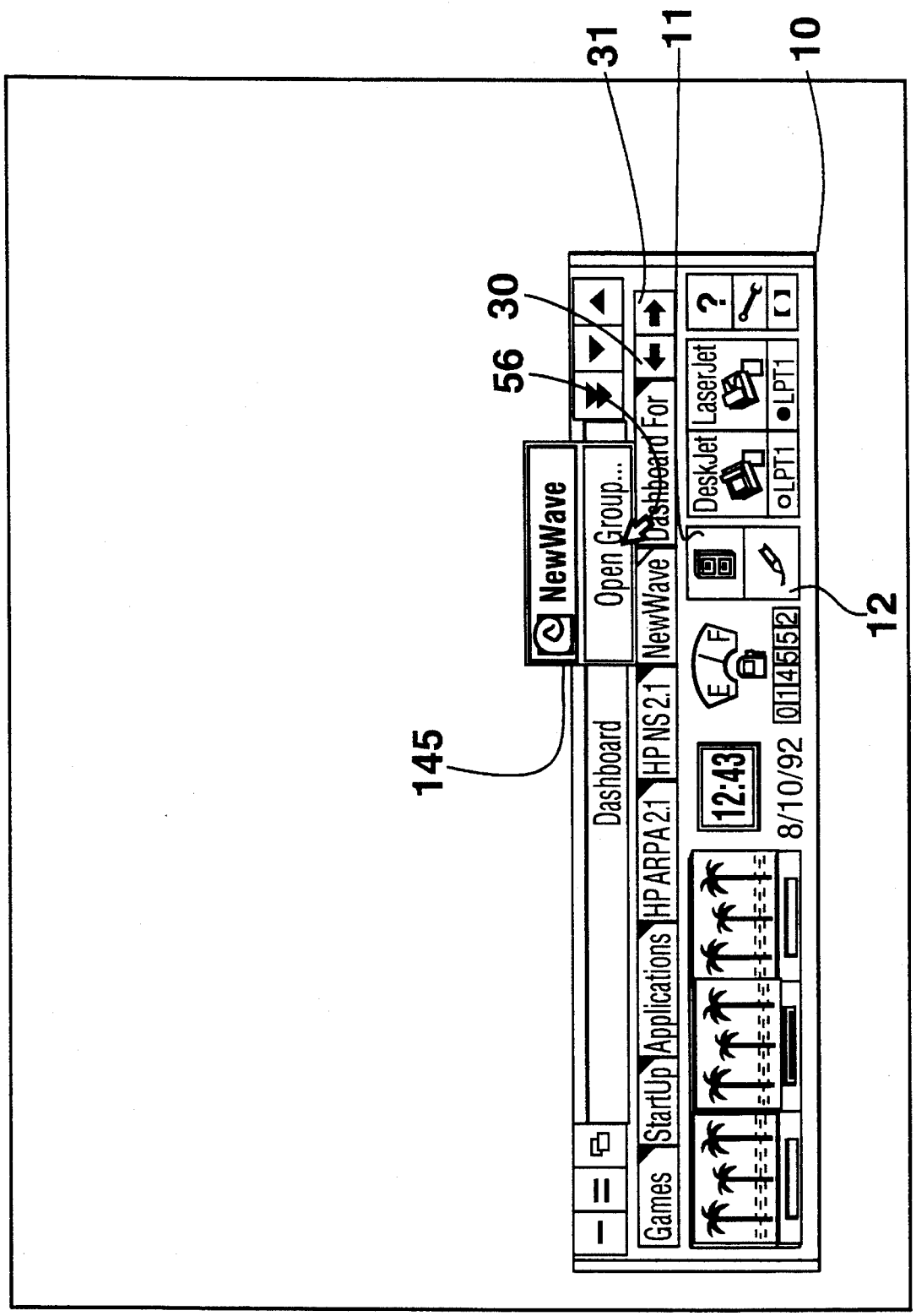

Adding a quick launch button is simple to do. For example, in FIG. 20, by placing cursor 56 over program group button 25 and clicking mouse button 62, a listing of executable programs in NewWave group is shown. In FIG. 20, program group tabs have been shifted to the left by clicking button 62 while cursor 56 was placed over shift button 30.

Figure 21:
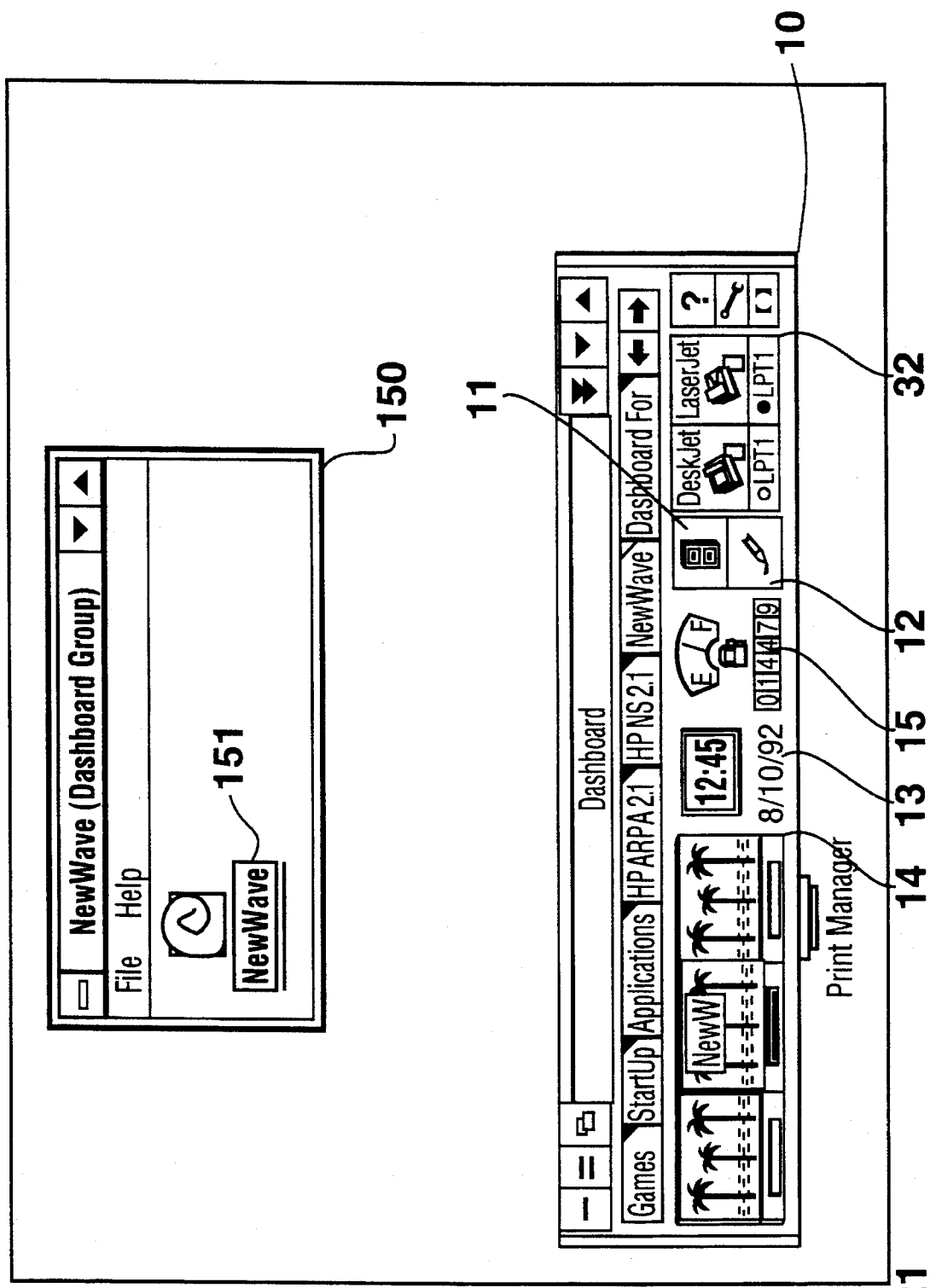

Placing cursor 56 over the tag "Open Group" and clicking button 62 results in the appearance of a NewWave (Dashboard Group) window 150, as shown in FIG. 21. Within the NewWave window 150 is an icon 151 for the NewWave application.

Figure 22:
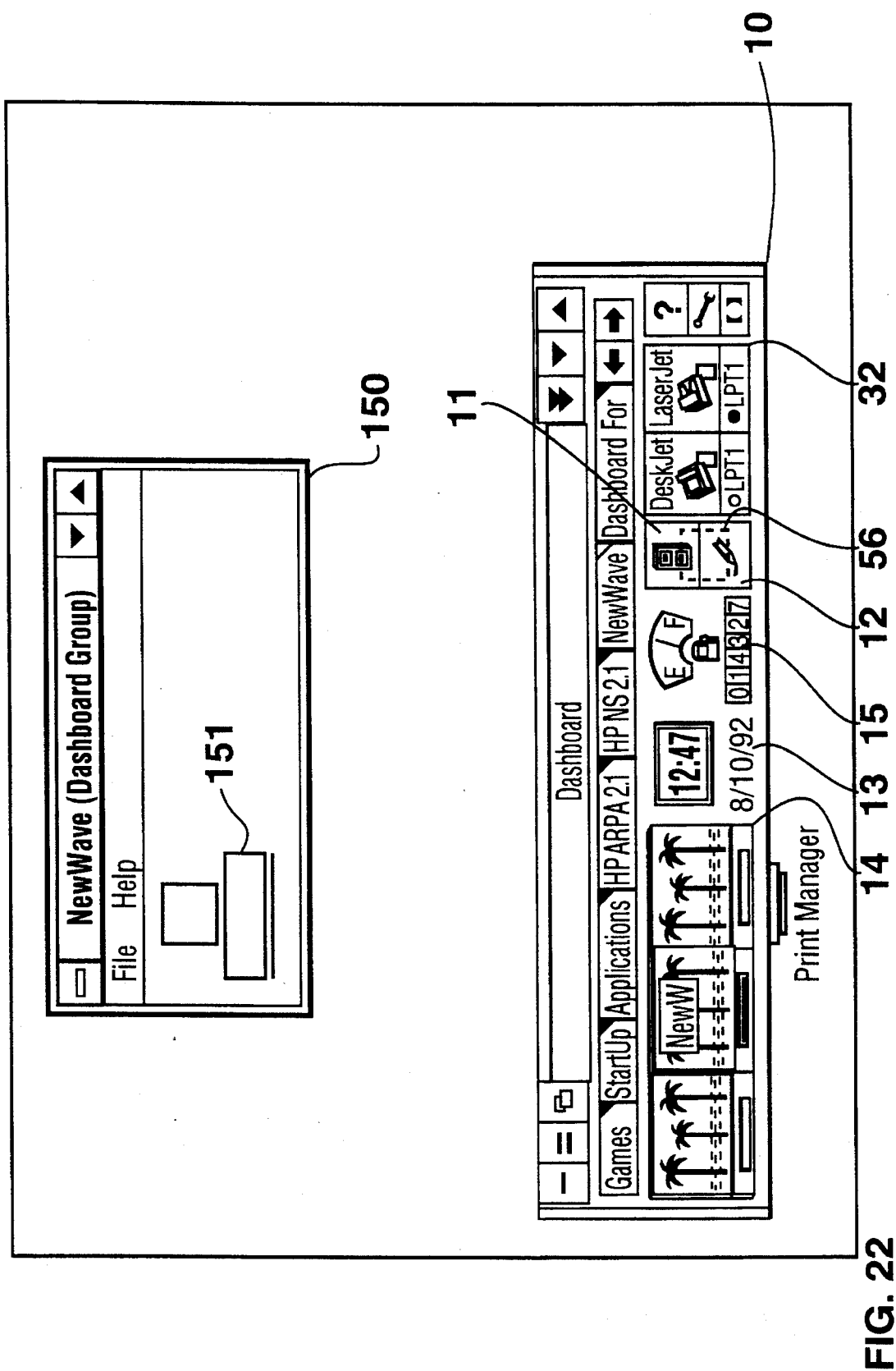
Figure 23:
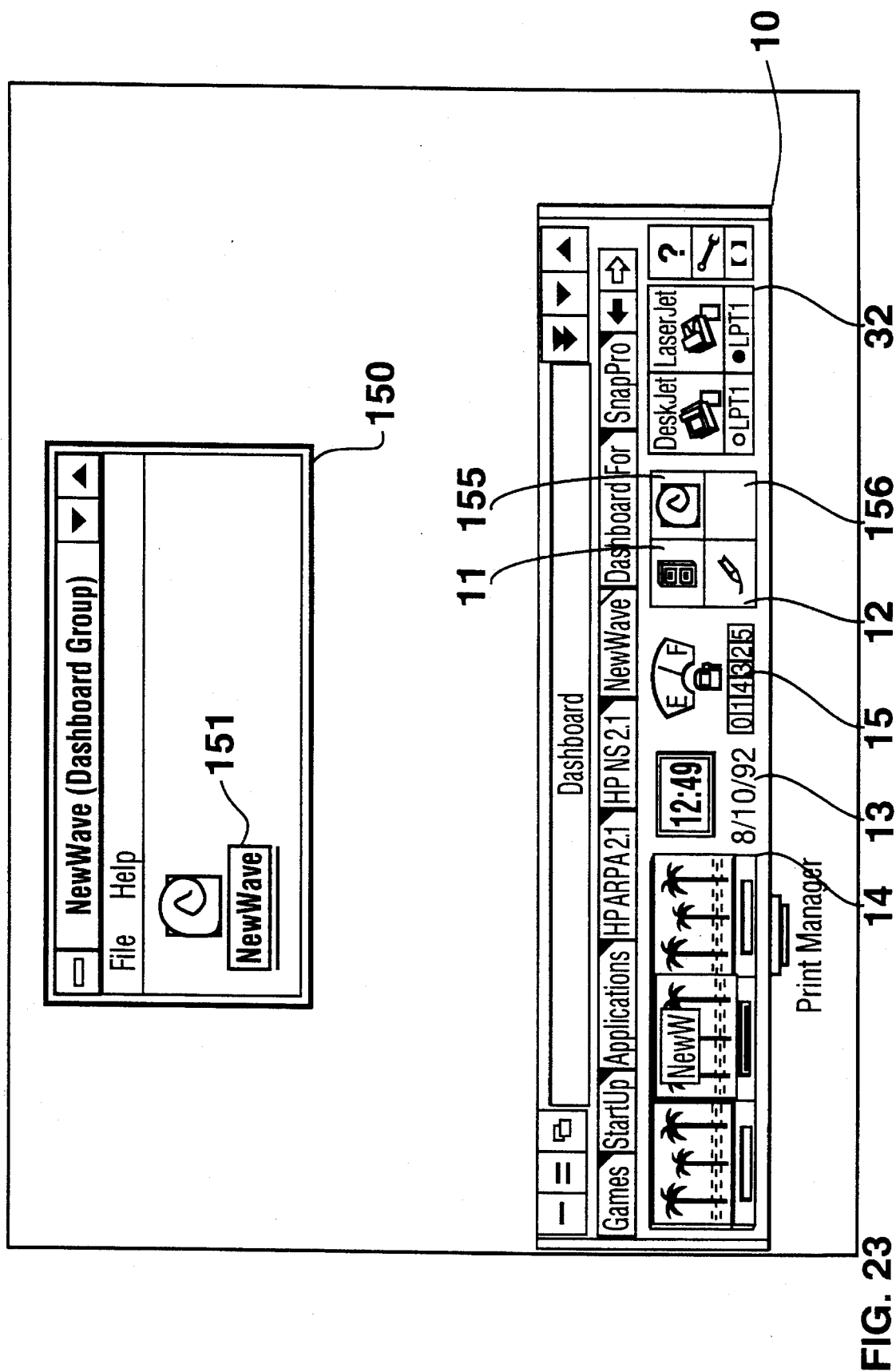

Cursor 56 may be placed over icon 151 and mouse button 62. Then mouse 60 may be moved so as to place cursor 56 over the area of dashboard 10 occupied by quick launch button 11 and quick launch button 12. When this is done, as shown in FIG. 22, cursor 56 appears as a box with dashed lines. Upon releasing mouse button 62, a new quick launch button 155 appears for the NewWave Application, as shown in FIG. 23. A blank quick launch button location 156 also appears. Blank quick launch button location 156 is the location into which the next added quick launch button will be placed.

Alternately, a new quick launch button can be added as follows: From quick launch preferences window 90, select new button 92. In the window that appears, enter a descriptive title for the program in the title box. It does not have to be the program's real title. It can be anything. In the command line box, enter the path and file name for that program, with other command-line information necessary. Enter the information in the working directory box. Select the browse button to select the program's path and file name as the command line. If the program contains an icon file, its icon appears on the quick launch button by default. Select the change icon button to change the default icon. To add another quick launch button, select new button 92 again and then repeat the process. The new quick launch buttons will appear on dashboard interface 10.

Figure 24:
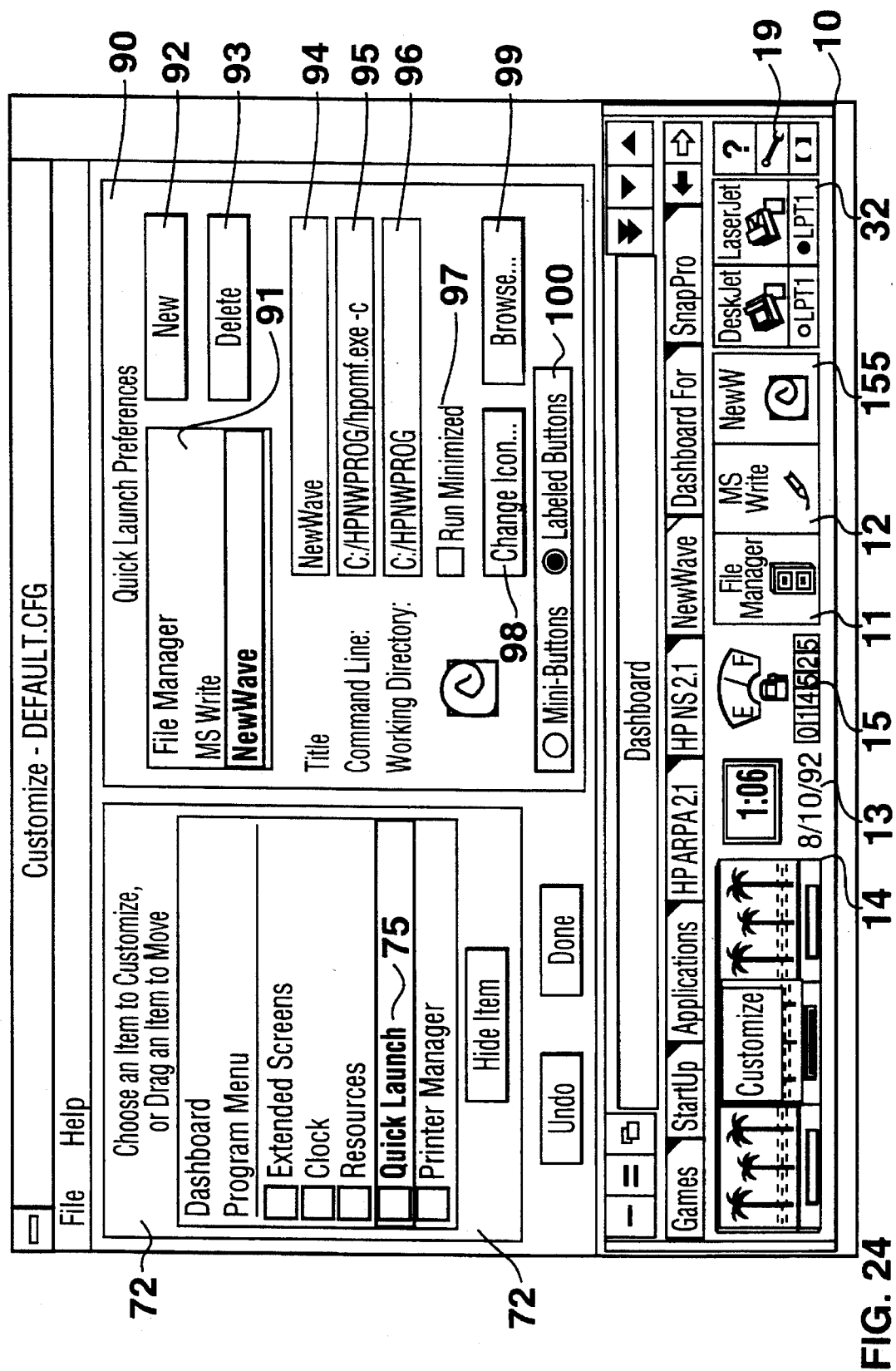

In FIG. 24, by selecting customize button 19, customize window 71 has been brought up. After selecting quick launch listing in customize menu 72, box 100 has been used to select labeled buttons. The result is that quick launch button 11, quick launch button 12 and quick launch button 155 are now larger and include a label.

The application order shown in application listing 91 determines the left to right ordering of quick launch buttons 11, 12 and 155. The relative position of the quick launch buttons may be changed by placing cursor 56 over a listing in application listing 91, depressing mouse button 62, dragging the listing to a new position, and then releasing mouse button 62.

Figure 25:
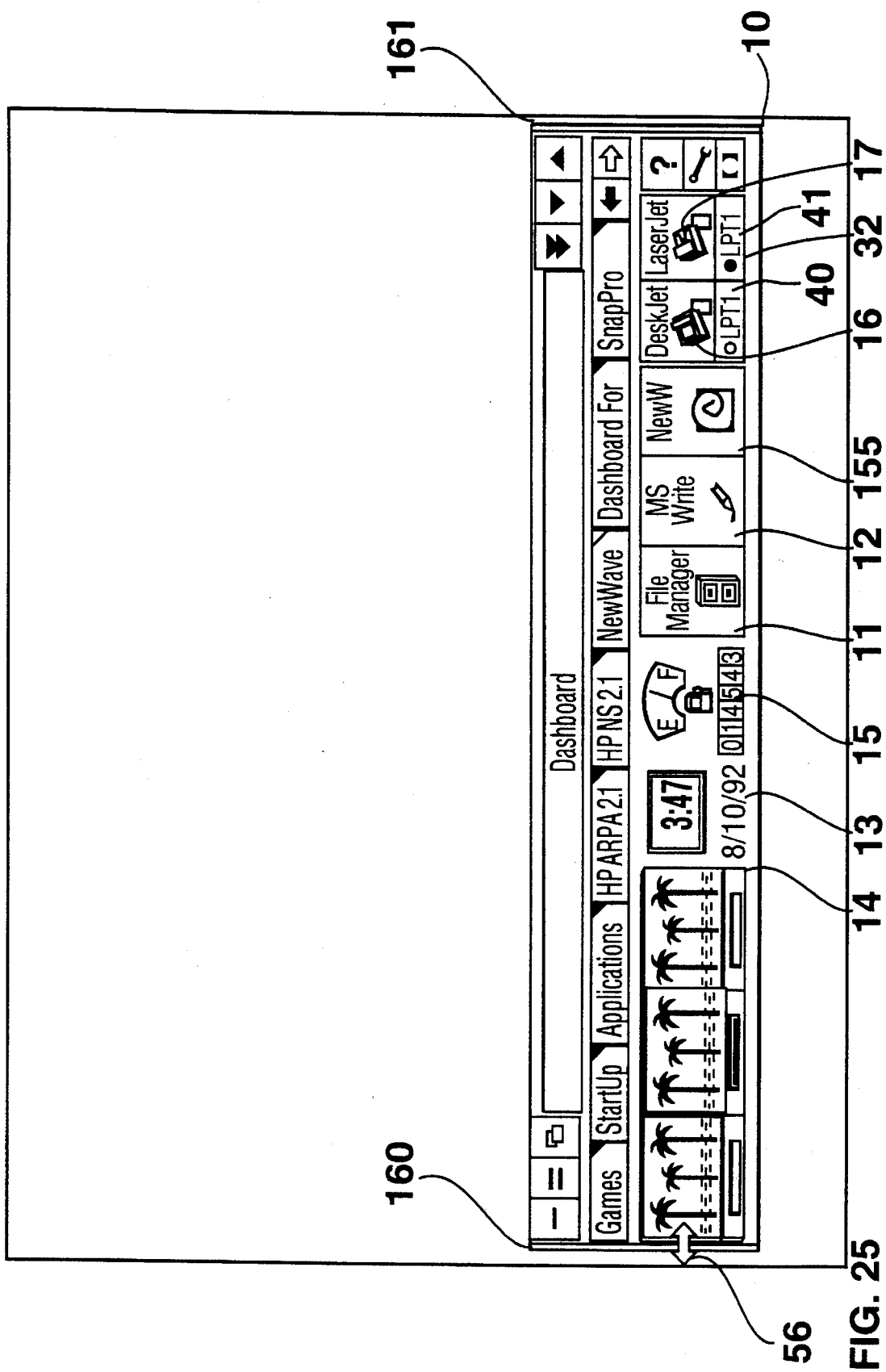

Bar 160 and bar 161 are used to change the horizontal size of dashboard interface 10. As shown by FIG. 25, when cursor 56 is placed over bar 160 or bar 161, cursor 56 changes shape so as to include two arrows pointing horizontally in opposite directions. By depressing mouse button 62 and moving cursor 56, the horizontal size of dashboard interface 10 is adjusted.

Figure 26:
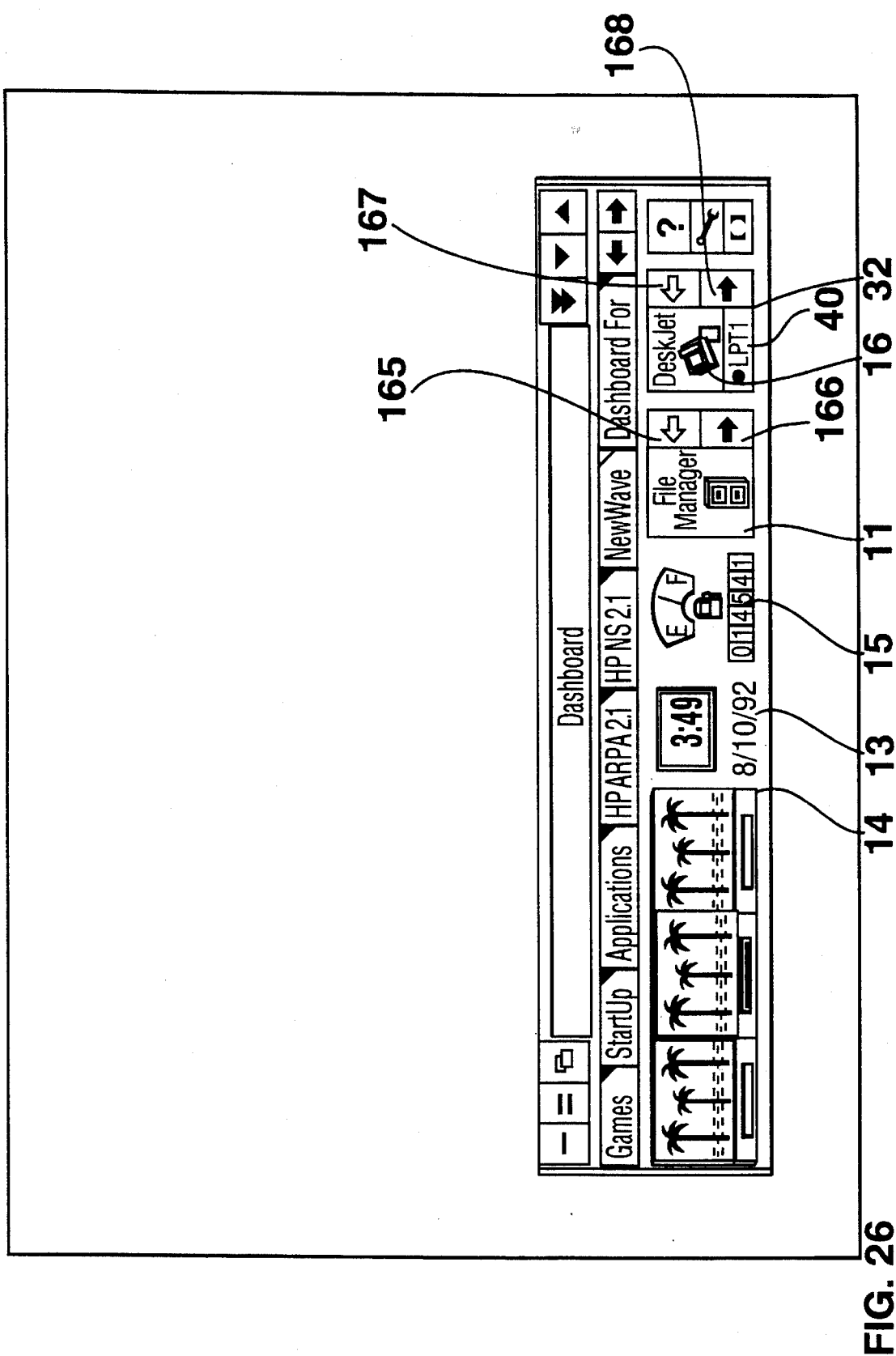

For example, in FIG. 26 dashboard interface 10 has been reduced in size. In order to do this only one quick launch button, quick launch button 11, is displayed. The other quick launch buttons may be accessed using scroll button 165 and scroll button 166. Additionally only one printer icon, printer icon 16, is displayed. The printer icon which is not shown may be accessed using scroll button 167 and scroll button 168.

Figure 27:
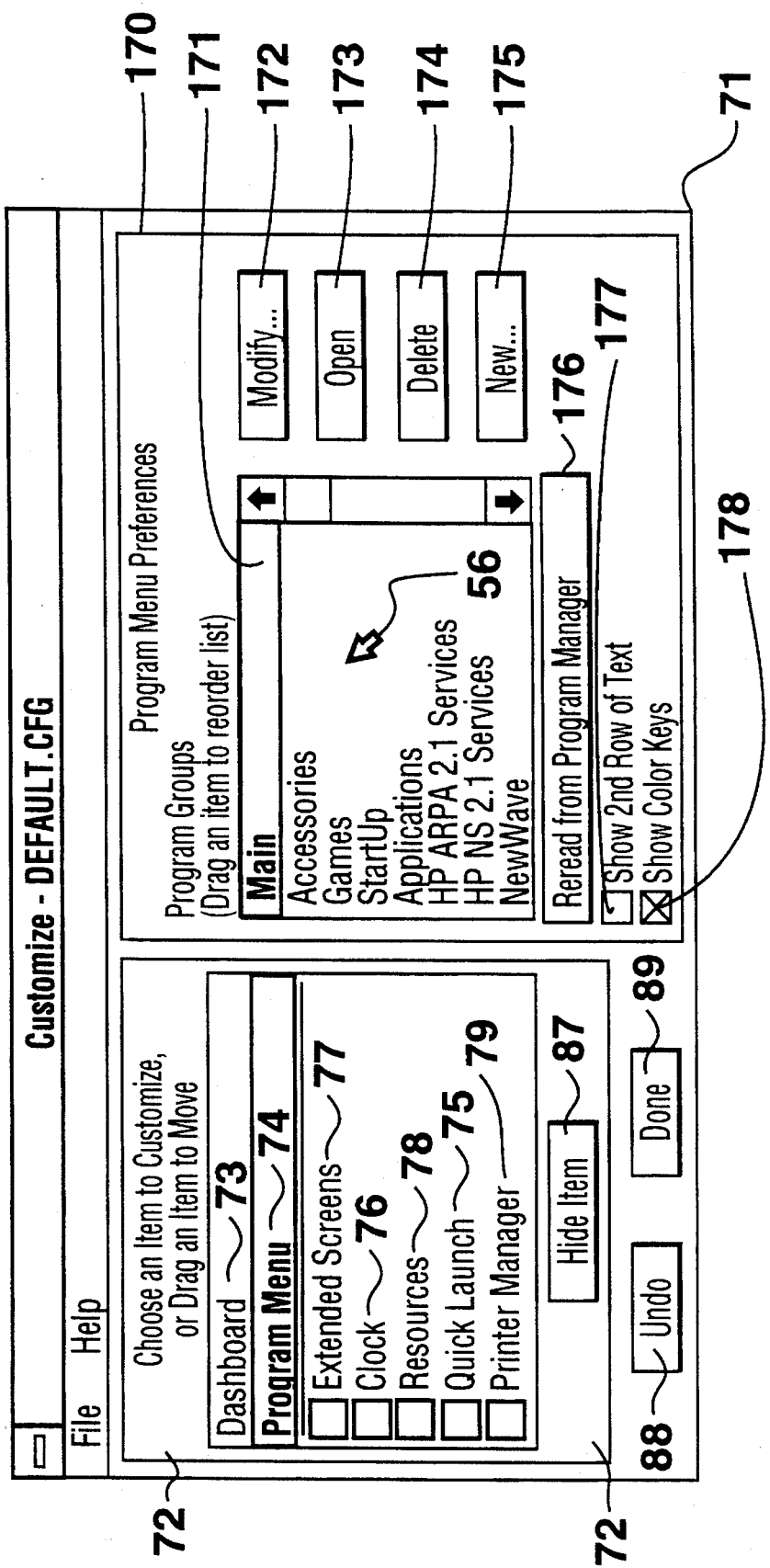

FIG. 27 shows customize window 71. Program menu listing 74 is selected from customize menu 72. Therefore the program menu preferences window 170 is displayed. A program groups listing 171 shows program groups which are listed within program menu 50. The order in which listings appear in program groups listing 171 determines the order in which program group buttons are displayed in program menu 50. To move a program group button in program menu 50, place cursor 56 over the associated listing in program groups listing 171, depress mouse button 62, drag the listing to a new position in program groups listing 171, and release mouse button 62.

Figure 28:
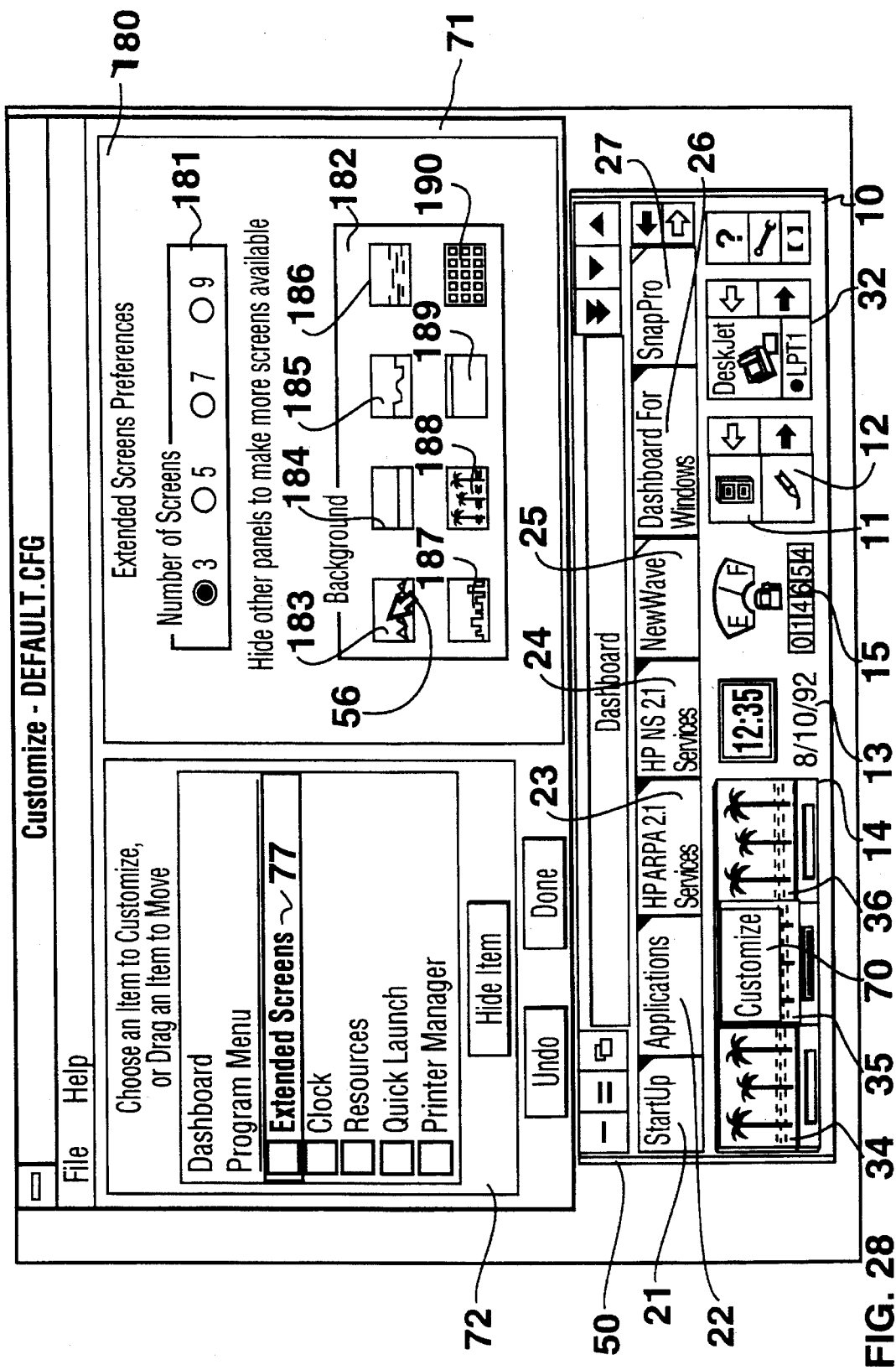

Selection of a modify button 172 brings up a modify program group window which allows changes to be made in the group description, color key and group file of the selected program group. Selection of an open button 173 opens a window for the selected program group. Selection of a delete button 174 results in deletion of the selected program group. Selection of a new button 175 opens a new program group window which allows creation of a new program group tab. Selection of a reread button 176 cause a read of program groups by the program manager. Selection of a box 178 causes program menu 50 each to include a color coded region. A selection of a box 177 results in the vertical expansion of each of program group button in program menu 50 to show a second row of text. FIG. 28 shows each of the program group buttons in program menu 50 expanded to show a second row of text.

Dashboard interface 10 facilitates opened or iconized applications being easily and quickly arranged in three, five or seven extended screen areas. Extended screen display 14 displays miniature versions (i.e. mini-program windows) of multiple full-screen views making it possible to manage several different views of programs simultaneously. The extended screens are also interactive, that is opening or closing an application is automatically reflected by extended screen display 14. When items in extended screen display 14 are moved are resized, the corresponding full-screen views are changes too.

FIG. 28 shows program menu listing 77 selected from customize menu 72. Therefore, extended screens preferences window 180 is shown. Number of screens selection box 181 allows a user to select a number of extended screens to be displayed by extended screen display 14. A background box 182 allows a user to select background for mini-program window 34, mini-program window 35, and mini-program window 36. Background box 182 includes a background 183, a background 184, a background 185, a background 186, a background 187, a background 188, a background 189 and a background 190. For example, background 183 is selected by placing cursor 56 over background 183 and depressing mouse button 62.

Figure 29:
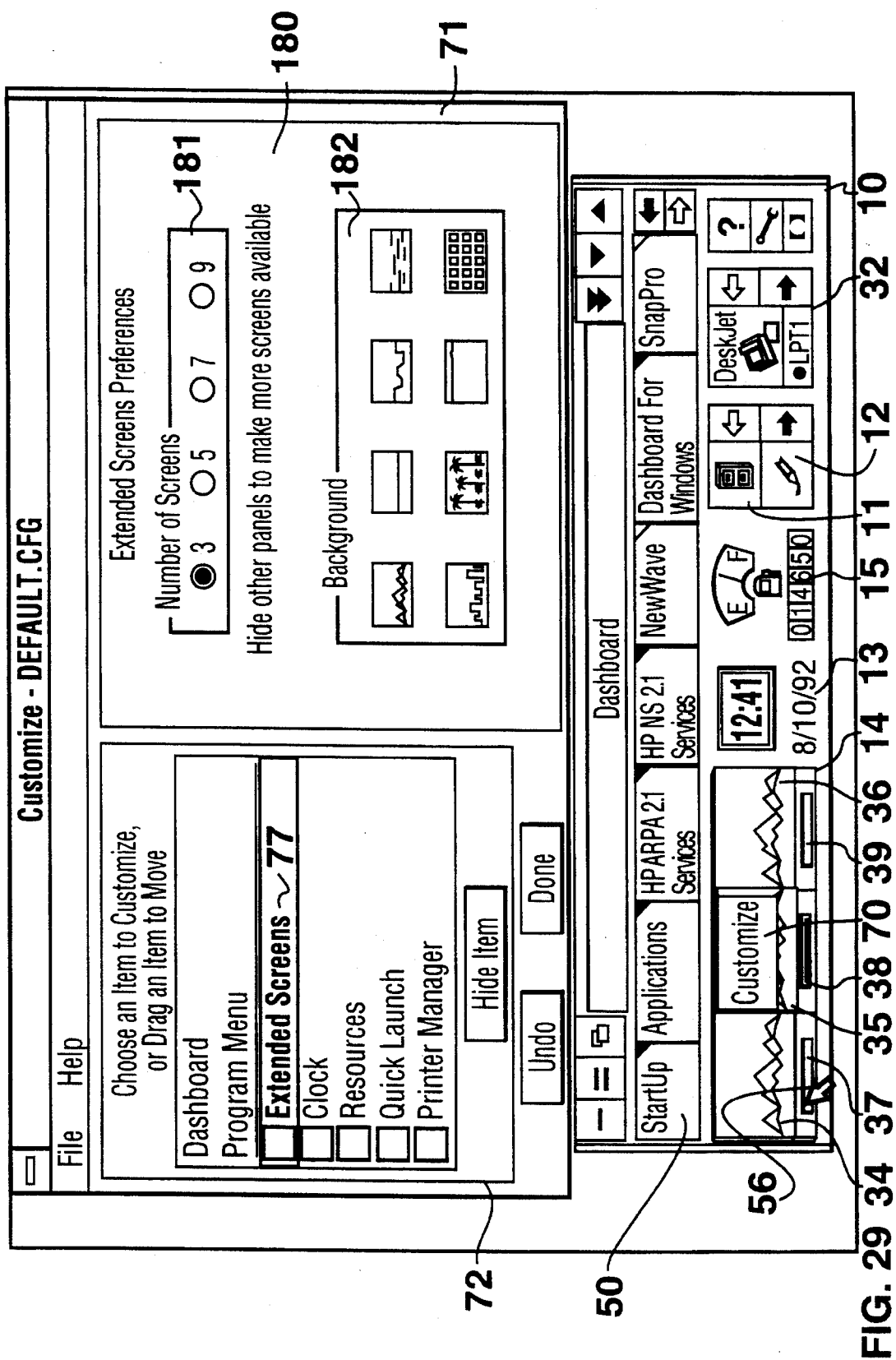

In FIG. 29, mini-program window 34, mini-program window 35, and mini-program window 36 are shown with background 183. A highlight in selection bar 38 indicates that mini-program window 35 is the active (i.e. the displayed) screen. Also, the mini-program window for the active screen is highlighted. As is seen from FIG. 29, mini-window 70 represents customize window 71. To select the screen represented by mini-program window 34, cursor 56 is placed over selection bar 37 and mouse button 62 is clicked.

Figure 30:
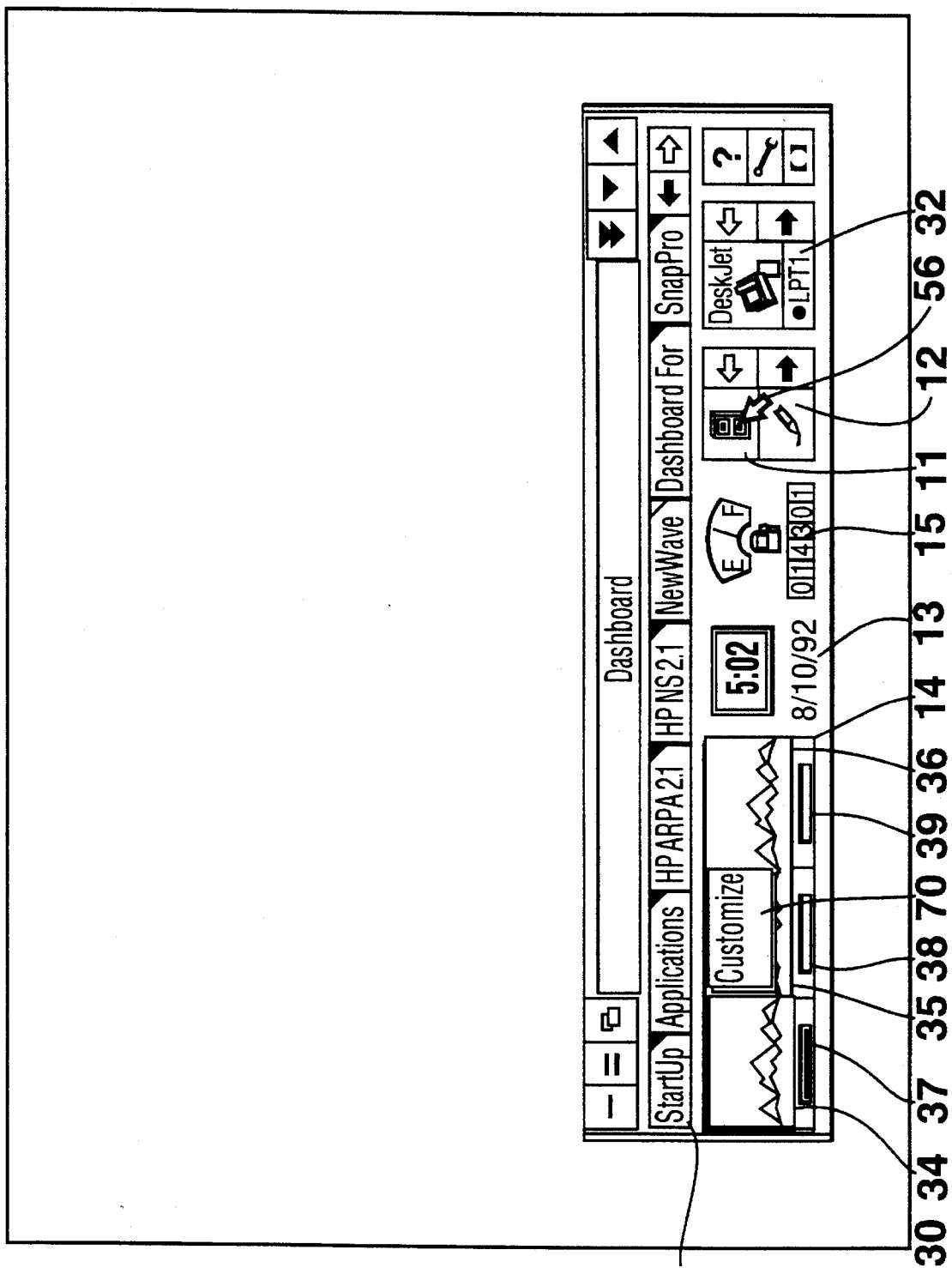

As shown in FIG. 30, a highlight in selection bar 37 indicates that mini-program window 34 shows the displayed screen. A program may be opened within the displayed screen, for example, by placing cursor 56 over quick launch button 11 and clicking mouse button 62.

Figure 31:
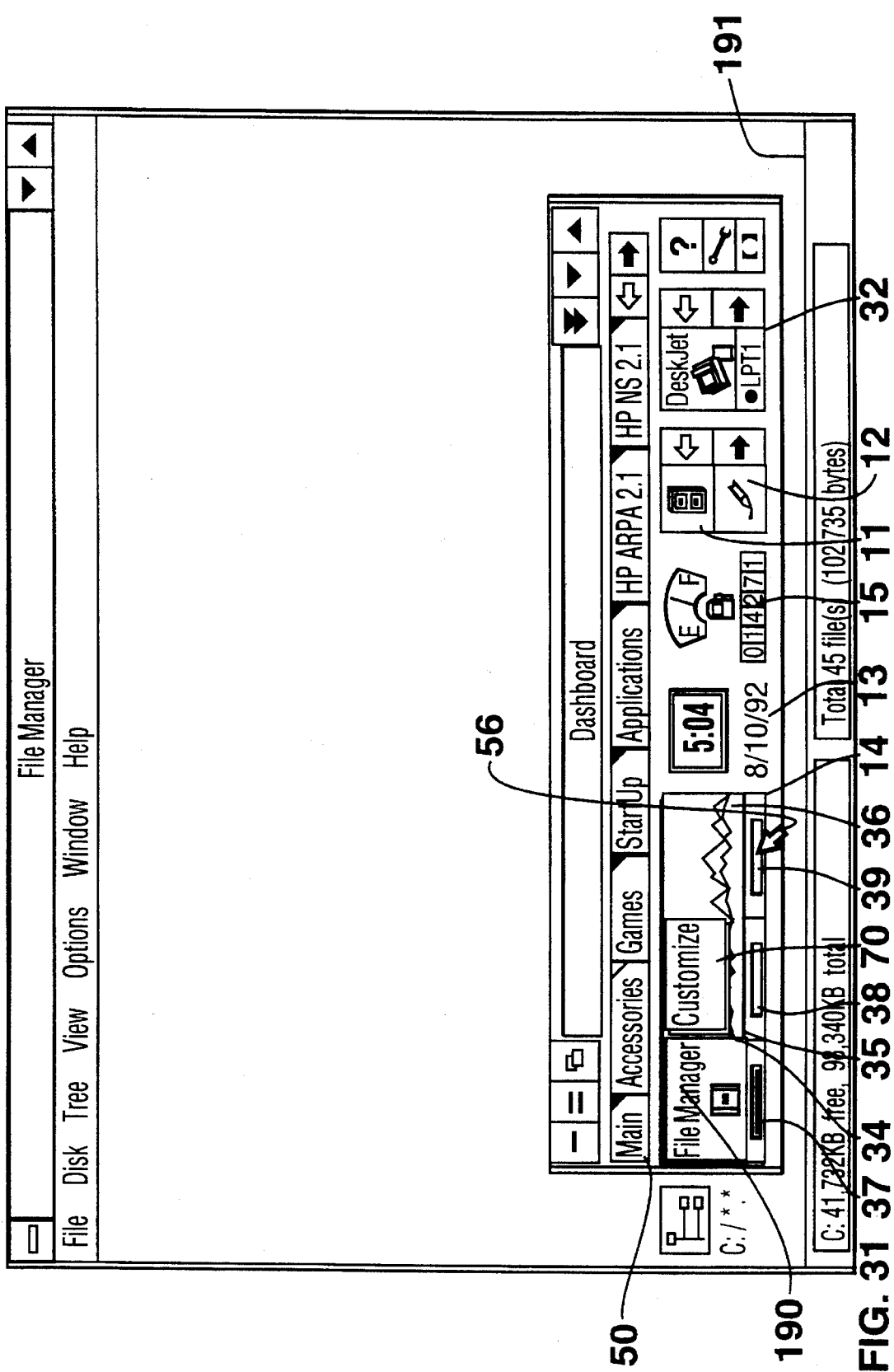

As shown in FIG. 31, clicking quick launch button 11 results in the opening of a File Manager window 191. Dashboard interface 10 has been brought to the front of the display by selecting function key 12 (F12) on the keyboard, as specified in box 81 of dashboard preference window 80 (shown in FIG. 4). An associated mini-window 190 is shown in mini-program window 34. Placing cursor 56 over selection bar 39 and clicking mouse button 62 results in selection of the screen represented by mini-program window 36.

Figure 32:
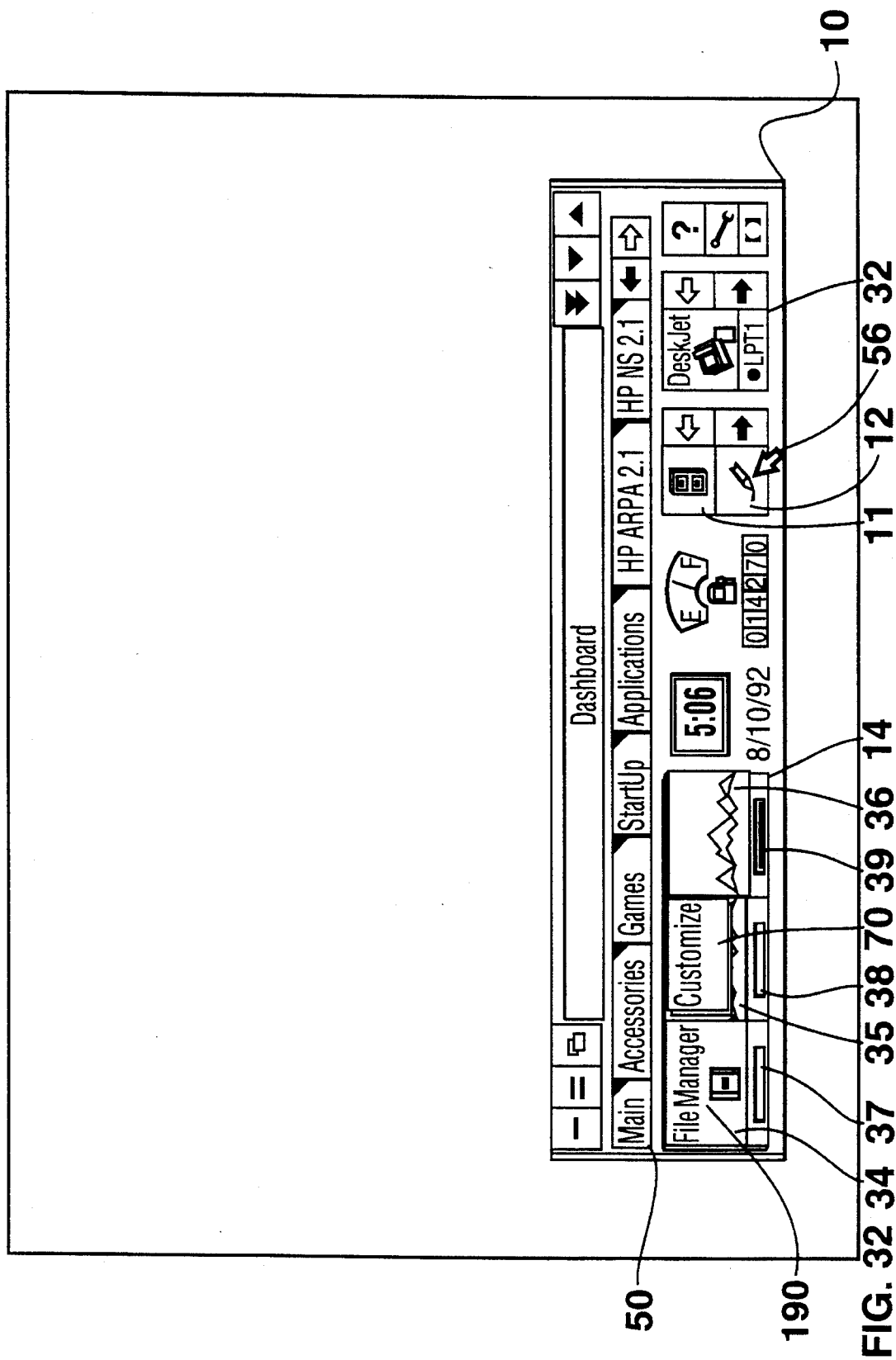
Figure 33:
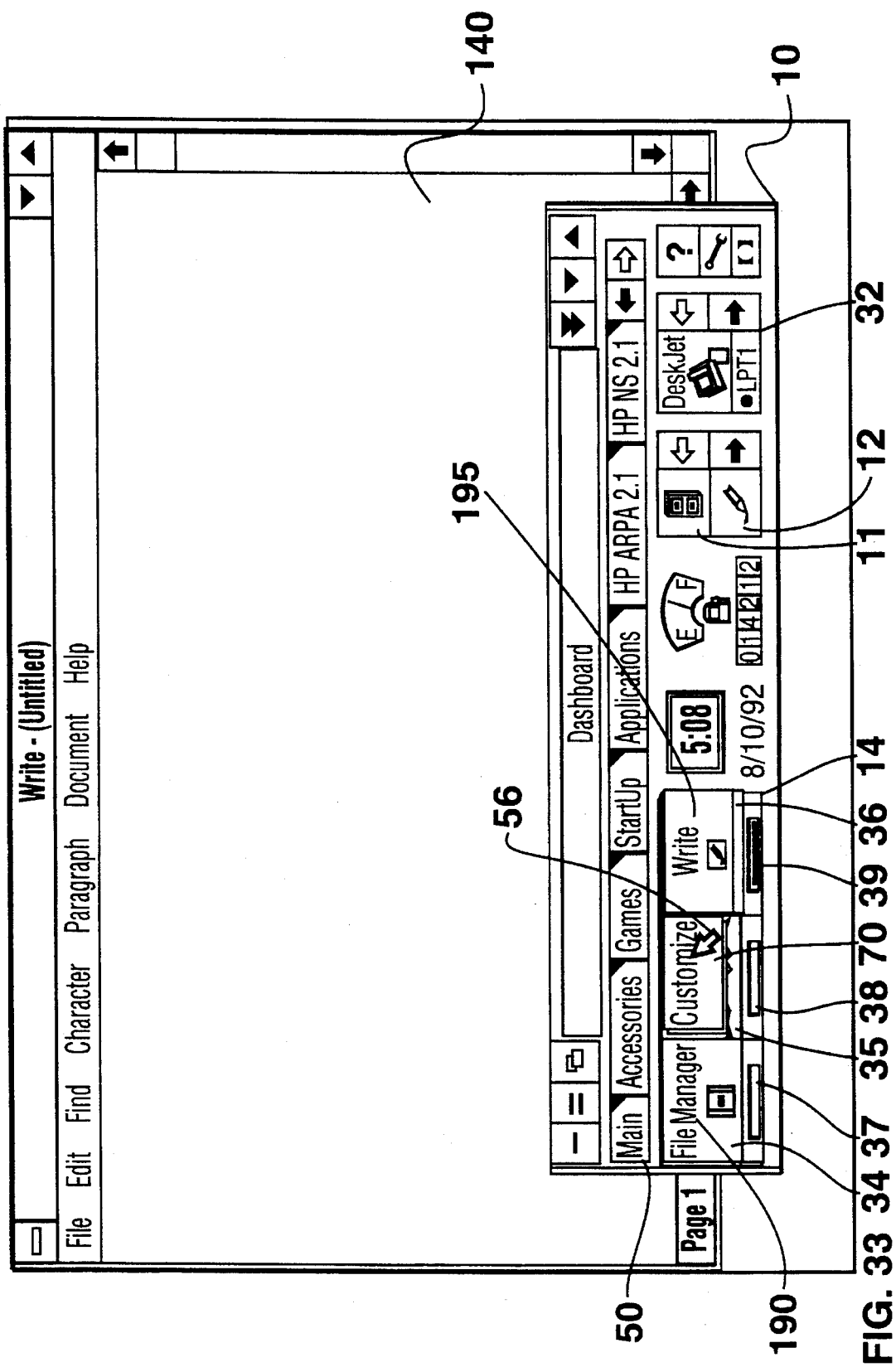

FIG. 32 shows a display of the screen represented by mini-program window 36. The highlight in selection bar 39 indicates the selection. Placing cursor 56 over quick launch button 12 and clicking mouse button 62 results in a launch of MS write and the appearance of window 140. An associated mini-window 195 appears in mini-program window 36. Each mini-window represents an open program. The size and location of the mini-window on the extended screen are proportional to that program window on the real screen. Moving the mini-window will move the program window on the screen. As seen in mini-window 190 and mini-window 195, shown in FIG. 33, when a mini-window is sufficiently large, an icon for the represented program appears as well as the name of the program.

Placing cursor 56 over mini-window 70 and clicking mouse button 62 makes customize window 71 the active window. Placing cursor 56 over mini-window 70 and twice clicking mouse button 62, makes customize window 71 the active window and displays customize window 71.

Figure 34:
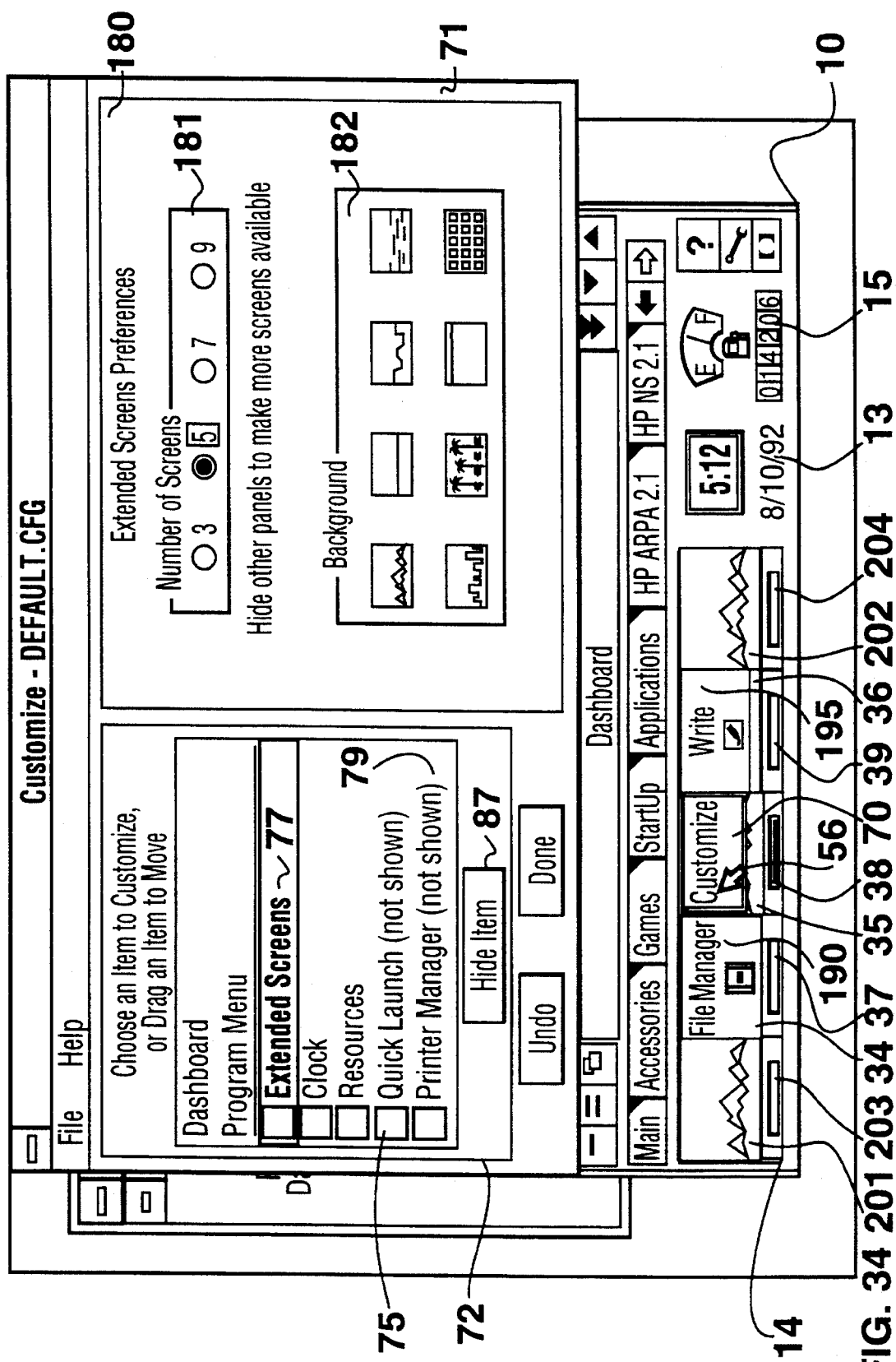

In FIG. 34, customize window 71 is active and displayed. Using hide/show item button, quick launch buttons 11 and 12, and printer manager 32 have been removed from dashboard interface 10. Number of screens selection box 181 has been used to select use of five extended screens. This has resulted in the addition of a mini-program window 201, a selection bar 203, a mini-program window 202 and a selection bar 204 to extended screens display 14.

The extended screens display 14 and the full screens are completely interactive. Moving mini-windows within extended screens display 14 results in the associated windows being moved in the display. For example, by placing cursor 56 over mini-window 70 and depressing mouse button 62, mini-window 70 may then be dragged to mini-program window 202. Likewise, by placing cursor 56 over mini-window 190 and depressing mouse button 62, mini-window 190 may then be dragged to mini-program window 201. The result is shown in FIG. 35.

Figure 35:
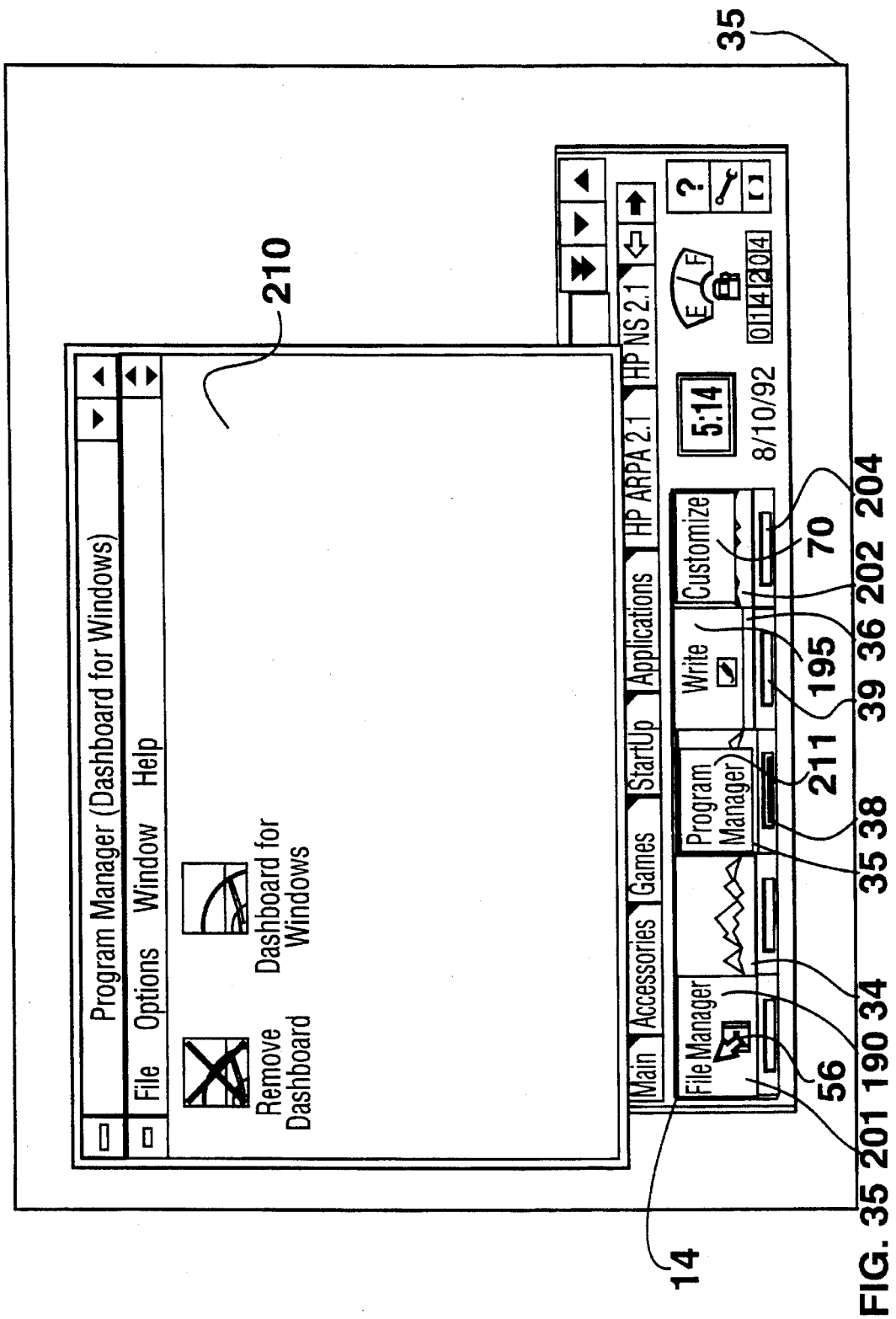
Figure 36:
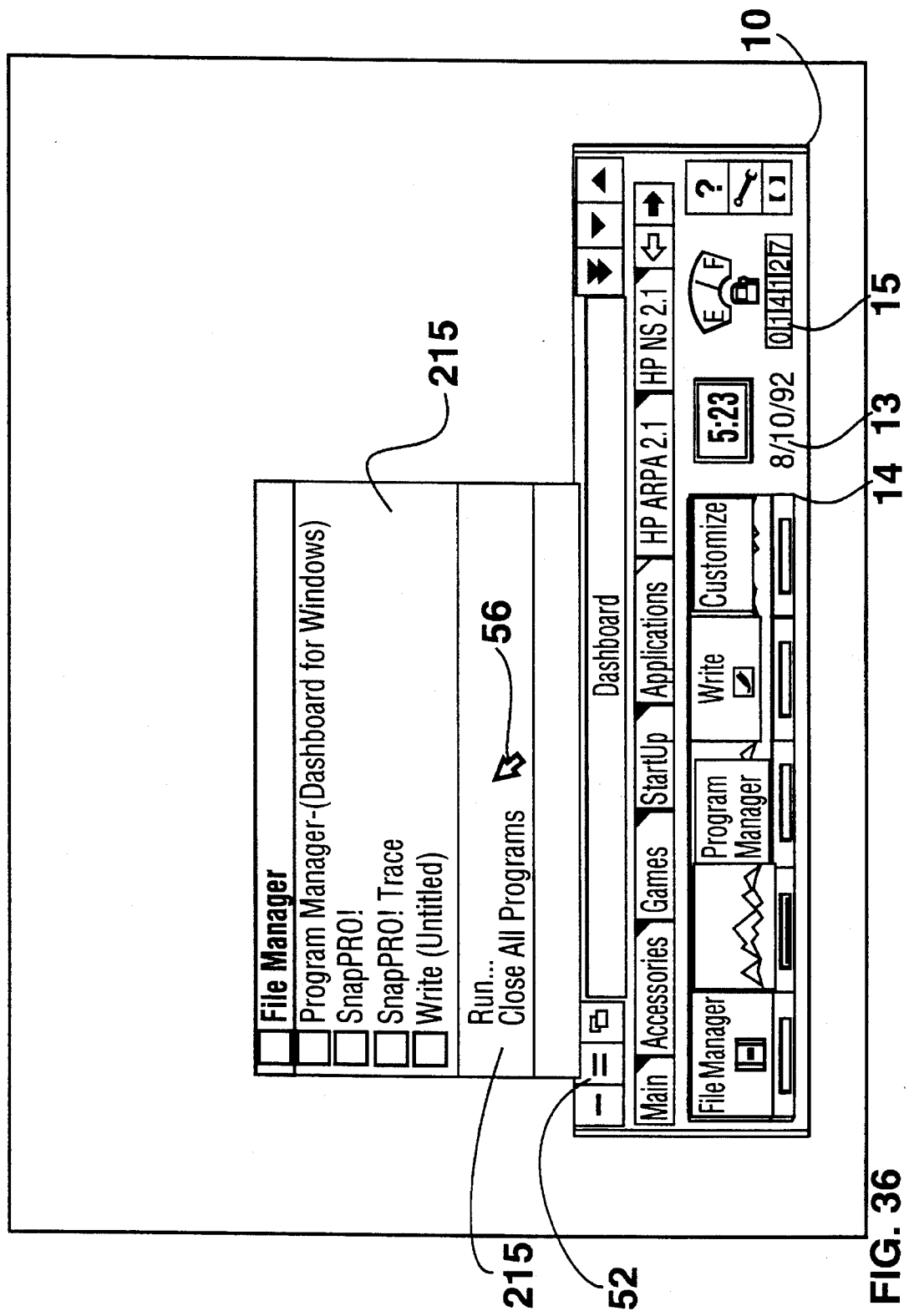

In FIG. 35, program manager has been opened, for example, using a menu 215 (shown in FIG. 36) accessible by selecting task menu button 52. Menu 215 displays a simple list of all programs currently executing. Menu 215 also includes a run command and a close all programs command.

FIG. 35 shows window 210 and mini-window 211. File manager mini-window 190 has been selected by placing cursor 56 over mini-window 190 and clicking mouse button 62.

Figure 37:
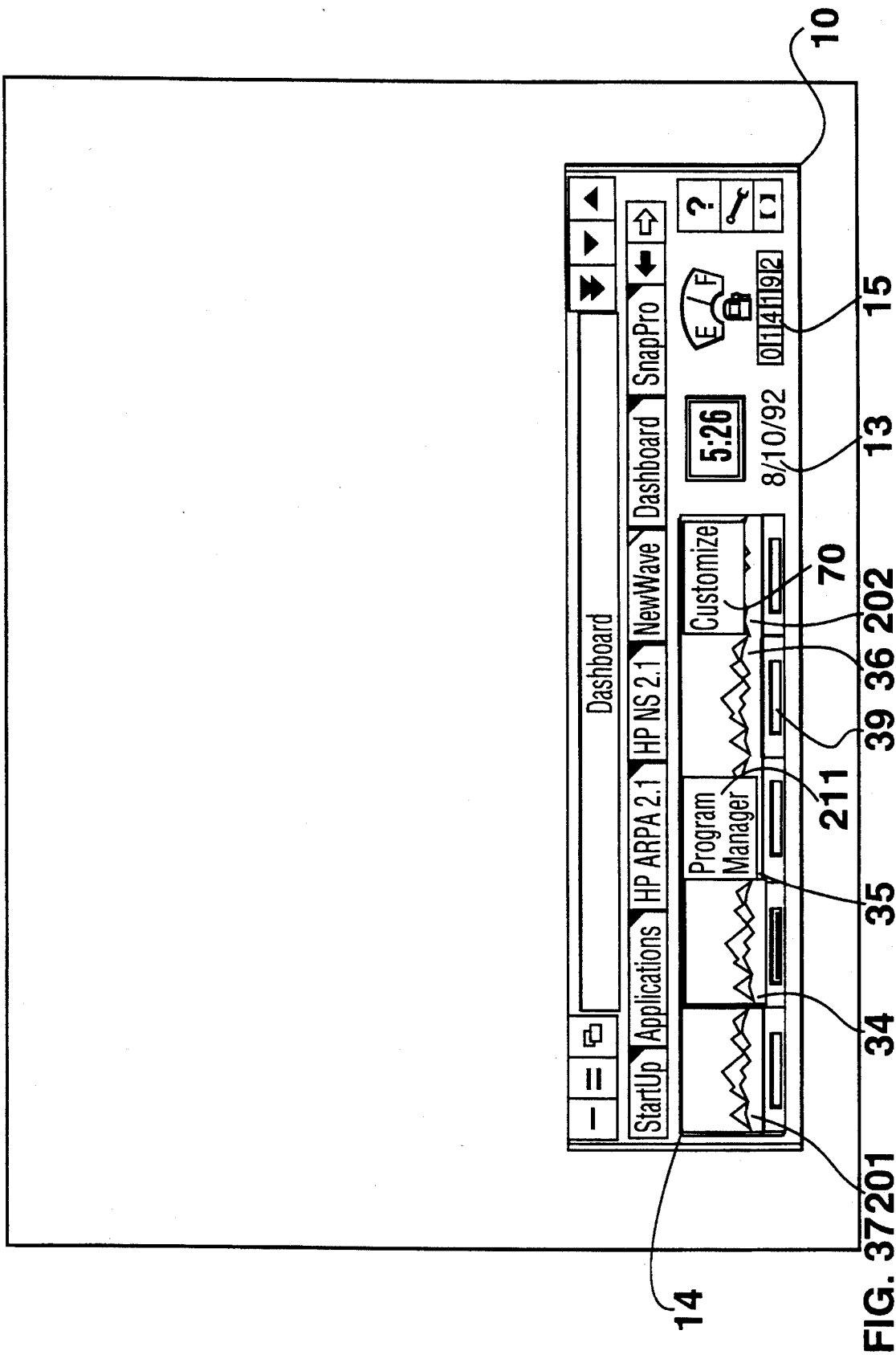

As illustrated by FIG. 36, menu 215 is again accessed by placing cursor 56 over task menu button 52 and clicking mouse button 62. Placing cursor 56 over the close all programs selection and clicking mouse button 62 results in File Manager program and the MS Write program being closed. This is illustrated by FIG. 37 where mini-window 190 and mini-window 195 are no longer seen in extended screens display 14.

Figure 38:
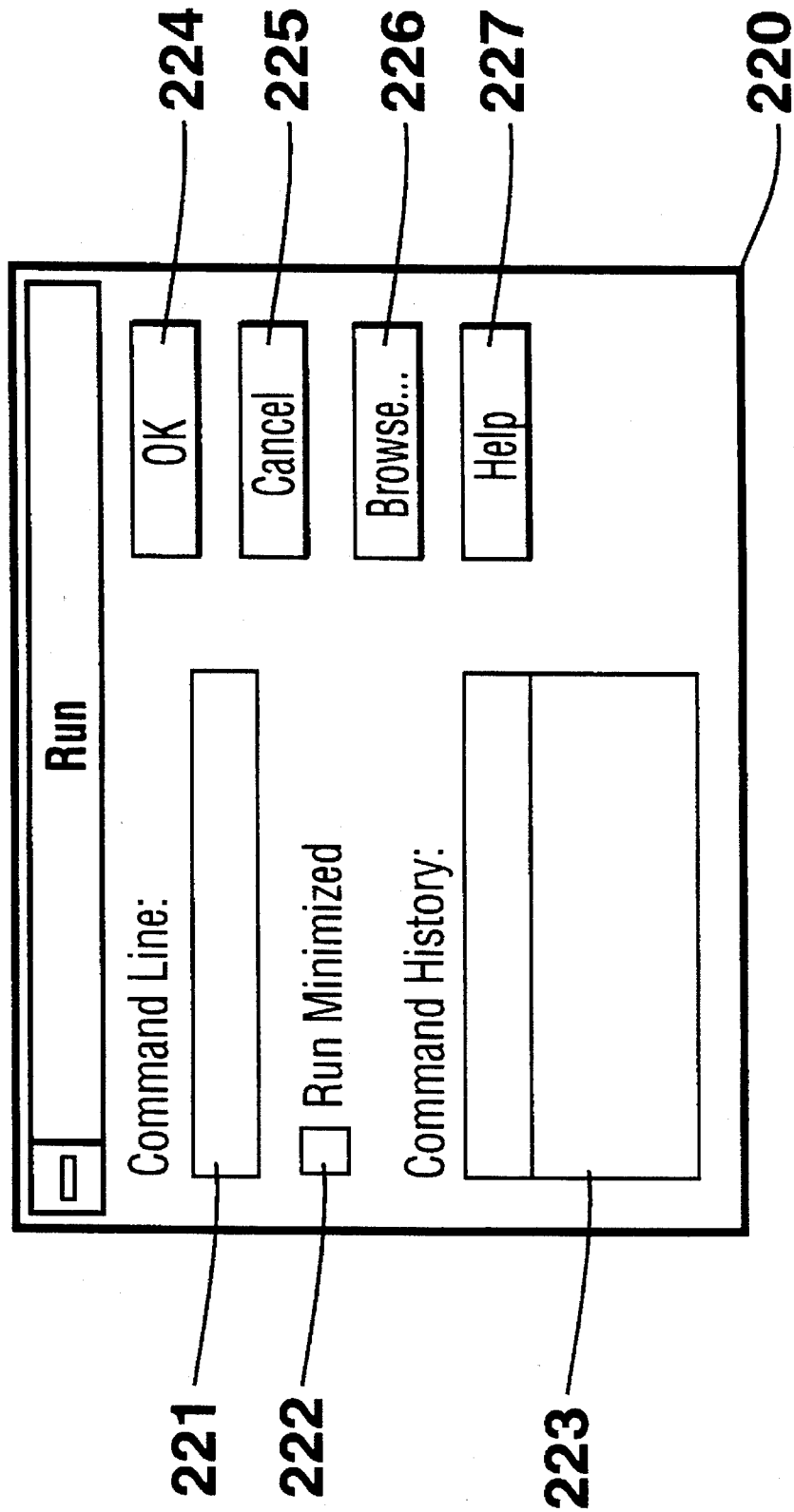

Placing cursor 56 over the selection in menu 215 which is listed as "Run" results in a Run window 220 appearing, as shown in FIG. 38. Run window 220 includes a command line 221, an OK button 224, a cancel button 225, a browse button 226 and a help button 227. Selection of a run minimized box 222 will result in a program being started in a minimized form. A box 223 lists a command history.

Figure 39:
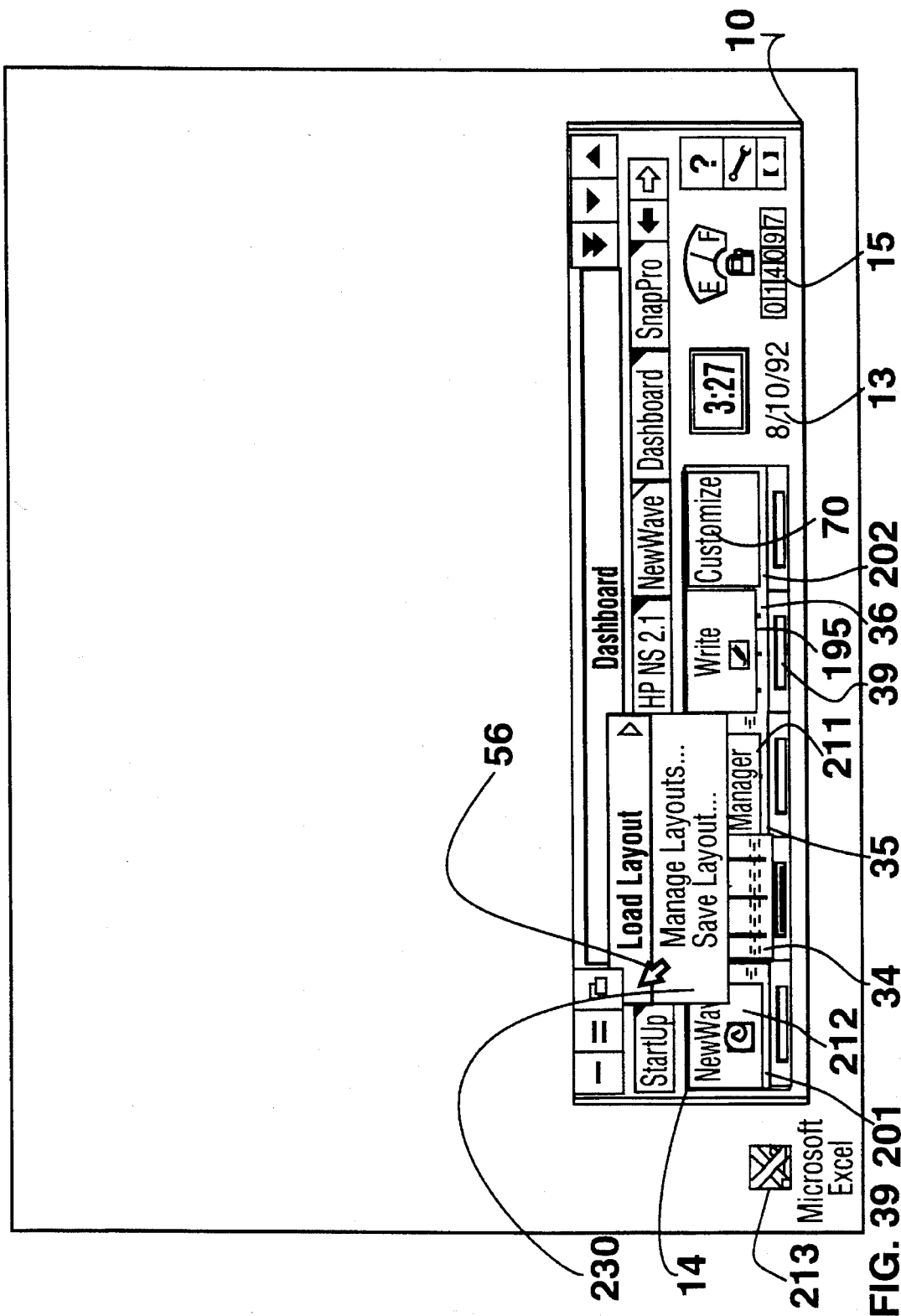

Layouts of opened applications may be saved using a menu 230 shown in FIG. 39. Menu 230 is brought up by selecting layout menu button 53. The layout shown in FIG. 39 is saved as layout 3, to be recalled at a later time. As is seen from FIG. 39, the saved layout includes an open window for the NewWave application represented by mini-window 212 in mini-program window 201. The saved layout also includes an Excel program running in icon form, as represented by icon 213 within the screen represented by mini-program window 34. Additionally, the saved layout includes MS Write as represented by mini-window 195 shown in mini-program window 36.

Figure 40:
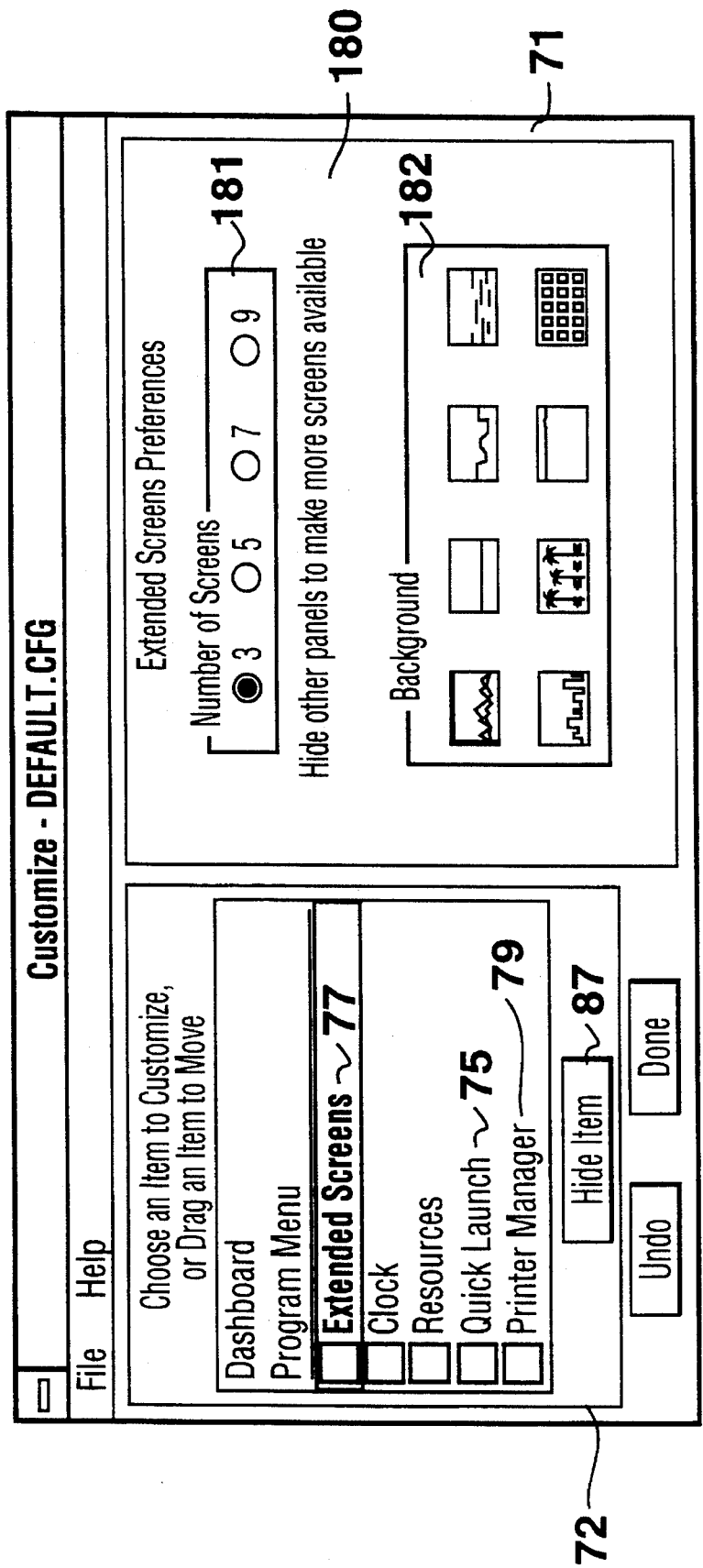

In FIG. 40, customize window 71 is active and displayed. Using hide/show item button, quick launch buttons 11 and 12, and printer manager 32 are again displayed by dashboard interface 10. Number of screens selection box 181 has been used to select the use of three extended screens. The result is the removal of mini-program window 201, selection bar 203, mini-program window 202 and selection bar 204 from extended screens display 14.

Figure 41:
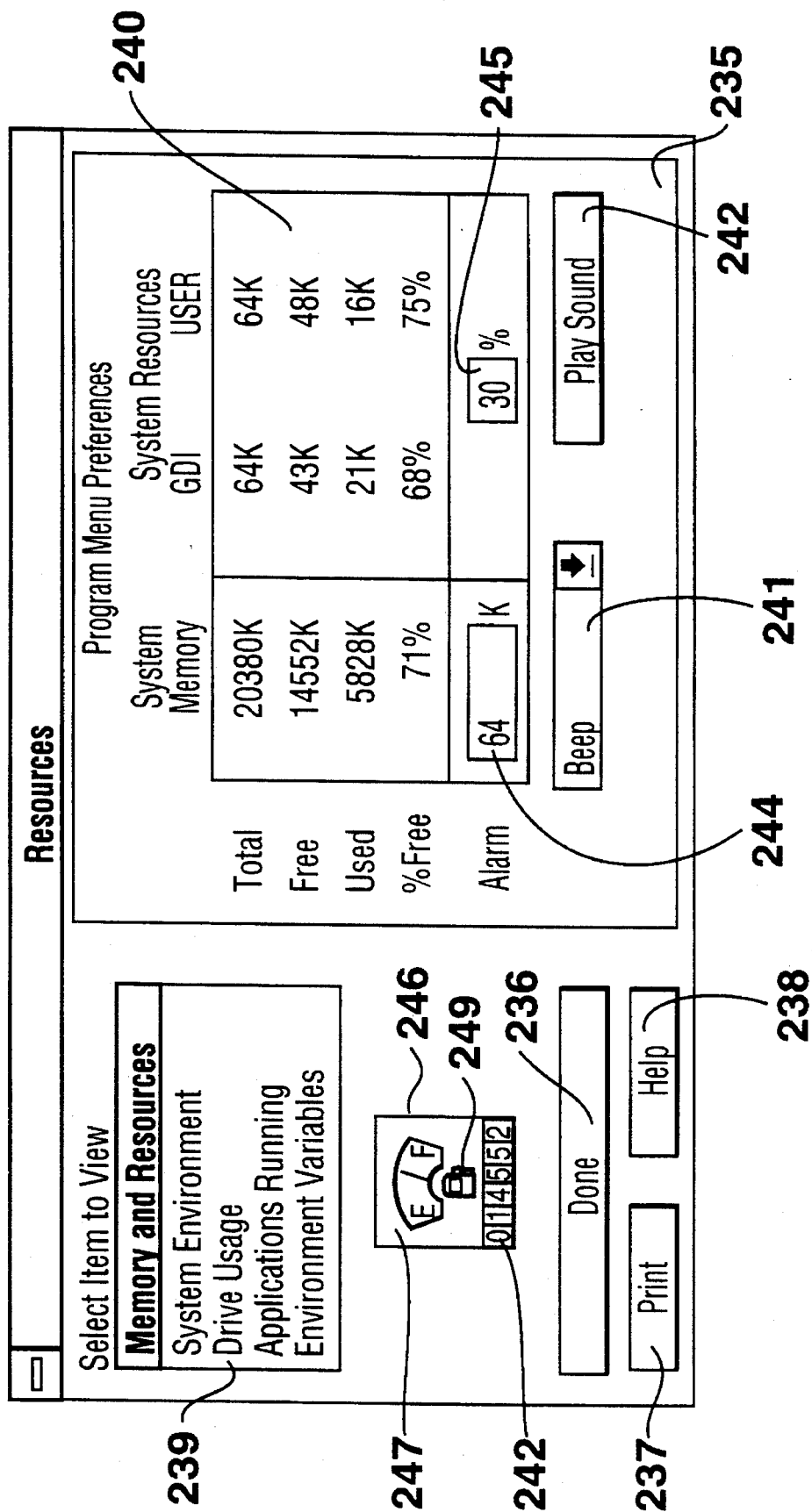

FIG. 41 shows a resources window 235 which may be obtained by placing cursor 56 over resource icon 15 and double clicking mouse button 62. Resources window 235 includes a done button 236, a printer button 237 and a help button 238. An icon 246 includes a "fuel gauge" which shows available system resources and includes an "odometer" 248 which shows available system memory. Icon 246 also includes an alarm signal 249. Icon 246 is identical to resource gauge 15 which appears on dashboard 10. A table 240 gives additional information about system memory usage and system resource usage.

The Windows operating system uses the memory available in your computer to run programs, but it also reserves a portion of memory for its own use for what is known as system resources. The two key components of system resources, called USER and GDI (short for Graphics Device Interface), both reserve their own 64K bytes of memory. Each running program uses up a portion of system resources memory, and when the available pool of GDI and USER memory runs low, it is impossible to open new programs. In other words, even though a system has sufficient free memory for a program to load, not having enough memory left in the two 64K sections reserved by Windows means new programs cannot be opened.

Resource gauge 15, keeps track amount of available system resources. Like the gas gauge in an automobile, the needle drops toward empty as the system resources get low. Resource Gauge window 235 can be accessed to get a summary of the resource usage by the GDI and USER components.

In addition to the memory set aside as system resources, the Windows operating system manages the rest of the computer's memory for running programs. Each running program also uses up a portion of this available memory. And much like your system resources, when out of memory, it is impossible to open any new programs.

Within resource gauge window 235, box 244 contains a memory alarm limit and box 245 contains a system resources memory alarm limit. When available system memory dips below the memory alarm limit or available system resources dip below the system resources memory alarm limit, The computer system sounds the sound listed in box 241. In addition, alarm signal 249 blinks red, and eventually remains red. The sound in box 241 may be tried by selecting play sound button 242.

Figure 42:
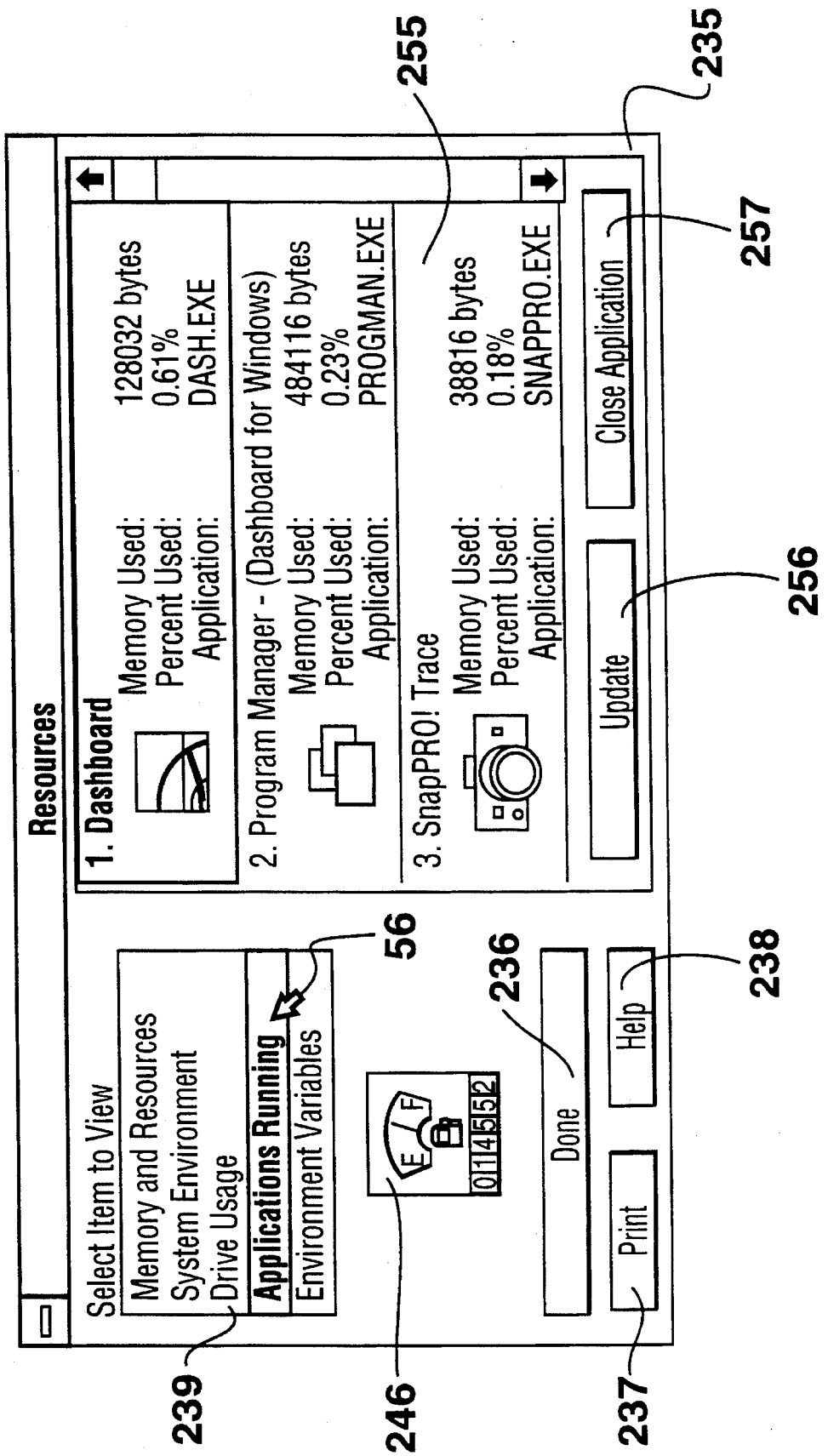

Placing cursor 56 over the "Applications Running" entry in menu 239 and clicking mouse button 62 results in a window 255 appearing, as shown in FIG. 42. Window 255 lists resource usage information for each application currently running. An update button allows updating of each application and a close application 257 allows a selected application to be closed.

Figure 43:
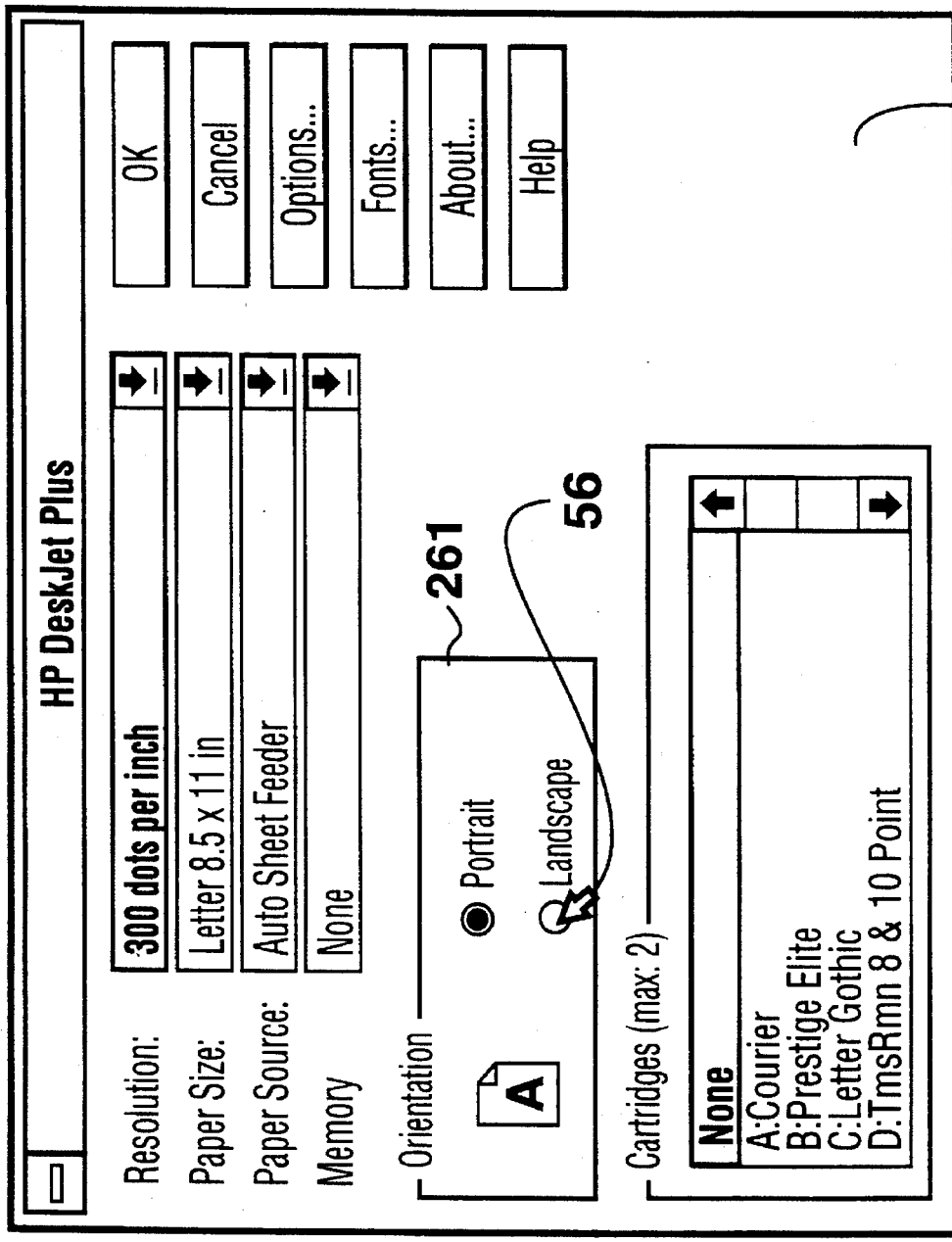
Figure 44:
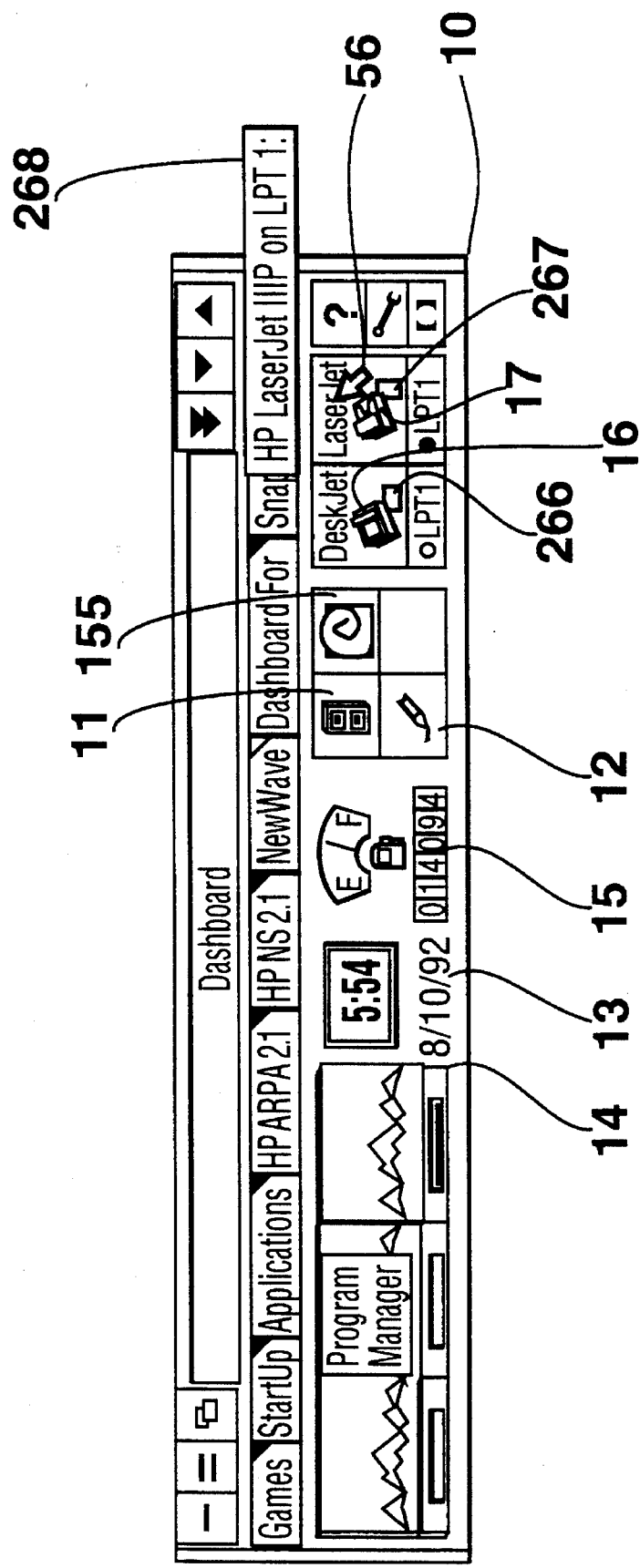

Double clicking on a printer icon results in the appearance of a configuration menu for the printer. For example, placing cursor 56 over printer icon 16 and double clicking mouse button 62 results in the appearance of a configuration window 260 for the HP DeskJet plus printer, as shown in FIG. 43. Configuration window 260 includes a orientation selection box 261. The selected paper orientation is shown in the printer icons of printer manager 32. For example, as shown in FIG. 44, a paper shape 266 within printer icon 16 is shown to be longer in the horizontal direction, indicating the HP DeskJet printer is currently configured in landscape orientation. A paper shape 267 within printer icon 17 is shown to be longer in the vertical direction, indicating the HP LaserJet printer is currently configured in portrait orientation. Also, by placing cursor 56 over printer icon 17 and once clicking mouse button 62, identification information for the printer is displayed in a box 268.

Figure 45:
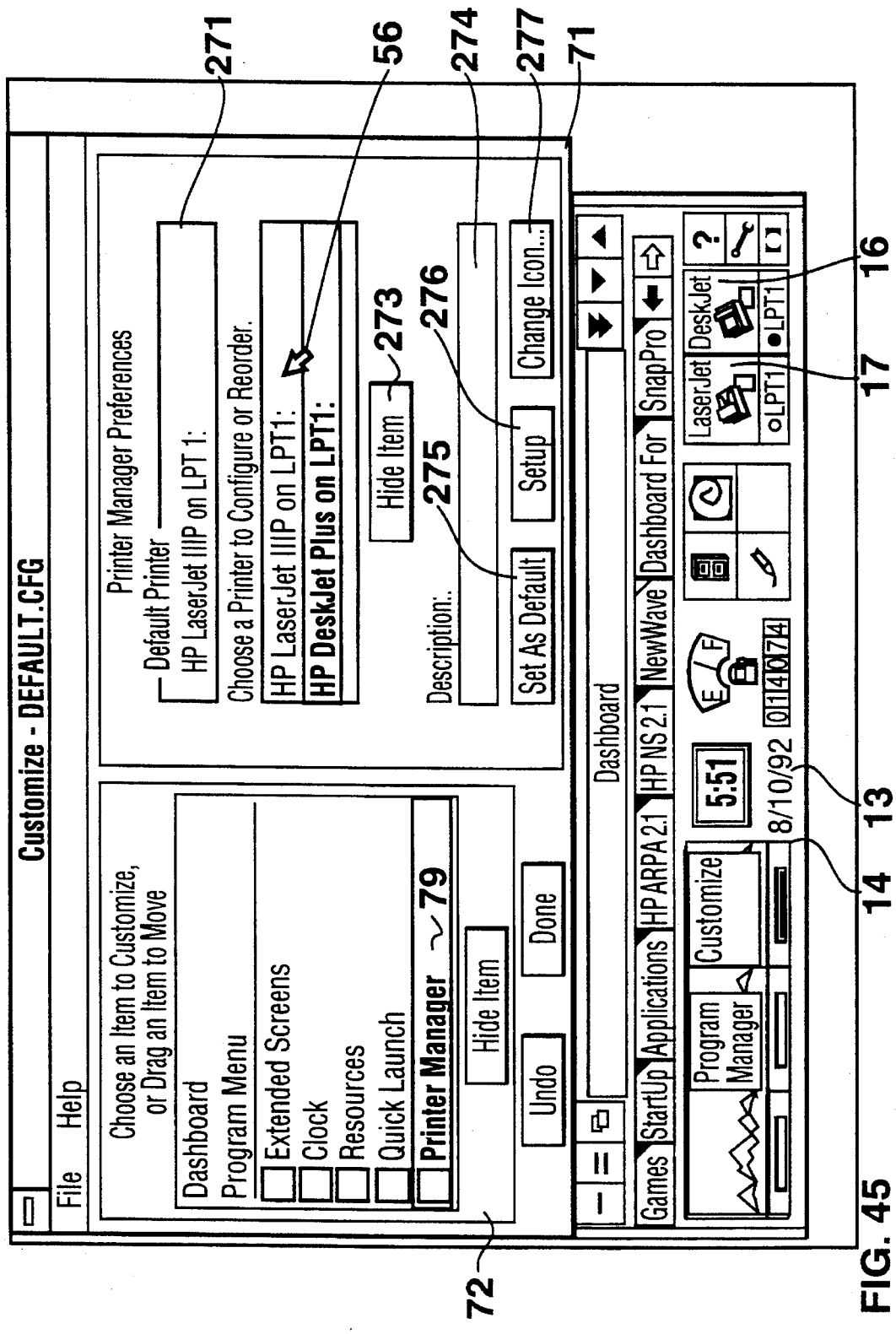

Additional printer control may be accomplished using customize window 71. For example, FIG. 45 shows printer manager listing 79 selected in customize menu 72, resulting in the display of printer manager preferences 270. The current default printer is listed in a box 271. A selection box 272 allows selection of a printer to configure or reorder. Changing of the order which printer icons appear on dashboard interface 10 is done by selecting and dragging entries in selection box 272 to a different ordered location. As shown in FIG. 45, printer icon 17 has in this way been moved to the left of printer icon 16 on dashboard interface 10.

Figure 46:
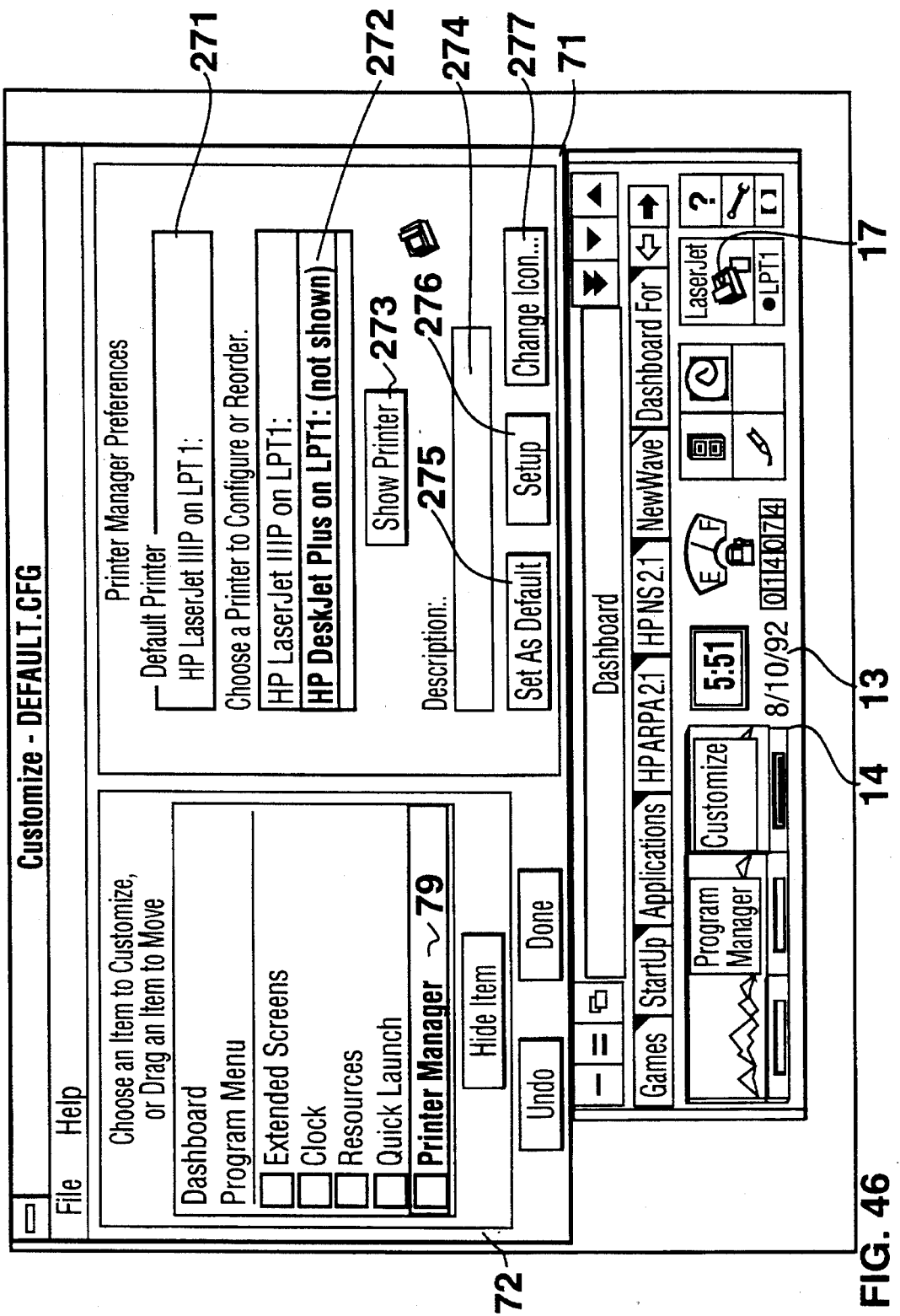

A hide/show printer button 273 is used to hide or show on dashboard interface 10 a printer icon for the printer selected in selection box 272. For example, in FIG. 46, printer icon 16 is no longer displayed. Printer manager preferences additionally include a set as default button 275, a setup button 276, and a change Icon button 277. After selecting change icon button 277, it is possible to scroll through different icons and choose one for the selected printer. Selecting a displayed OK button will cause that icon to appear on the dashboard interface 10.

With Printer Manager 32, printing or faxing a file may be done by dragging and dropping from the File Manager for the Windows operating system onto the dashboard printer icons. To print directly from dashboard interface 10, first open the File Manager. Then, select a file to print. Hold mouse button 62 down while dragging the file to the icon desired printer displayed on the dashboard interface 10. Release mouse button 62 and drop the file onto the printer icon. This will trigger printing. Depending on which program the file was created in, the program may launch and ask for your confirmation to print.

To see more printer icons on dashboard interface 10 at the same time, use sizing bar 160 or sizing bar 161 (shown in FIG. 25) to expand the width dashboard interface 10. However, if the printers icons are on the right-hand side of dashboard interface 10, resizing may not show enough of them because, when you re-size, items on the left-hand side of dashboard interface 10 have priority over those on the right. For example, if there are several quick launch buttons at the left side of dashboard interface 10, they will take higher priority when expanding dashboard display 10. In this case, customize window 71 may be used to reorder the panels so the printer manger 32 is to the left of the quick launch buttons.

Figure 47:
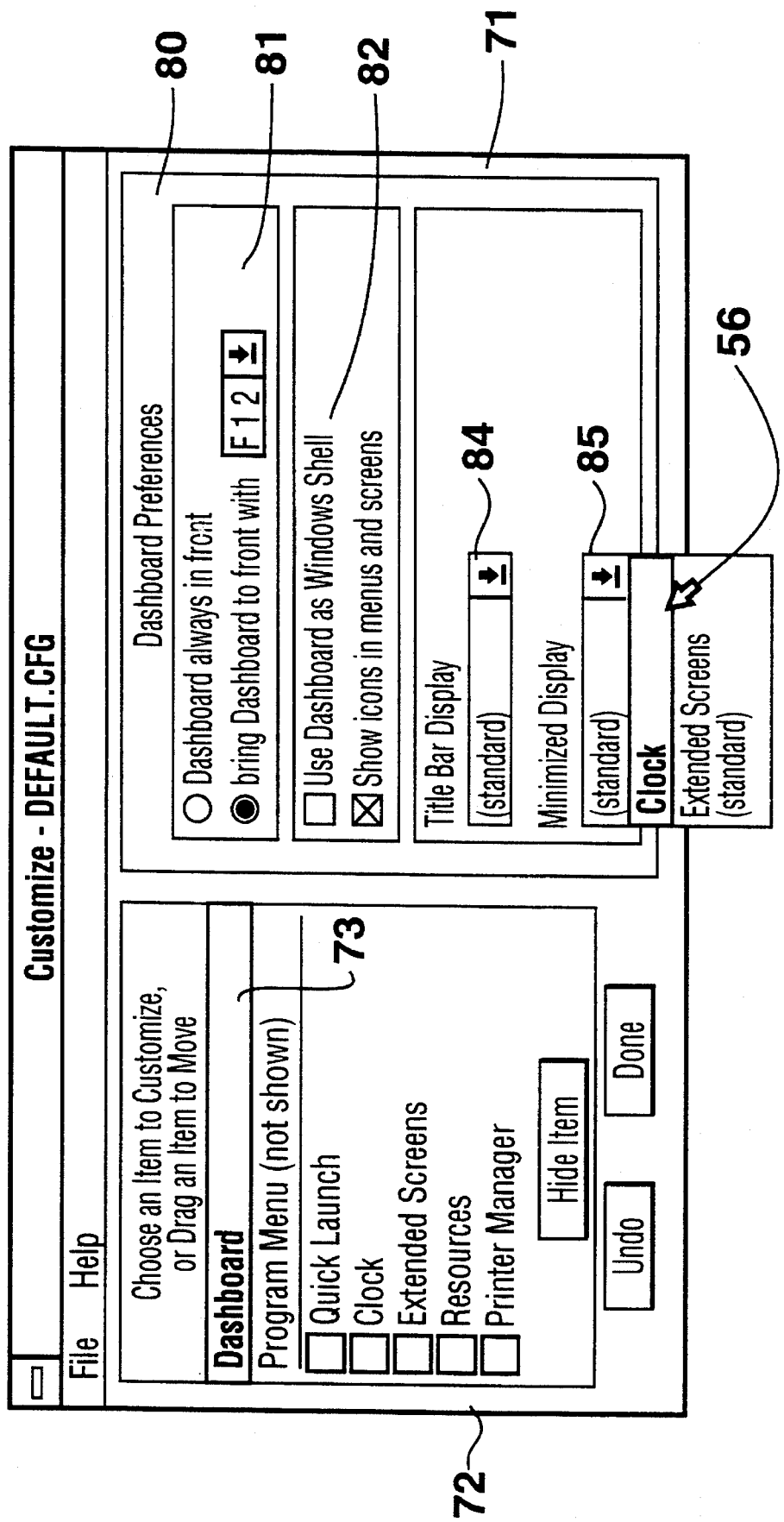
Figure 48:
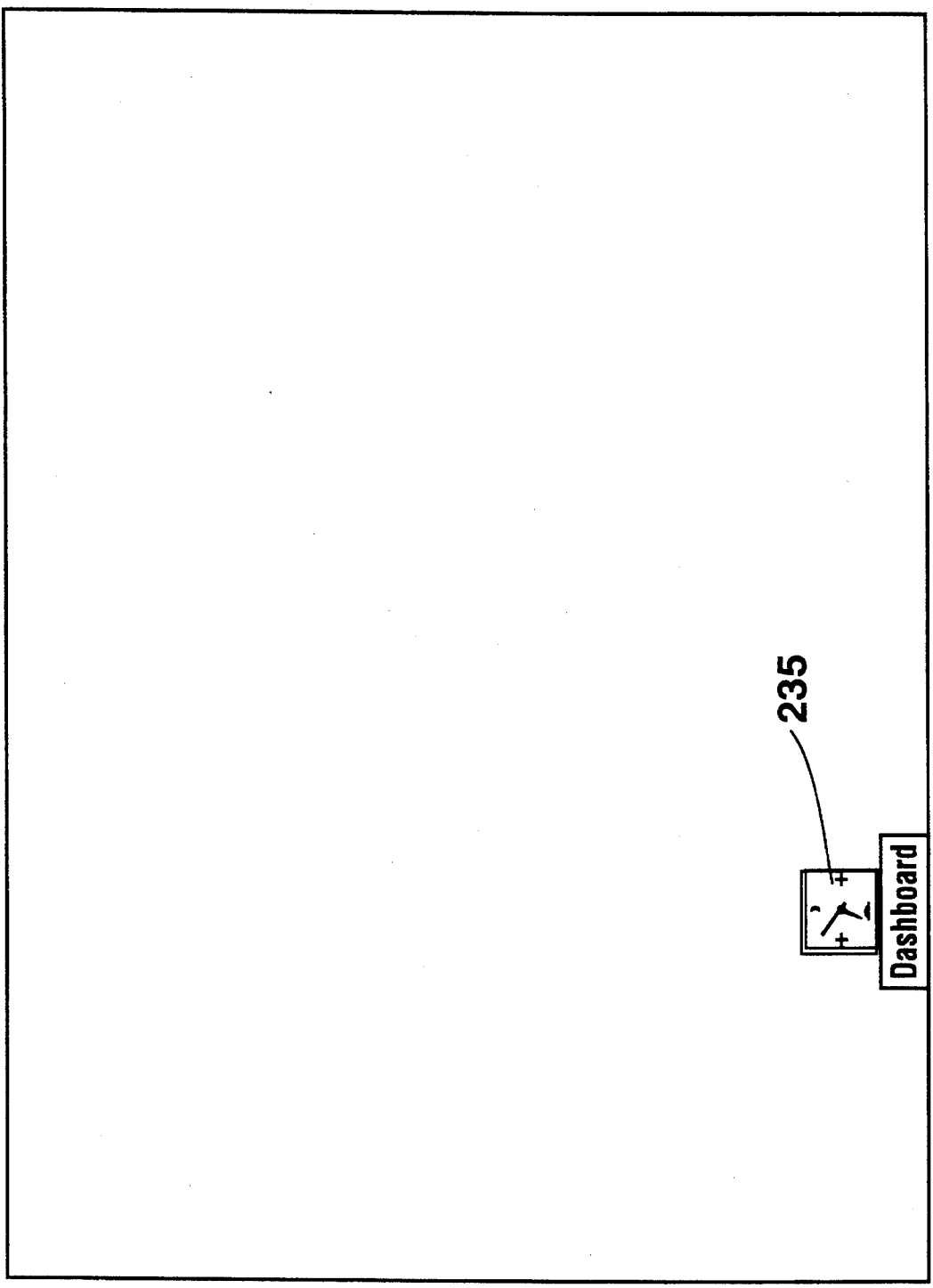
Figure 49:
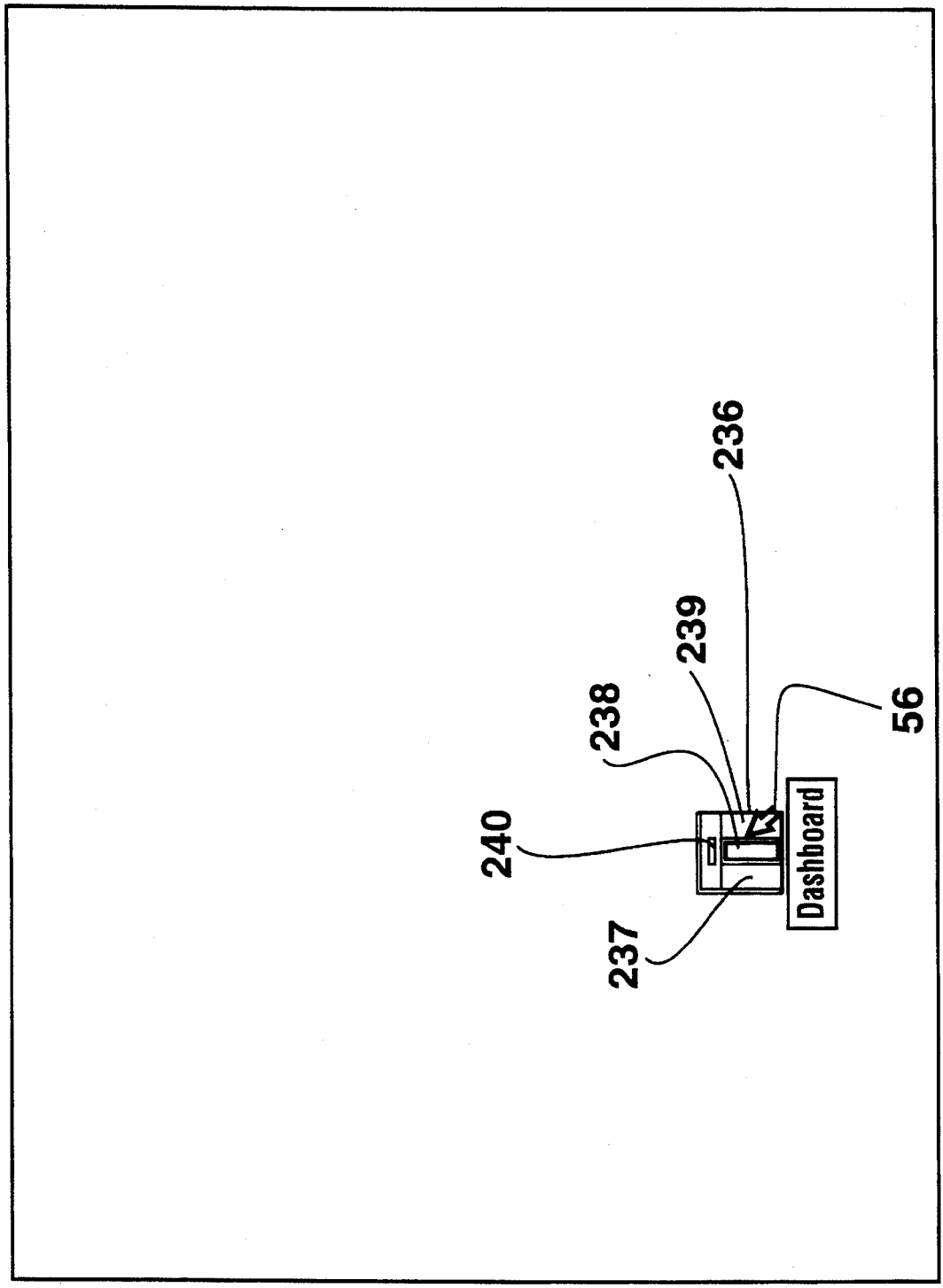
Figure 50:
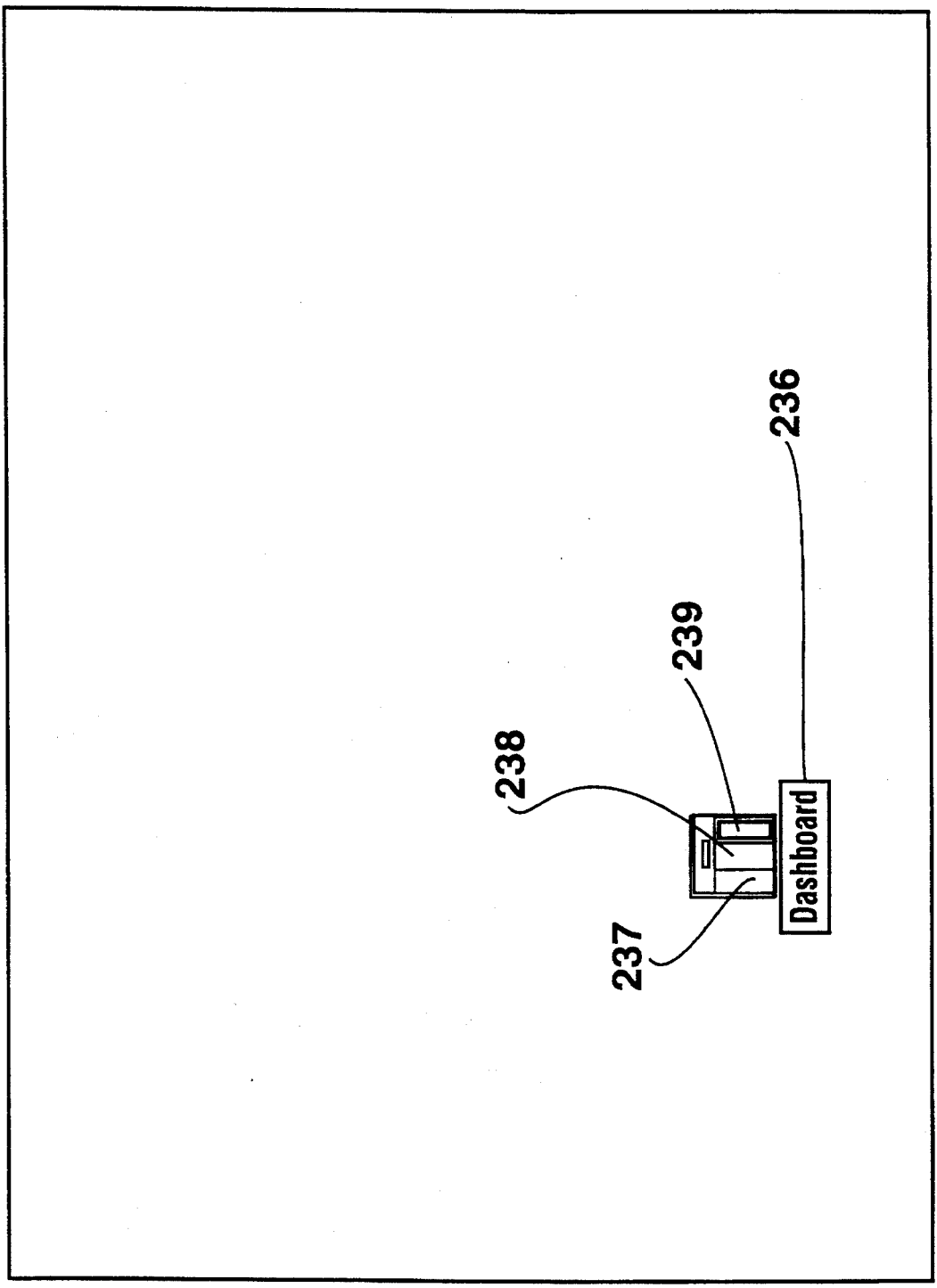
Figure 51:
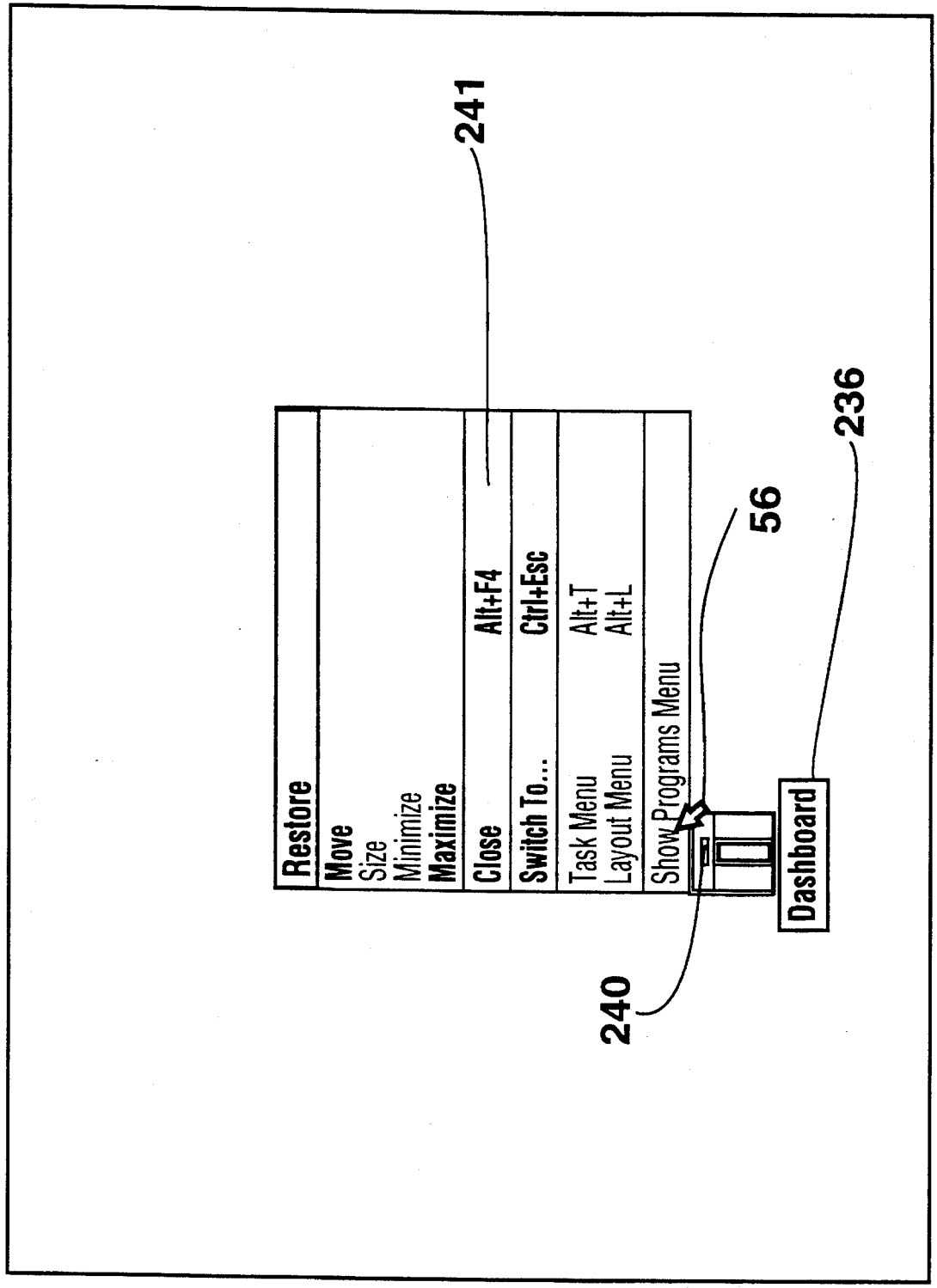

FIG. 47 shows customize window 71 being used to choose an icon for the minimum display of dashboard 10. For example, when the clock is selected, dashboard icon 235 for dashboard 10 is a clock, as shown in FIG. 48. When the Extended screens is selected, dashboard icon 236 allows switching between extended screens. For example in FIG. 49, dashboard icon 236 includes a selection bar 237, a selection bar 238 and a selection bar 239. Each of selection bars 237 through 239 represents an extended screen. In FIG. 49, selection bar 238 is highlighted, indicating the middle extended screen is shown. To select the rightmost extended screen cursor 56 is placed over selection bar 238 and mouse button 62 is clicked. The result is shown in FIG. 50. Selecting a button 241 on icon 240 results in the appearance of a dashboard control menu 241, as shown in FIG. 51.

Figure 52:
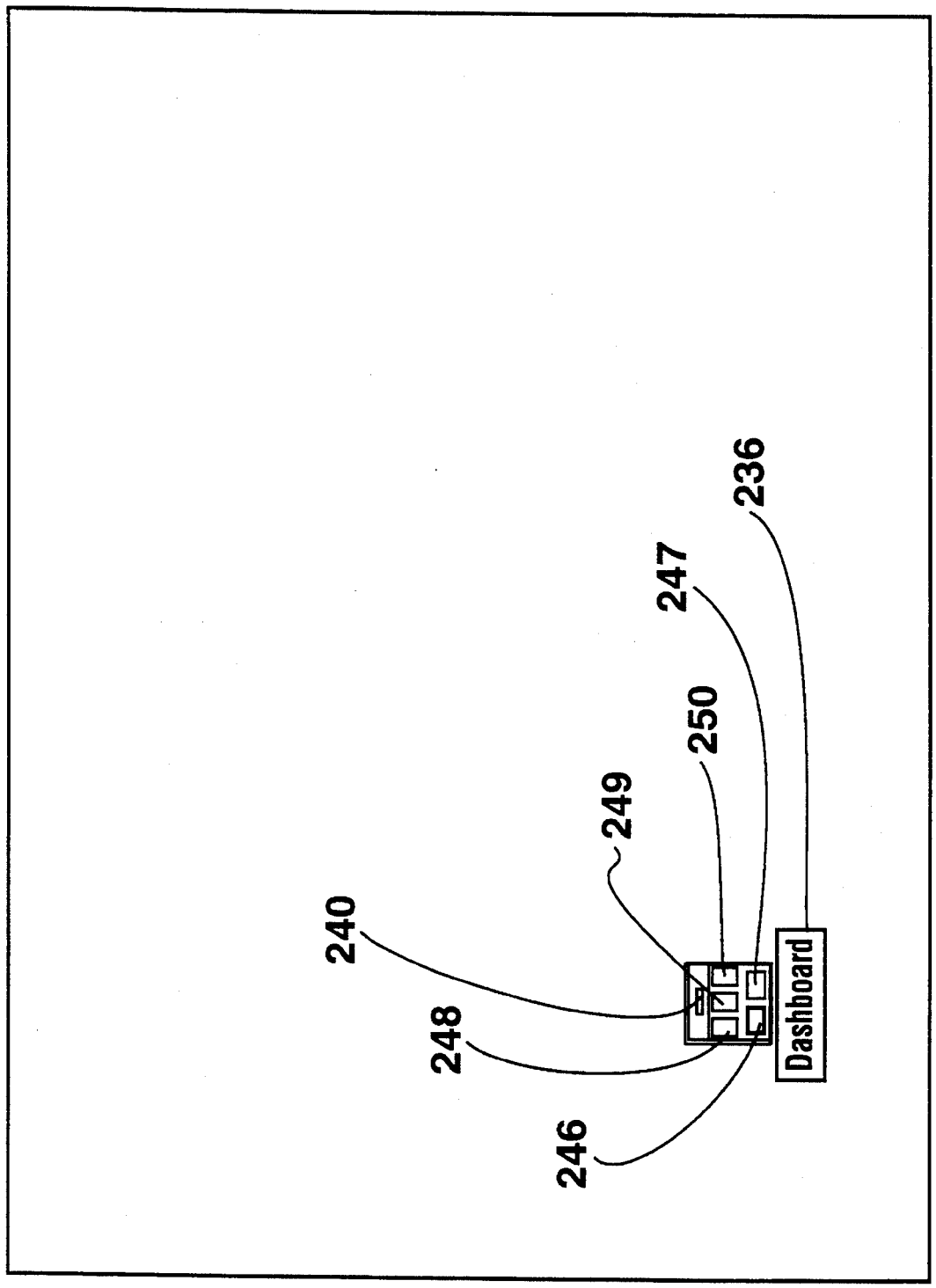

FIG. 52 shows icon 236 for dashboard interface 10 when there are five extended screens. Each of selection bars 246, 247, 248, 249 and 250 represent an extended screen.

Figure 53:
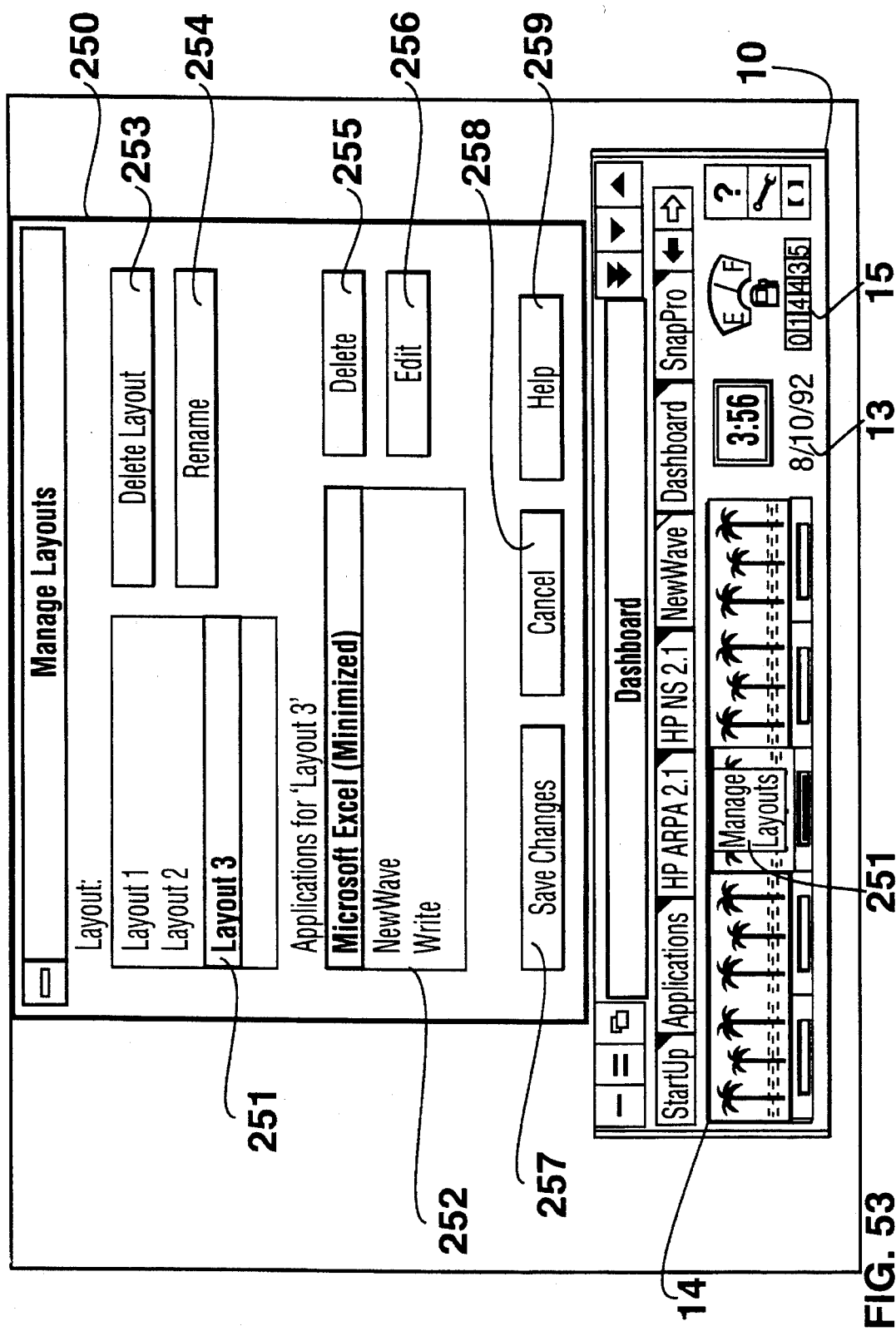
Figure 54:
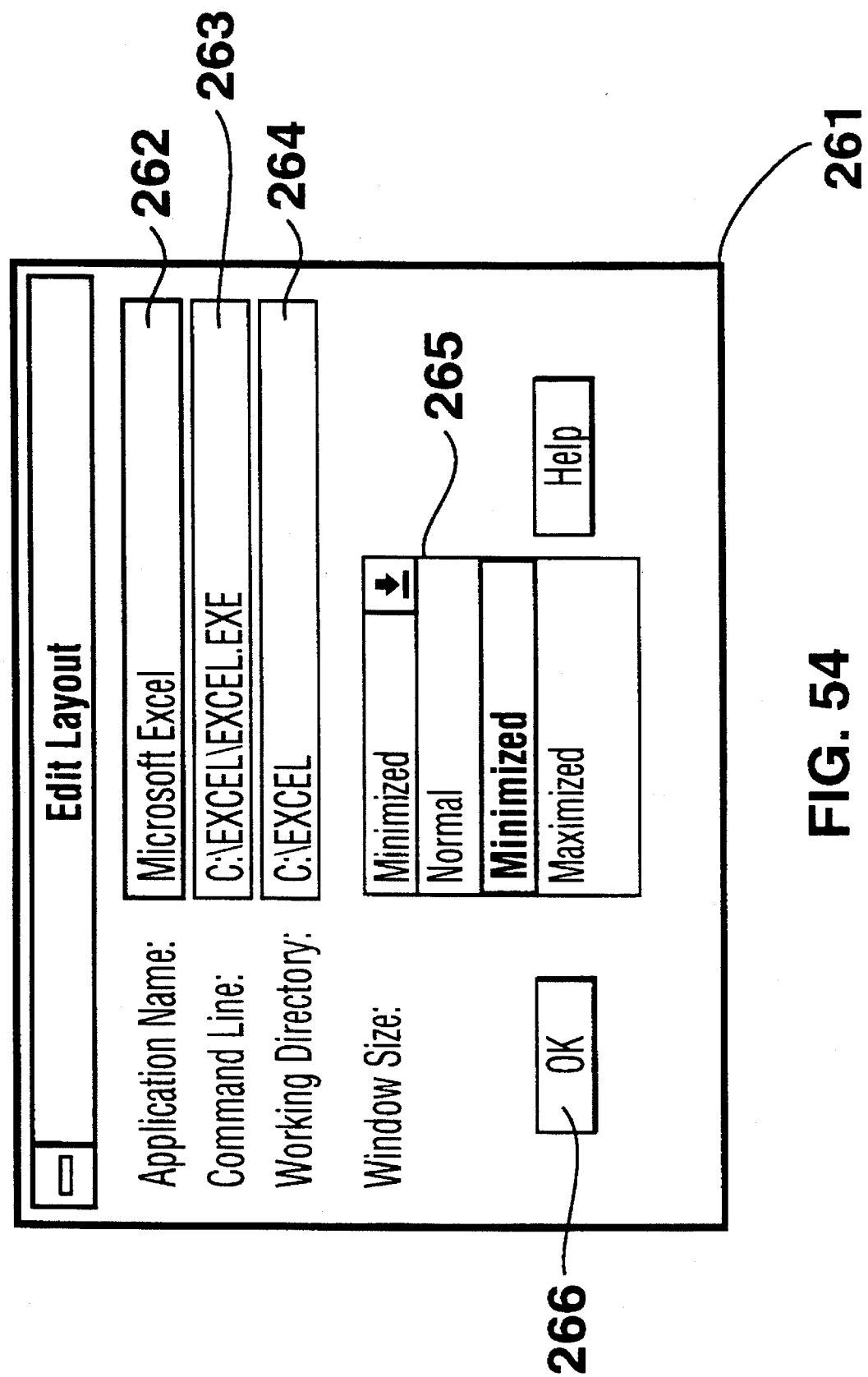

As shown in FIG. 53, selecting manage layouts in menu 230 (shown in FIG. 39), results in the appearance of manage layouts window 250. Selecting "Layout 3" in layout box 251 results in the applications for "Layout 3" being listed in applications box 252.

A layout selected in layout box 251 is deleted by selecting delete layout button 253. The layout selected in layout box 251 is renamed by selecting rename button 254. Manage layouts window 250 also includes a cancel button 258 and a help button 259.

A selected application may be deleted from a selected layout by selecting the application in applications box 252 and selecting a delete button 255. Selection of an edit button 256 results in the appearance of an edit layout window 261, shown in FIG. 254, for the application selected in applications box 252. Edit layout window 261 includes an application name box 262, a command line box 263, a working directory box 264 and a window size box 265. After selecting "Normal" in window size box 265, an OK button is selected. Similarly, the NewWave application listed in application box 252 is selected and edited to run in minimized form.

Figure 55:
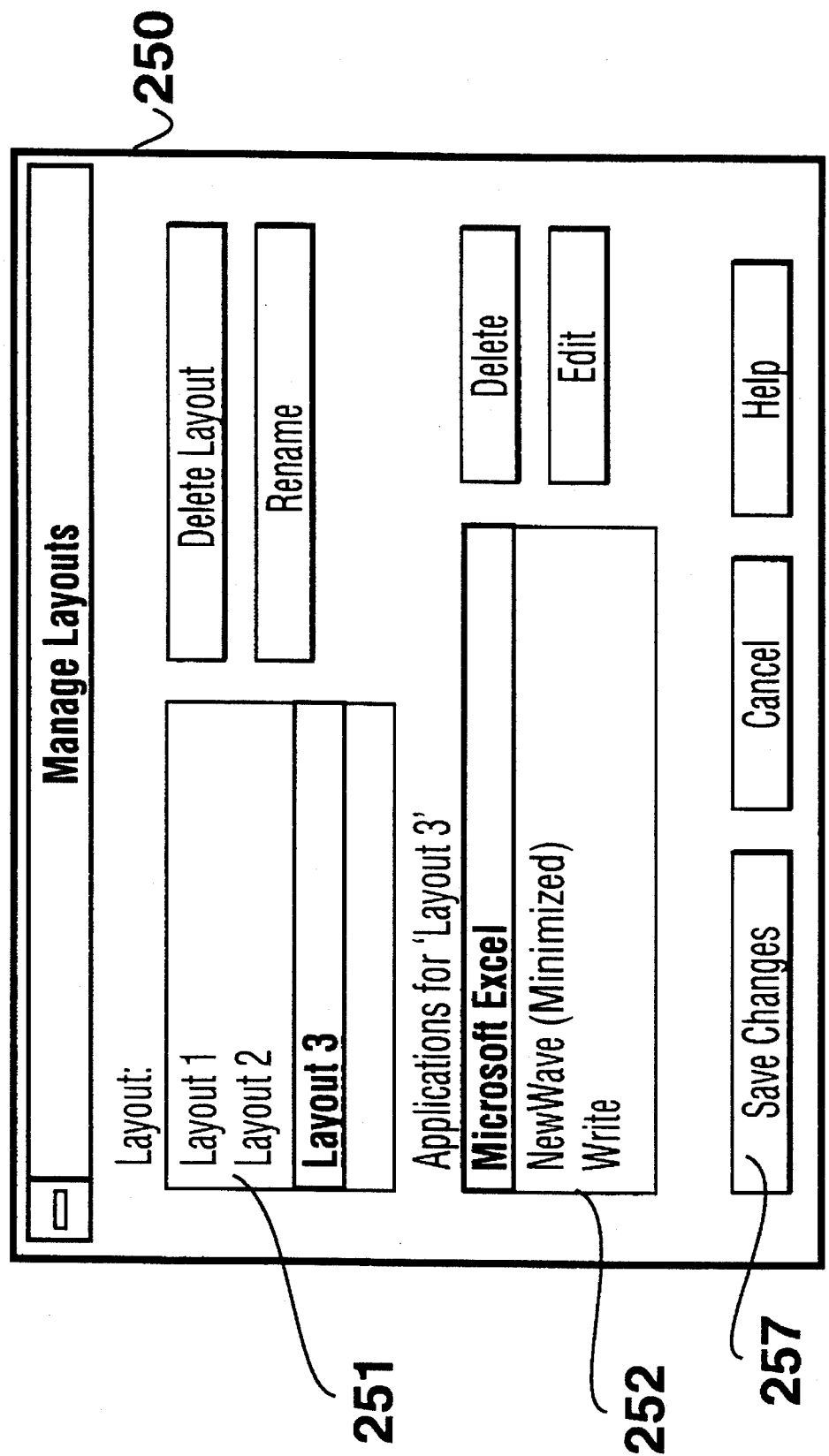

FIG. 55 shows the results in the listings within applications box 252 of manage layouts window 250. Selecting save changes button 257 results in these changes to "Layout 3" being saved.

Figure 56:
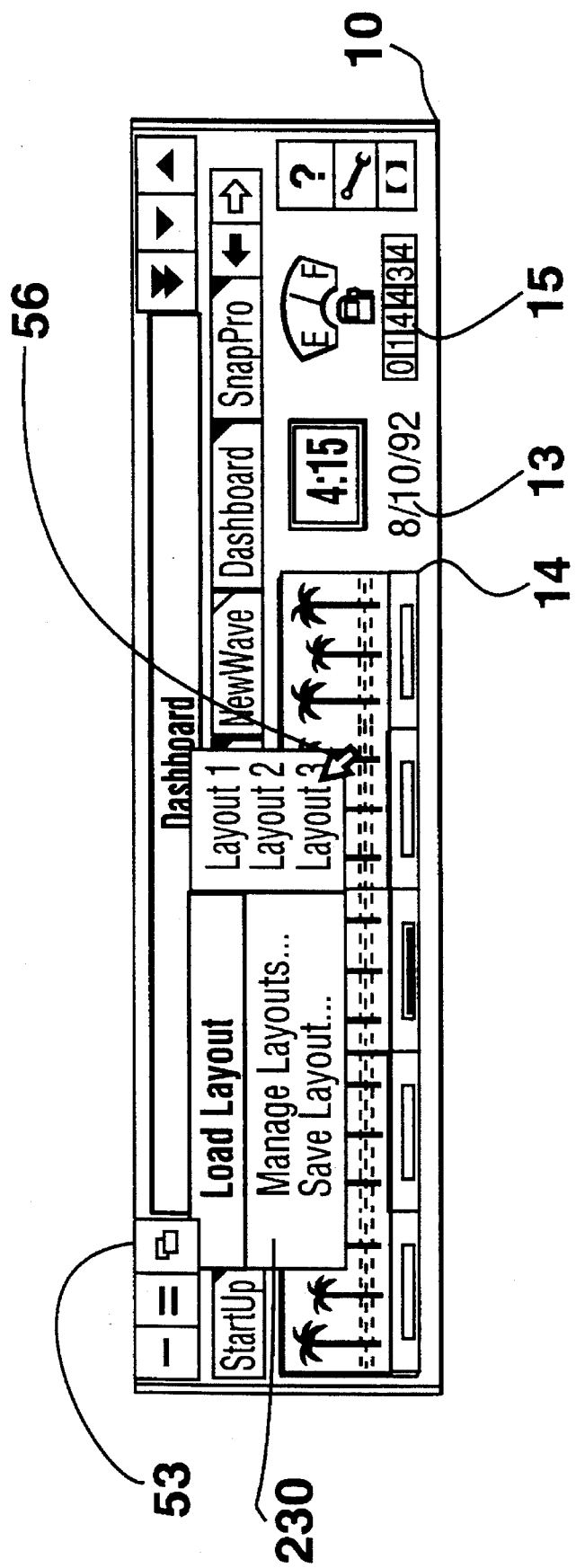
Figure 57:
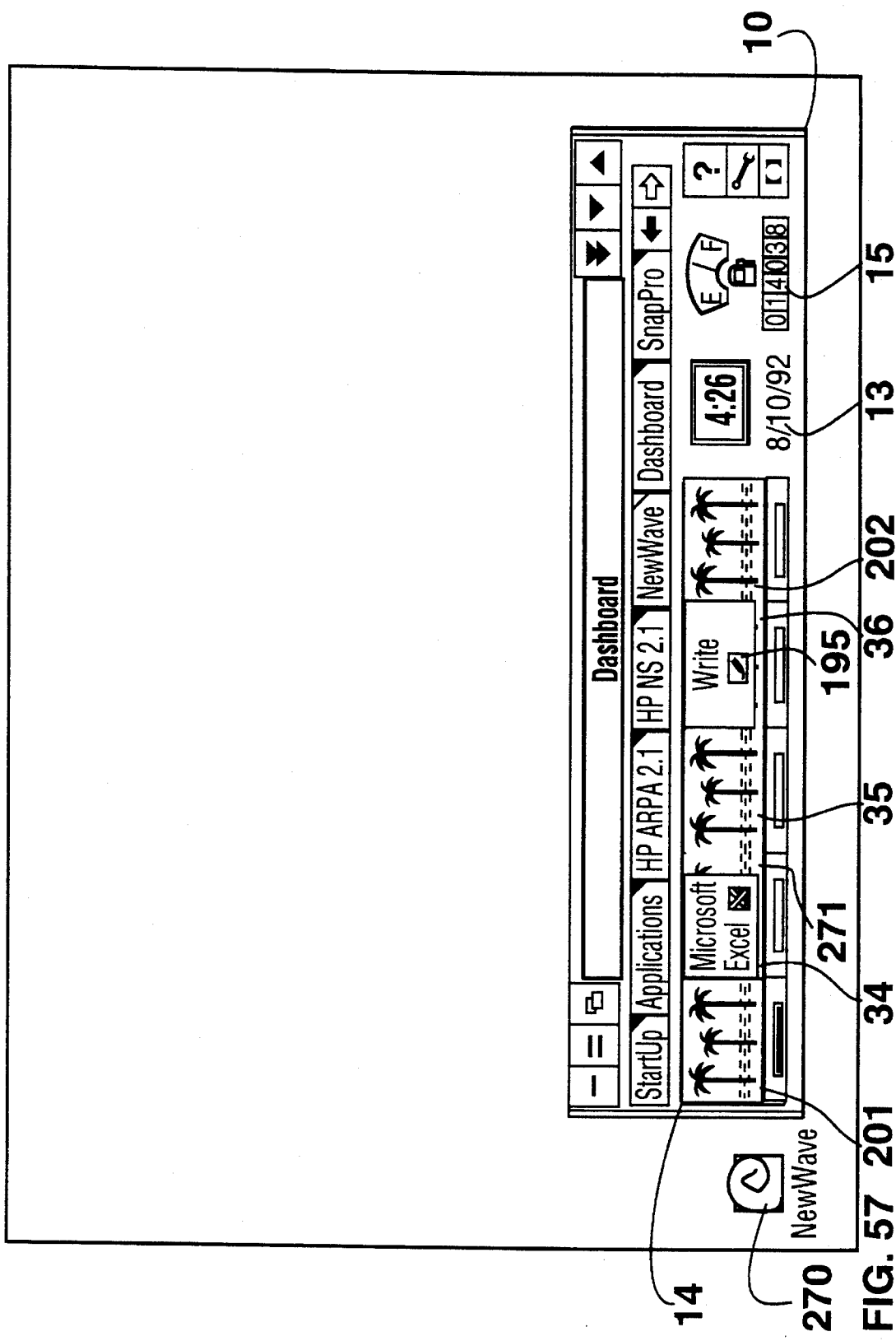

In FIG. 56, using menu 230, brought up by selecting layout menu button 53, "Layout 3" is loaded. FIG. 57 show the NewWave program running in icon form, as represented by icon 270 within the screen represented by mini-program window 201. Additionally, FIG. 57 shows MS Write running, as represented by mini-window 195 shown in mini-program window 36, and shows Excel running, as represented by a mini-window 271 shown in mini-program window 34.

Figure 58:
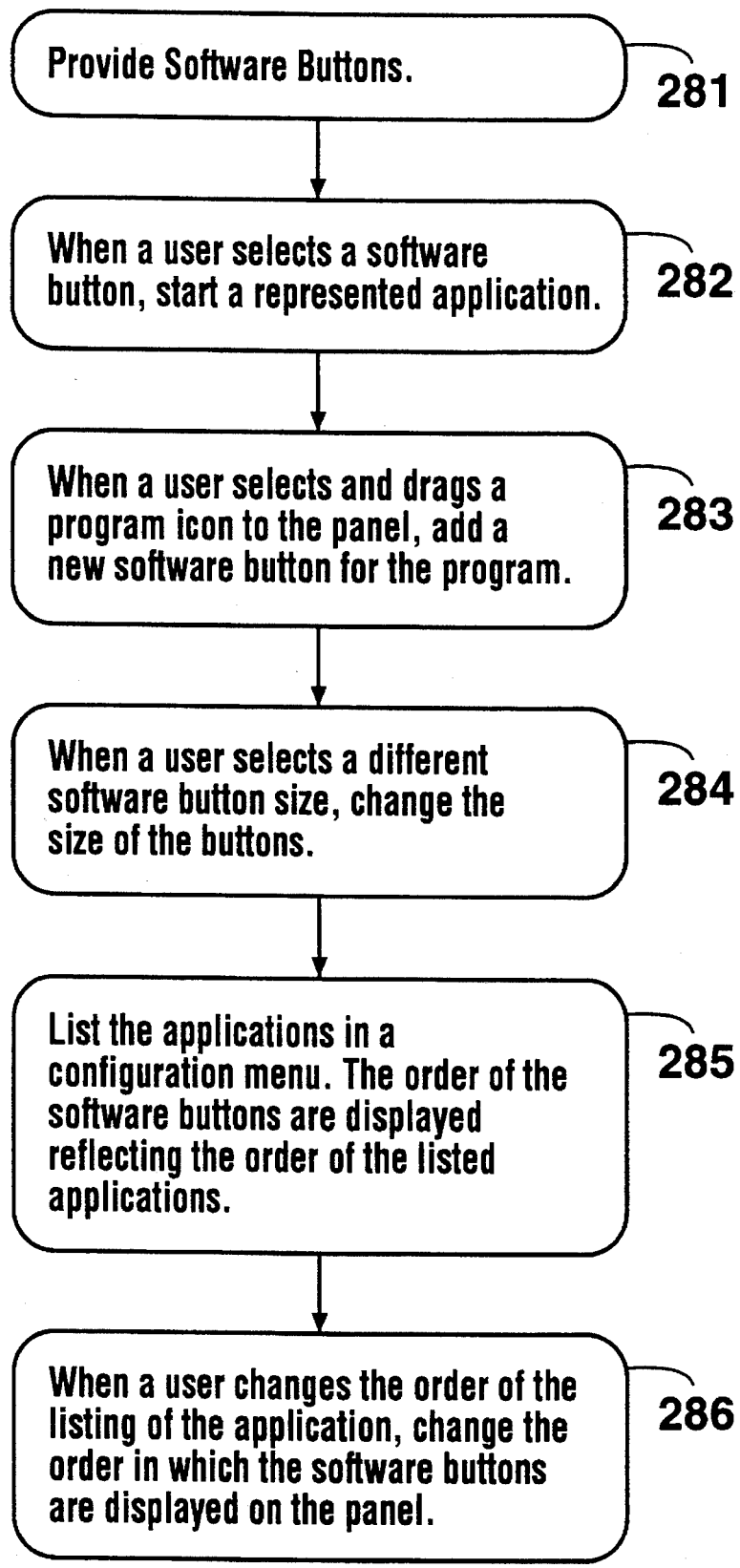
FIGS. 58 through 64 show flowcharts which show implementation of a dashboard interface in accordance with the preferred embodiment of the present invention.

FIG. 58 is a flowchart which shows implementation of a quick launch facility for the start-up of application processes, in accordance with a preferred embodiment of the present invention. In a step 281, a plurality of software buttons is provided on a panel. Each software button represents one of a plurality of applications. In a step 282, upon a user selecting a first software button, a first application represented by the first software button is started. In a step 283, upon a user selecting and dragging a visual representation of a second application to the panel, a new software button representing the second application is added to the panel. In a step 284, upon a user selecting a different software button size in a configuration menu, the size of each software button in the plurality of software buttons is changed. In a step 285, the plurality of applications are listed in a configuration menu. The order in which the plurality of software buttons is displayed on the panel reflects the order of the listing of the plurality of applications. In a step 286, upon a user changing the order of the listing of the plurality of applications, the order in which the plurality of software buttons is displayed on the panel is changed.

Figure 59:
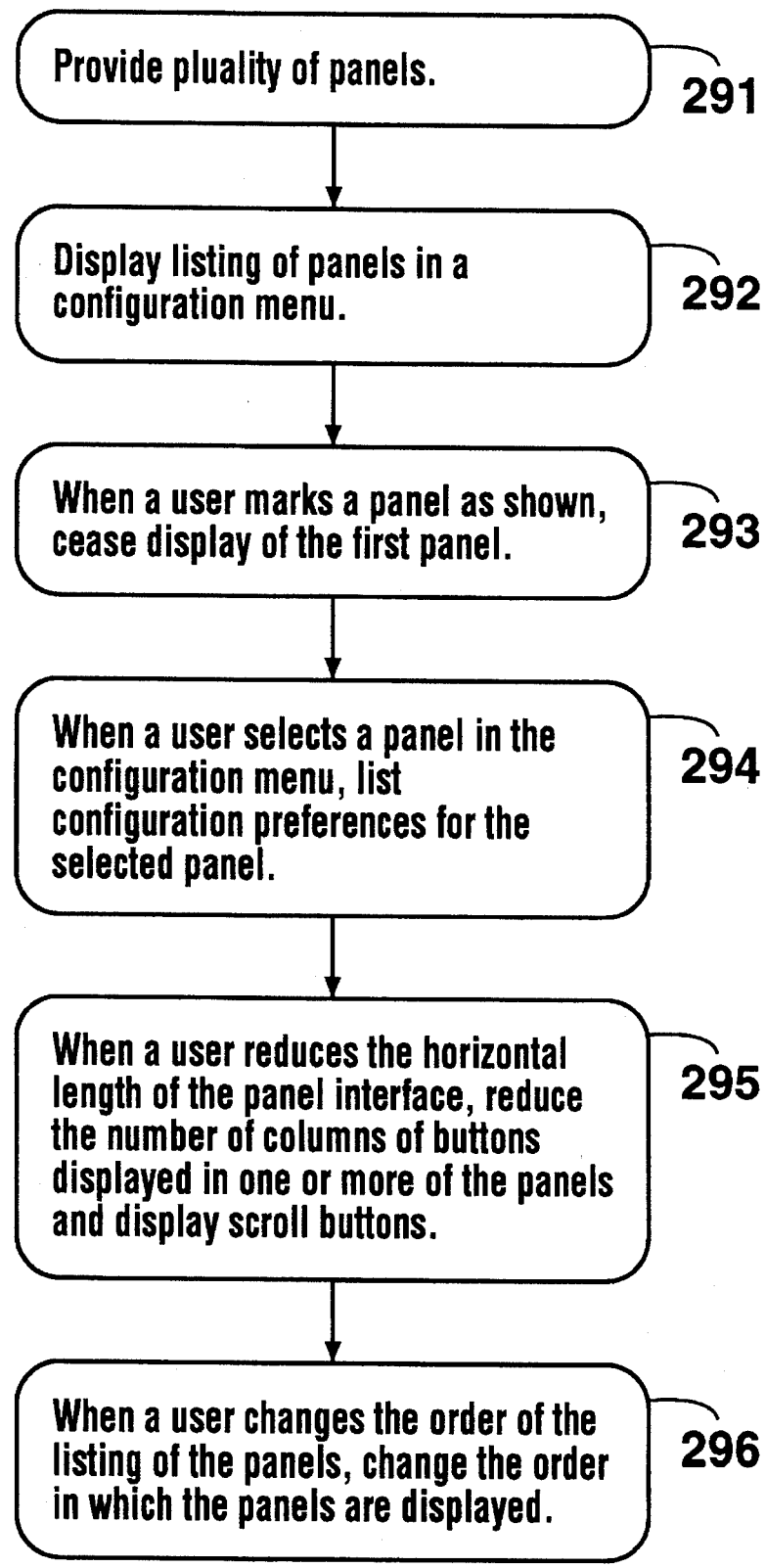

FIG. 59 is a flowchart which shows overall implementation of a dashboard interface, in accordance with a preferred embodiment of the present invention. In a step 291, a first plurality of panels is provided. The panels are displayed horizontally across a computer screen. A first panel from the plurality of panels has a plurality of columns of software buttons. In a step 292, a listing for each of the first plurality of panels is displayed in a configuration menu. An order of the listings determines a horizontal order of the display of panels on the computer screen. In a step 293, upon a user marking a listing for a panel as not shown, display of the panel on computer screen is ceased. For example, the user changes order of the listings by selecting a listing and dragging the listing to a new position in the listings. In a step 294, upon a user selecting a listing for a panel, configuration preferences for the panel are displayed. In a step 295, upon a user reducing the horizontal length of the panel interface, the number of columns displayed in the first panel are reduced. Also, scroll buttons are displayed in the first panel. Upon a user selecting a scroll button in the first panel, the columns displayed in the first panel are scrolled. In a step 296, a listing of each of the first plurality of panels in a configuration menu is displayed. An order of the listings determines a horizontal order of the display of panels on the computer screen. Upon a user changing the order of the listings, the horizontal order of the display of panels on the computer screen is correspondingly changed. Additionally, in a first configuration menu, a plurality of entries are listed. The entries are for software buttons on a first panel. The order in which the plurality of software buttons is displayed on the first panel reflects the order of the listing of the plurality of entries. Upon a user changing order of the listing of the plurality of entries, the order in which the plurality of software buttons is displayed on the first panel is changed.

Figure 60:
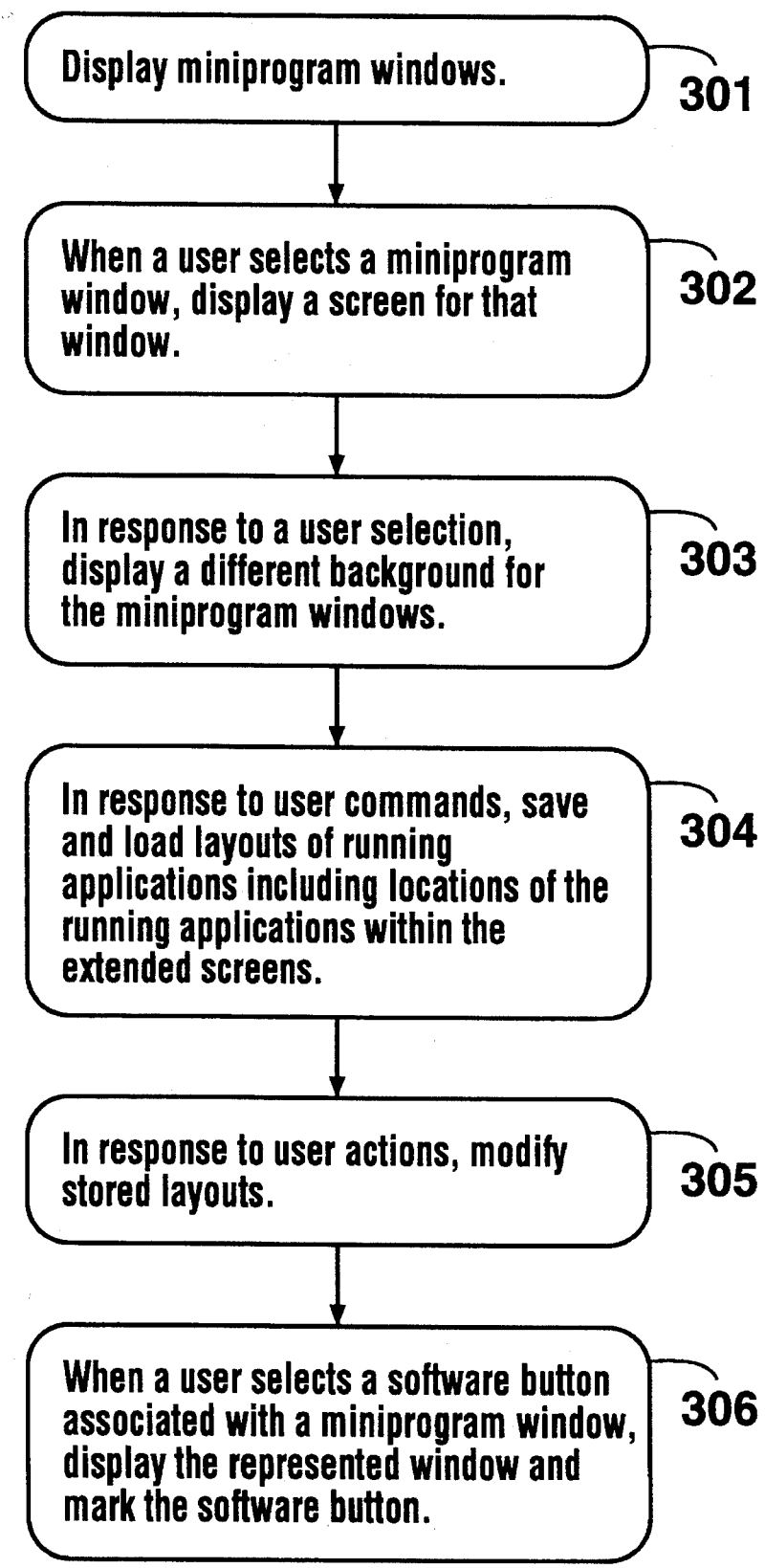

FIG. 60 is a flowchart which shows implementation of an extended screens feature, in accordance with a preferred embodiment of the present invention. In a step 301, a plurality of mini-program windows is displayed. Each mini-program window has a first background pattern. Each program window represents a virtual computing screen. Mini-windows shown in the mini-program windows each represent an application window displayed in the represented virtual computing screen. An associated software button is displayed adjacent to each mini-program window. A first mini-window which is greater than a pre-selected size includes a first icon which identifies a first application which controls a first application window represented by the first mini-window. In a step 302, upon a user selecting a first mini-program window, a first virtual computing screen is displayed which is represented by the mini-program window additionally, it is indicated to the user that the first virtual screen is selected. The user selects the first mini-program window by selecting an associated software button for the first mini-program window. In a step 303, upon the user selecting a second background pattern from a configuration menu, the display of mini-program windows is changed so that each mini-program window has the second background pattern. In a step 304, upon a user selecting a save layout command, a current layout of the virtual screens is stored as a first stored layout. The current layout includes placement of open application windows. Upon the user selecting a load layout command at a later time, the first stored layout of the virtual screens is displayed. The display includes the placement and the size of the application windows. In a step 305, upon the user selecting a modification command, the stored layout is modified. In a step 306, upon a user selecting a first associated software button adjacent to a first mini-program window, displaying a first virtual computing screen represented by the first mini-program window, and indicating to the user that the first virtual screen is selected. A region on the first associated software button is highlighted to indicate to the user that the first virtual screen is selected.

Figure 61:
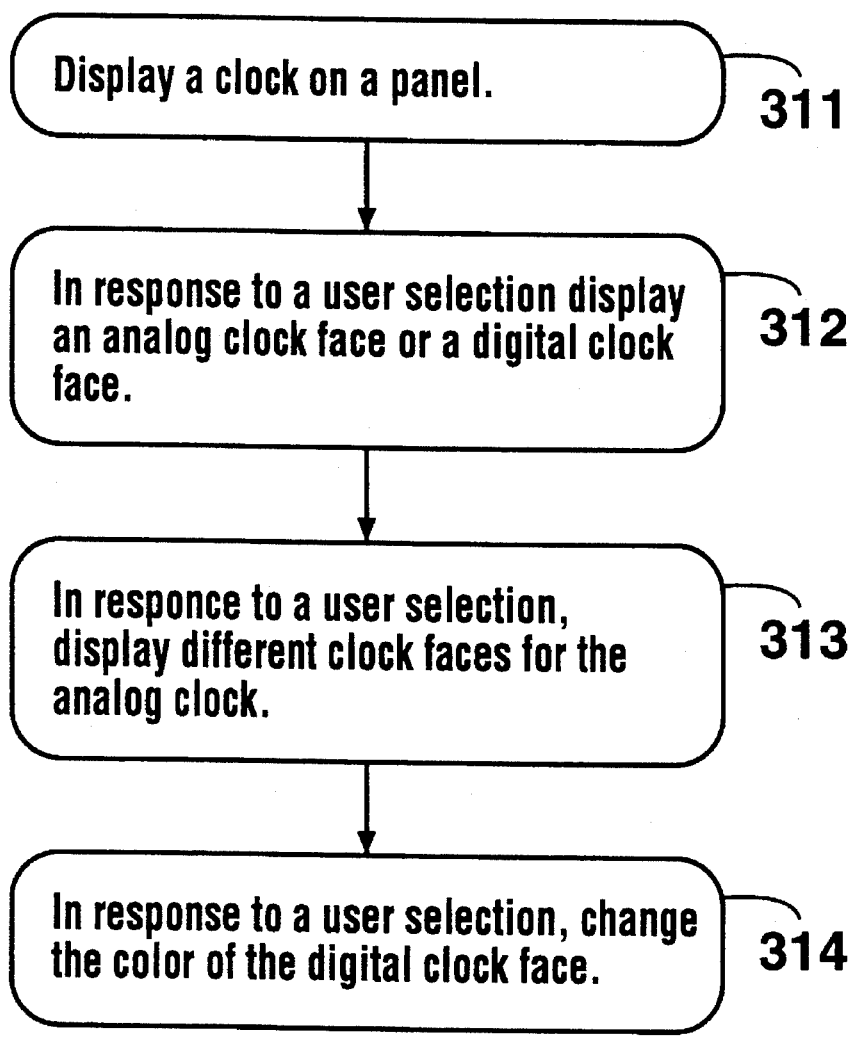

FIG. 61 is a flowchart which shows implementation of a clock display, in accordance with a preferred embodiment of the present invention. In a step 311, clock is displayed on a panel in a computer screen. In a step 312, a user accesses preferences configuration for the clock. Upon the user selecting a digital clock face, a digital clock face for the clock is displayed. Upon the user selecting an analog clock face, an analog clock face for the clock is displayed. In a step 313, upon the user selecting a first analog clock face style, the first analog clock face style for the clock is displayed. Upon the user selecting a second analog clock face style, the second analog clock face style for the clock is displayed. In a step 314, upon the user selecting a first color, the digital clock face is displayed using the first color. Upon the user selecting a second color, the digital clock face is displayed using the second color.

Figure 62:
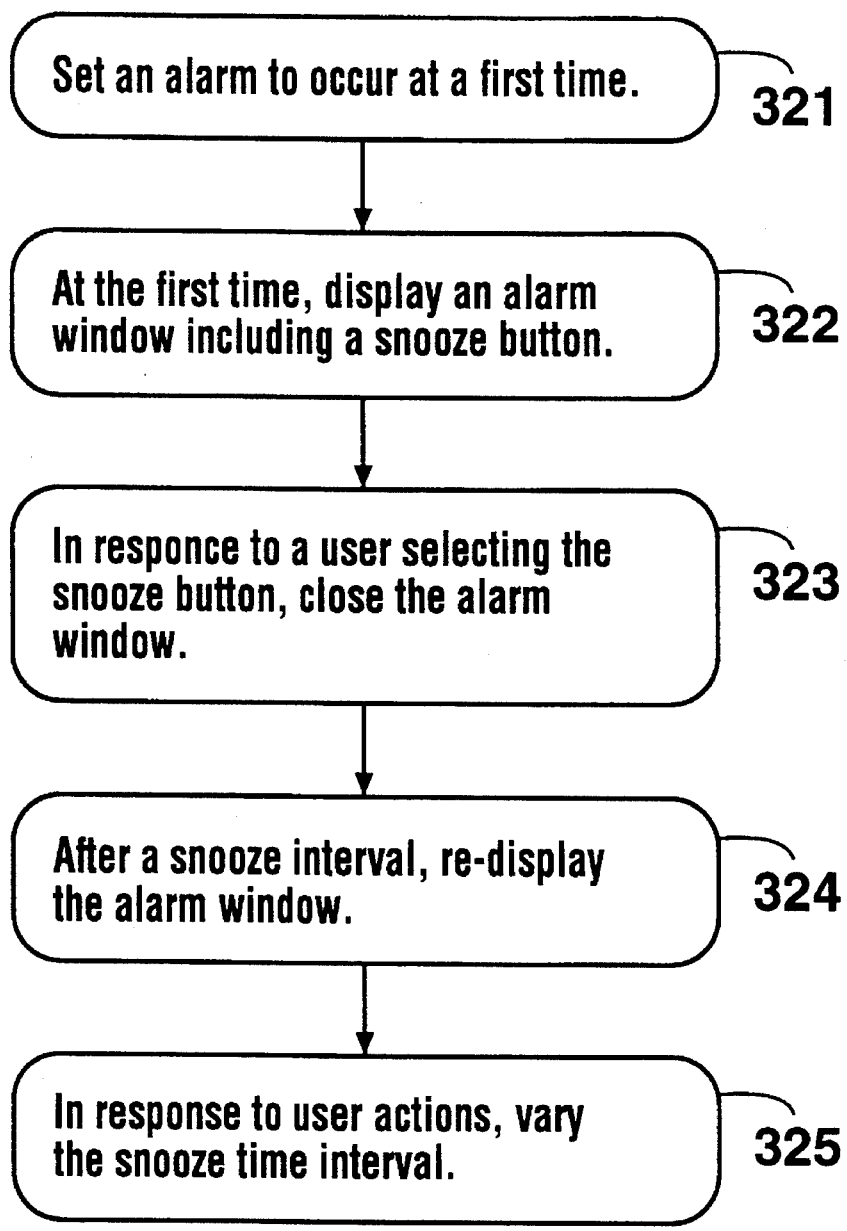

FIG. 62 is a flowchart which shows an implementation of a snooze alarm, in accordance with a preferred embodiment of the present invention. In a step 321, in response to a user command, an alarm is set to occur at a first time. In a step 322, at the first time an alarm window is displayed. The alarm window includes a snooze software button. In a step 323, upon the user selecting the snooze software button, the alarm window is closed. In a step 324, after passage of a snooze time interval from the first time, the first alarm window is re-displayed. In a step 325, in response to a user command, the snooze time interval is varied.

Figure 63:
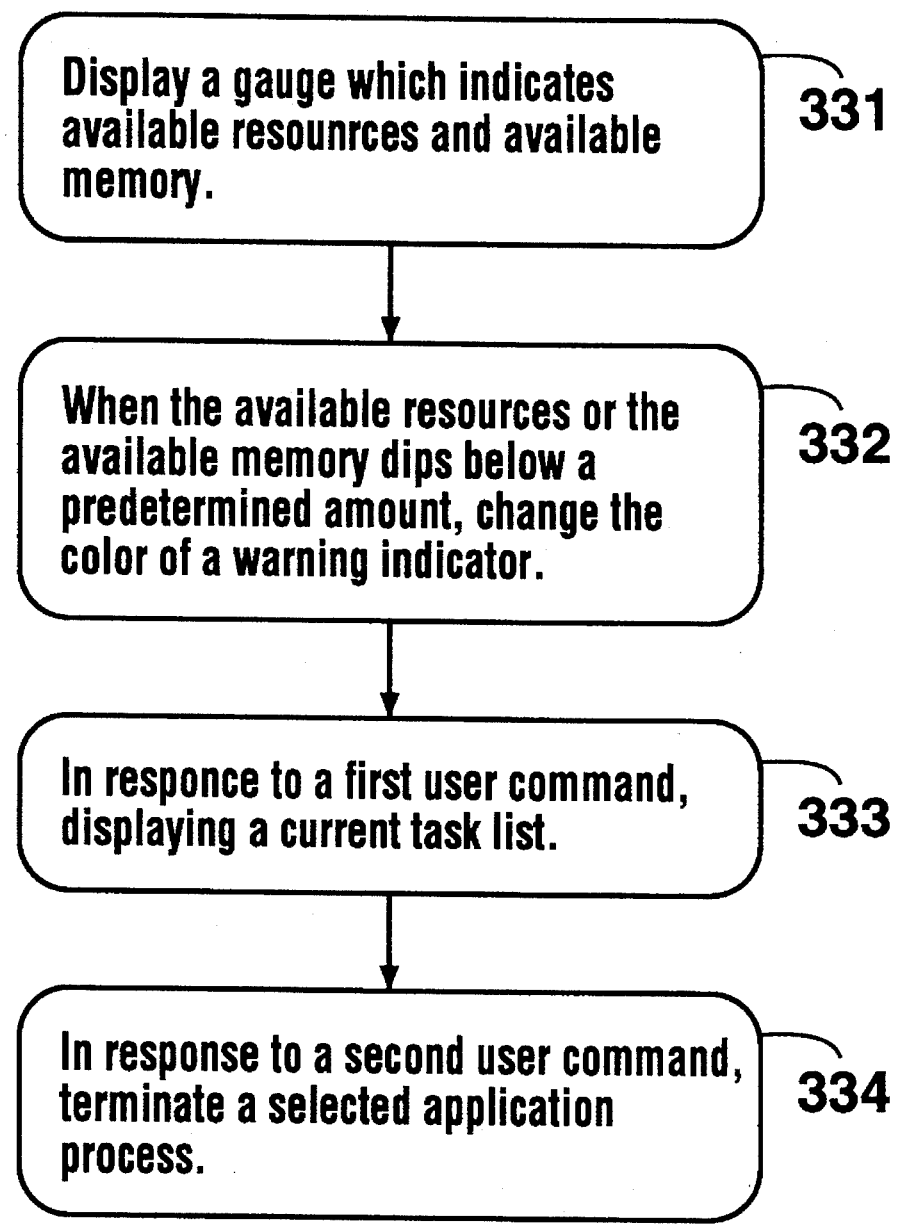

FIG. 63 is a flowchart which shows an implementation of a resource gauge, in accordance with a preferred embodiment of the present invention. In a step 331, a first gauge is displayed on a panel. The first gauge indicates an amount of resources available to a user of the computing system. For example, the first gauge has an appearance similar to an automobile gas gauge. Also displayed on the panel is an indication of the unused memory available to the user. For example, the indication has an appearance similar to an automobile odometer. In a step 332, upon the amount of resources available to the user becoming less than a first preselected amount, a warning is given to the user. Upon the amount of unused memory available to the user becoming less than a second preselected amount, a warning is given to the user. The warning includes changing the color of a portion of the panel. In a step 333, in response to a first user command, a task list of currently running application processes is displayed. In a step 334, in response to a second user command, a currently running application process which the user has selected from the task list is terminated.

Figure 64:
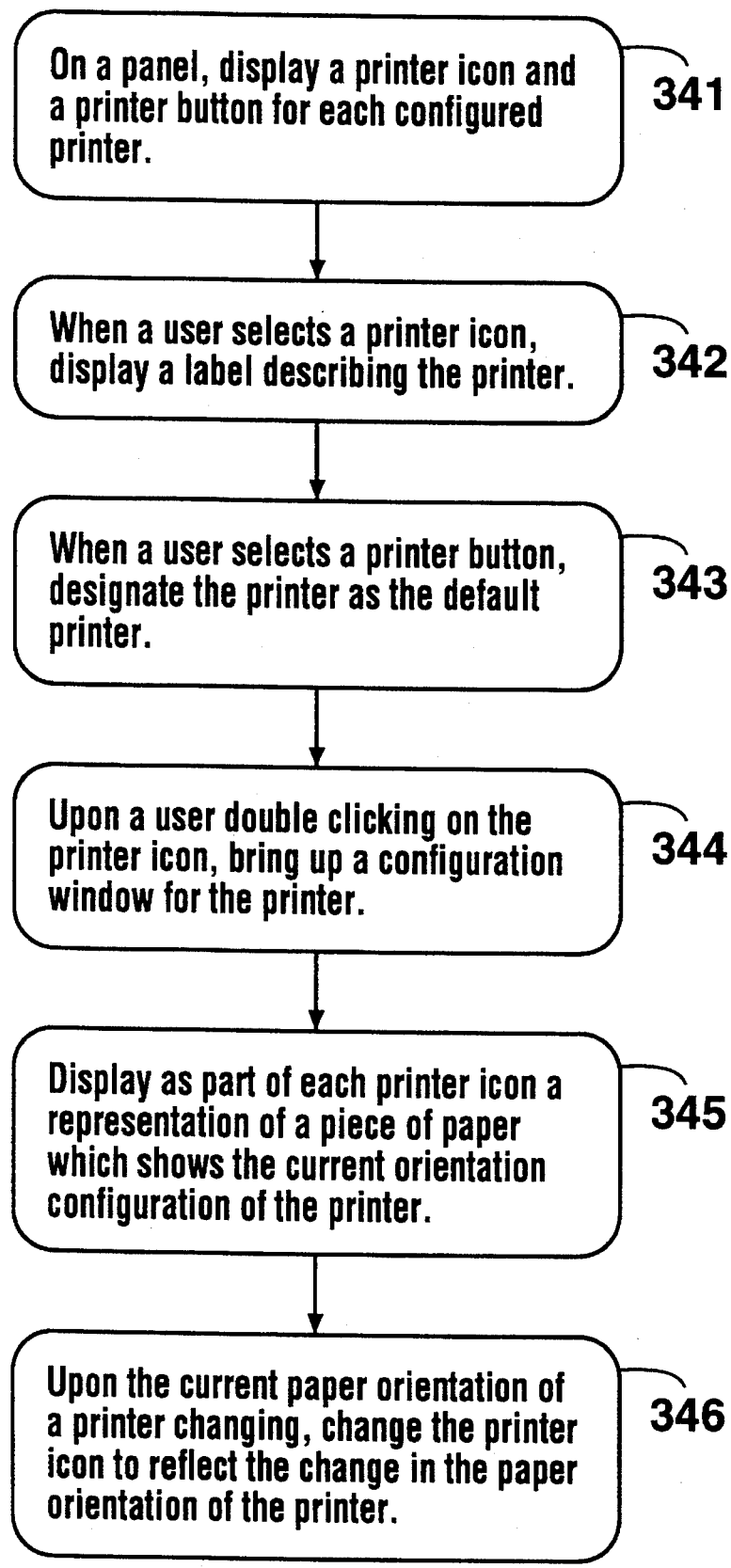

FIG. 64 is a flowchart which implements a printer manager, in accordance with a preferred embodiment of the present invention. In a step 341, a printer icon and a printer indicator button are displayed for each printer for which the computing system is configured. In a step 342, upon selection of the printer icon for a first printer, a label describing the first printer is displayed. In a step 343, upon selection of the printer indicator button for the first printer, designating the first printer as a default printer for the computing system. For example, this includes placing an indication within the printer indicator button that the first printer is the default printer. In a step 344, upon a user double selecting the printer icon for the first printer, a configuration window for the first printer is displayed. In a step 345, a first image of a sheet of paper is displayed within a first printer icon for a first printer. The sheet of paper is oriented in a landscape orientation when the printer is configured to be in a landscape mode and the sheet of paper is oriented in a portrait orientation when the printer is configured to be in a portrait mode. In a step 346, upon a user configuring the first printer from the landscape mode to the portrait mode, the display of the first image of the sheet of paper is changed from being oriented in the landscape orientation to being oriented in the portrait orientation. Upon the user configuring the first printer from the portrait mode to the landscape mode, changing the display of the first image of the sheet of paper from being oriented in the portrait orientation to being oriented in the landscape orientation.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computer system, a method for providing an integrated user interface for organizing access to application programs and peripheral devices of said computer system, the method comprising:

(a) displaying an integrated dashboard interface comprising:

(i) a row of screen panels being displayed together within a first spatially-related region which is integrated into said dashboard interface, said first spatially-related region having an orientation which is configurable by a user, each said screen panel having at least one neighboring screen panel to which it maintains a constant proximity regardless of configuration of the orientation of said first spatially-related region by the user, each screen panel displaying in response to user input a column of screen buttons projecting from the panel;

(ii) at least one peripheral device button being displayed within a second spatially-related region which is also integrated into said dashboard interface, each of said at least one peripheral device button for controlling and configuring a peripheral device in response to user input; and (iii) a set of application launch screen buttons being displayed together within a third spatially-related region which is also integrated into said dashboard interface, each of said application launch screen buttons for launching in response to user input one of said application programs for execution by said system, said third spatially-related region having an orientation which is configurable by the user in conjunction with configuration of said orientation of said first spatially-related region, each said application launch screen button having at least one neighboring application launch screen button to which it maintains a constant proximity regardless of configuration of the orientation of said third spatially-related region by the user;

(b) receiving first and second user input for launching execution of a particular application, said first user input including generating a first signal for selecting a particular screen panel, whereupon said system displays a column of screen buttons projecting from said particular screen panel, said second user input including generating a second signal for selecting a particular one of said screen buttons projecting from said particular screen panel; and (c) responsive to said first and second user signals, launching execution of an application program which corresponds to the particular screen button which is selected.

2. The method of claim 1, further comprising:

(d) receiving user input for adding a screen button from one of said screen panels to said third spatially-related screen region, whereupon said system creates a new application launch screen button which corresponds to the particular screen button which is added.

3. The method of claim 2, wherein said user input of step (d) includes generating a first signal for selecting a particular screen panel, generating a second signal for selecting a particular screen button projecting from said particular screen panel, and generating a third signal for moving the selected particular screen button to said third spatially-related region.

4. The method of claim 3, wherein said third signal indicates a user action for dragging a screen cursor with a mouse device.

5. The method of claim 1, wherein each screen panel displays a descriptive name together with a user-selectable color-coded region indicating general content of application programs available from said each screen panel.

6. The method of claim 1, wherein said orientation of said first spatially-related region is set to a horizontal orientation by the user, so that said screen panels are displayed as a horizontal row.

7. The method of claim 1, wherein said first spatially-related screen region occupies a relatively small area of said integrated dashboard interface.

8. The method of claim 1, wherein said column of screen buttons is displayed with an orientation which is perpendicular to that of said row of screen panels.

9. The method of claim 8, wherein said column of screen buttons is displayed as a vertical column and wherein said row of screen panels is displayed as a horizontal row.

10. The method of claim 1, wherein said at least one button for a peripheral device includes a printer button for controlling a printer device and wherein the method further comprises:

displaying in response to user input a list of documents suitable for printing by said printer device; and receiving user input for printing one of said documents, the user input comprising generating a first signal for selecting a particular one of said documents from said list, and generating a second signal for moving an icon representation of the selected document from said list to said printer button, whereupon said printer device prints the selected document.

11. The method of claim 1, wherein at least one button for a screen device includes a facsimile button for controlling a facsimile device.

12. The method of claim 1, wherein said at least one button for a peripheral device includes a facsimile button for controlling a facsimile device and wherein the method further comprises:

displaying in response to user input a list of documents suitable for facsimile transmission by said facsimile device; and receiving user input for facsimile transmitting one of said documents, the user input comprising generating a first signal for selecting a particular one of said documents from said list, and generating a second signal for moving an icon representation of the selected document from said list to said facsimile button, whereupon said facsimile device facsimile transmits the selected document.

13. The method of claim 1, further comprising:

receiving third user input for selecting one of said application launch screen buttons; and launching execution of an application program which is represented by the selected application launch screen button.

14. The method of claim 13, wherein said third user input comprises a single mouse button click input from a mouse device for selecting a quick launch screen button associated with said particular application program.

* * * * *